United States Patent
Chen et al.

(10) Patent No.: US 12,446,081 B2
(45) Date of Patent: Oct. 14, 2025

(54) METHOD AND DEVICE FOR WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 512 days.

(21) Appl. No.: 17/992,854

(22) Filed: Nov. 22, 2022

(65) Prior Publication Data

US 2023/0083122 A1  Mar. 16, 2023

Related U.S. Application Data

(63) Continuation of application No. PCT/CN2021/095032, filed on May 21, 2021.

(30) Foreign Application Priority Data

Apr. 14, 2021  (CN) .......................... 202110397682.4

(51) Int. Cl.
  *H04W 76/11*  (2018.01)
  *H04W 12/06*  (2021.01)

(52) U.S. Cl.
  CPC ............ *H04W 76/11* (2018.02); *H04W 12/06* (2013.01)

(58) Field of Classification Search
  CPC ................. H04W 76/11; H04W 12/06; H04W 12/033; H04L 63/205
  See application file for complete search history.

(56) References Cited

U.S. PATENT DOCUMENTS

| | | | |
|---|---|---|---|
| 11,252,753 B2* | 2/2022 | Chen ...................... | H04W 72/23 |
| 2016/0044507 A1* | 2/2016 | Agiwal ................. | H04W 12/02 370/328 |

(Continued)

FOREIGN PATENT DOCUMENTS

| | | |
|---|---|---|
| CN | 110312226 A | 10/2019 |
| WO | 2016122533 A1 | 8/2016 |

OTHER PUBLICATIONS

Oppo, Discussion on PDCP open issues (Apr. 20-24, 2020), 3GPP TSG-RAN WG2 Meeting #109bis, pp. 1-4 (Year: 2020).*

(Continued)

*Primary Examiner* — Brandon J Miller
(74) *Attorney, Agent, or Firm* — Ascenda Law Group, PC

(57) ABSTRACT

The disclosure provides a method and a device for wireless communication. The method includes: receiving a second signaling and a second MAC PDU, the second signaling indicating a target identity; wherein the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity. The disclosure improves the reliability through determining a target identity.

20 Claims, 13 Drawing Sheets

(56) References Cited

U.S. PATENT DOCUMENTS

2018/0316610 A1    11/2018  Lee
2019/0297529 A1     9/2019  Hampel
2019/0349296 A1*  11/2019  Liu .................... H04W 28/065
2021/0175955 A1*   6/2021  Kung .................. H04W 76/19

OTHER PUBLICATIONS

ISR received in application No. PCT/CN2021/095032 dated Aug. 24, 2021.
First Office Action of Chinses patent application No. CN202010446477.8 dated May 7, 2022.
Second Office Action of Chinses patent application No. CN202010446477.8 dated Oct. 10, 2022.
First Search Report of Chinses patent application No. CN202010446477.8 dated Apr. 26, 2022.
Oppo Discussion on PDCP open issues 3GPP TSG-RAN WG2 Meeting #109bis R2-2002649 Apr. 24, 2020.
Qualcomm Inc (Rapporteur) Email discussion on unified design for IAB arch 1a 3GPP TSG-RAN WG2 Meeting #103bis R2-1815930 Oct. 12, 2018.

* cited by examiner (a)

(b)

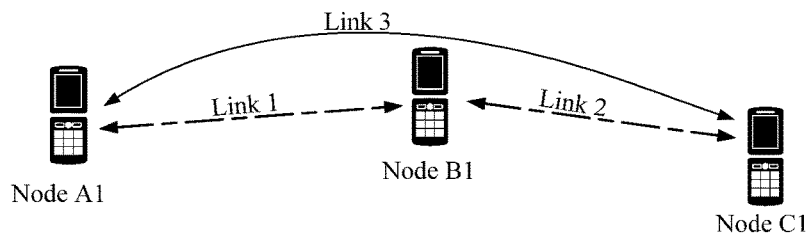
FIG. 9B
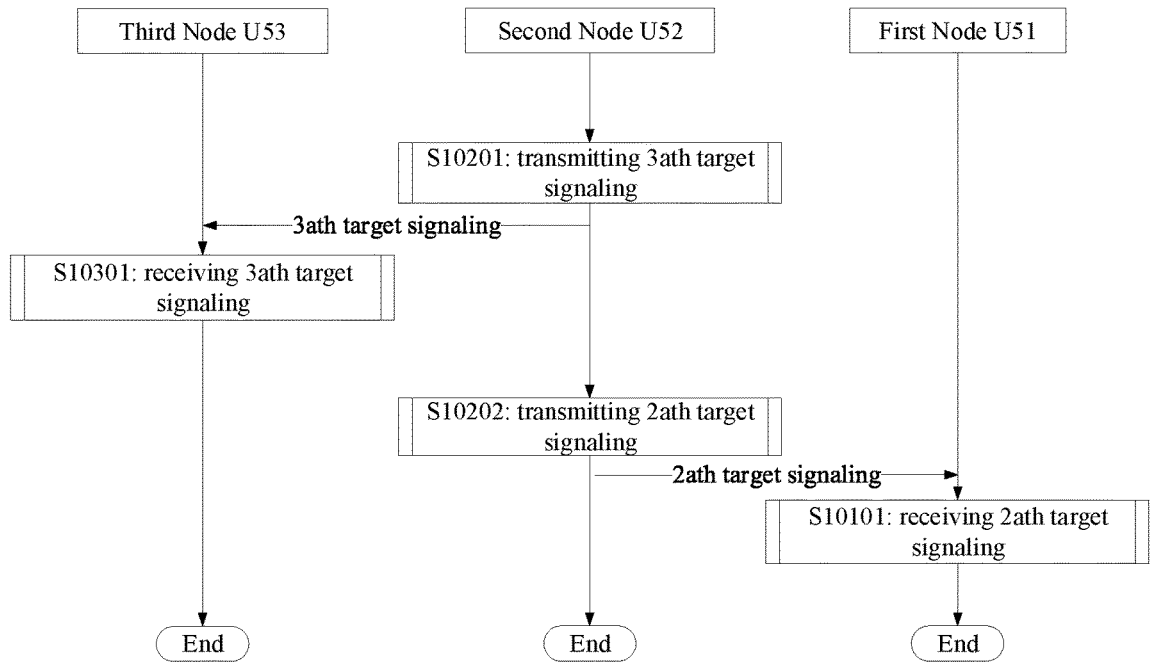
FIG. 10A
| Whether second message includes first field | Used for indicating | Relay type of communication from second node to third node |
FIG. 10B
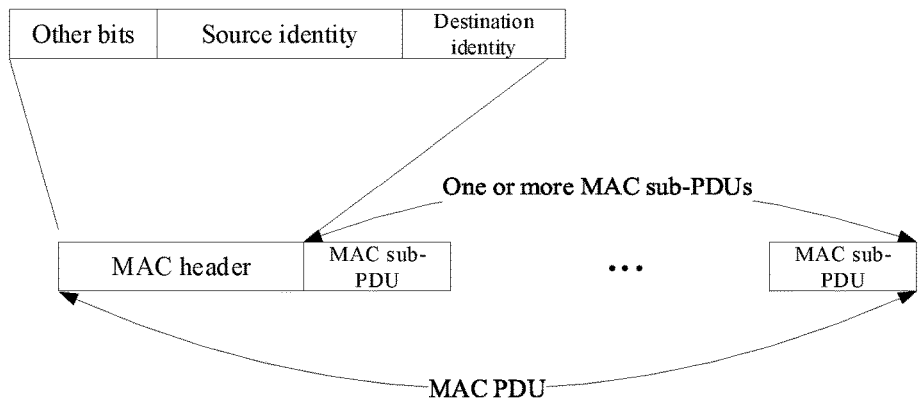
FIG. 11

METHOD AND DEVICE FOR WIRELESS COMMUNICATION

CROSS REFERENCE TO RELATED APPLICATIONS

This application is a continuation of International Application No. PCT/CN2021/095032, filed May 21, 2021, which claims the priority benefit of Chinese Patent Application No. 202010446477.8, filed on May 25, 2020, and claims the priority benefit of Chinese Patent Application No. 202010612808.0, filed on Jun. 30, 2020, and claims the priority benefit of Chinese Patent Application No. 202110332676.0, filed on Mar. 29, 2021, and claims the priority benefit of Chinese Patent Application No. 202110397682.4, filed on Apr. 14, 2021, the full disclosure of which is incorporated herein by reference.

TECHNICAL FIELD

The disclosure relates to transmission methods and devices in wireless communication systems, and in particular to a method and a device in wireless communication to reduce service interruption, improve service continuity, enhance reliability and security, etc.

BACKGROUND

Application scenarios of future wireless communication systems are becoming increasingly diversified, and different application scenarios have different performance requirements on systems. In order to meet different performance requirements of various application scenarios, the 3rd Generation Partner Project (3GPP) Radio Access Network (RAN) #72 plenary session decided to conduct the study of New Radio (NR) (or 5G). The work item of NR was approved at the 3GPP RAN #75 session to standardize the NR.

In a communication process, both Long Term Evolution (LTE) and 5G NR will involve reliable and accurate reception of information, optimized energy efficiency ratio, determination of information validity, flexible allocation of resources, extendable system structure, efficient processing of non-access layer information, low rates of service interruption and dropped calls and support for lower power consumption, which are of great significance for the normal communication between base stations and UEs, for the reasonable scheduling of resources and for the balancing of system load. It is fair to say that enhanced Mobile Broad-Band (eMBB), Ultra Reliable Low Latency Communication (URLLC) and enhanced Machine Type Communication (eMTC) are all indispensable foundations to improve throughput, to meet communication requirements of various services, to improve spectrum utilization and to improve service quality. Meanwhile, they are widely used in Industrial Internet of Things (IIoT), in Vehicular to X (V2X), in Device to Device, in unlicensed spectrum communication, in user communication quality monitoring, in network planning and optimization, in Non Territorial Network (NTN), in Territorial Network (TN), in dual connectivity systems, in radio resource management, in multi-antenna codebook selection, in signaling designing, in neighbor cell management, in service management and in beamforming. The transmission mode of information includes broadcast and unicast, both of which are indispensable for 5G systems, because they are very helpful to meet the above requirements.

With the increasing scenarios and complexity of systems, higher requirements are put forward for interruption rate reduction, latency reduction, reliability enhancement, system stability enhancement, service flexibility and power saving; meanwhile, compatibility need to be taken into account between different systems and different versions when designing the systems.

SUMMARY

Many communication scenarios will involve control and link establishment, parameter configuration, resource allocation and other issues when a UE performs communication with a UE. Due to the lack of a central control node such as a serving cell, the communication between UEs, especially the communication between UEs involving relay nodes, will have a distributed control problem. If the configuration is inappropriate, a mismatch will be caused, thereby resulting in communication failure. Among many configurations, the setting about security is particularly important. Once the setting is improper, it will inevitably result in that a receiving end cannot receive correctly. In sidelink communications, if a logical channel identity is used as an input parameter of a security algorithm, then in scenarios involving a relay, two links connected to the relay node probably will use different logical channels. The two links are isolated from each other to some extent, which makes it difficult for a receiving end and a transmitting end to determine which of the logical channels should be employed, because the nodes in communication probably have no master-slave relationship, and the serving cell does not assign a master-slave relationship either. Therefore, one important problem is how to determine an input parameter of a security algorithm in UE-UE communications, particularly when a relay is involved.

In view of the above problems, the disclosure provides a solution.

It should be noted that the embodiments of any node in the disclosure and the characteristics of the embodiments may be applied to any other node if no conflict is incurred. The embodiments of the disclosure and the characteristics of the embodiments may be arbitrarily combined mutually if no conflict is incurred.

The disclosure provides a method in a first node for wireless communication, wherein the method includes:

receiving a second signaling and a second MAC PDU, the second signaling indicating a target identity.

Herein, the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the problem to be solved by the disclosure includes: when UEs perform communication, for example, through a sidelink technology, especially when there is a relay node between the UEs and the relay node is a UE too, the communication process will become very complicated; in particular, when an L2 relay architecture is used, the obvious problem is as follows: when configuring two links, for example, how to correctly determine a remote logical channel identity as an input of a security algorithm. This problem is prominent when one source node and one destination node have multiple PDCH and/or RLC entities and have one set of security keys. Meanwhile, it is needed to consider which method is most appropriate to determine it; if a remote logical channel is already occupied, a conflict might occur during the configuration, then how to handle the resulted communication interruption; moreover, when there are multiple forwarding links for one destination node, a distributed coordination work is more needed, especially when these logical channels are all used for the security algorithm. The disclosure avoids the possible conflict through receiving a second signaling, which contains a target identity assigned by a source node.

In one embodiment, the above method has the following benefits: one node in communication indicates a logical channel identity that is used as an input of a security algorithm, that is, a target identity, which to greatest extent ensures the flexibility of implementation; the target identity may be determined by the first logical channel identity, or by the second logical channel identity, or by a virtual logical channel identity, which avoids the threat caused to the stability of the security algorithm due to a possible change in a logical channel identity resulted from logical channel reconfiguration or radio bearer reconfiguration, or path switch or relay selection and reselection; meanwhile, it can avoid that different PDCP/RLC entities with different keys use a same input parameter to lead to a security hazard. The method provided in the disclosure can solve the above problems; on the other hand, the disclosure is helpful for a relay node to process the data of different links properly.

In one embodiment, the disclosure is characterized in that: MAC represents Medium Access Control.

In one embodiment, the disclosure is characterized in that: PDU represents Protocol Data Unit.

Specifically, according to one aspect of the disclosure, the target identity is a logical channel identity.

Specifically, according to one aspect of the disclosure, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

Specifically, according to one aspect of the disclosure, five Least Significant Bits (LSBs) of the target identity are the same as five LSBs of the first logical channel identity, and the target identity is different from the second logical channel identity.

Specifically, according to one aspect of the disclosure, five Least Significant Bits (LSBs) of the target identity are the same as five LSBs of the second logical channel identity, and the target identity is different from the first logical channel identity.

Specifically, according to one aspect of the disclosure, the target identity is a logical channel identity other than the first logical channel identity and the second logical channel identity.

Specifically, according to one aspect of the disclosure, a third MAC PDU is received, wherein the third MAC PDU includes a third MAC sub-PDU, and the third MAC sub-PDU includes the target identity and a third data packet; and the target identity is used for a security algorithm of the third data packet; wherein the third data packet and the first data packet are generated in one same PDCP entity.

Specifically, according to one aspect of the disclosure, a first signaling is transmitted, wherein the first signaling is used for indicating the second logical channel identity.

Specifically, according to one aspect of the disclosure, a fourth MAC PDU is transmitted, the fourth MAC PDU includes a fourth MAC sub-PDU, the fourth MAC sub-PDU includes the second logical channel identity and a fourth data packet, and the target identity is used for a security algorithm of the fourth data packet.

Specifically, according to one aspect of the disclosure, a second target signaling is transmitted, wherein the second target signaling is used for configuring the second logical channel identity.

Specifically, according to one aspect of the disclosure, the first signaling indicates a second candidate logical channel identity, and the second candidate logical channel identity is used for determining the second logical channel identity.

Specifically, according to one aspect of the disclosure, as a response to the fact that the second signaling does not conflict with the current configuration, a third signaling is transmitted; the third signaling indicates that a configuration of the second signaling is completed; the first signaling includes a first candidate logical channel identity set; the first candidate logical channel identity set includes at least one candidate logical channel identity, and the second candidate logical channel identity belongs to the first candidate logical channel identity set; the first candidate logical channel identity set and the second logical channel identity are used for determining whether the second signaling conflicts with the current configuration.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an aircraft.

The disclosure provides a method in a second node for wireless communication, wherein the method includes:
receiving a first MAC PDU; and
transmitting a second MAC PDU.

Herein, the second MAC PDU includes a second MAC sub-PDU, the second MAC sub-PDU includes a second MAC sub-header and a first data packet, and the second MAC sub-header includes a second logical channel identity; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; a target identity is different from at least one of the first logical channel identity and the second logical channel identity, and the target identity is used for a security algorithm of the first data packet.

Specifically, according to one aspect of the disclosure, a second signaling is transmitted, wherein the second signaling is used for indicating the target identity.

Specifically, according to one aspect of the disclosure, a first signaling is transmitted, wherein the first signaling is used for indicating the second logical channel identity.

Specifically, according to one aspect of the disclosure, the target identity is a logical channel identity.

Specifically, according to one aspect of the disclosure, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

Specifically, according to one aspect of the disclosure, five Least Significant Bits (LSBs) of the target identity are the same as five LSBs of the first logical channel identity, and the target identity is different from the second logical channel identity.

Specifically, according to one aspect of the disclosure, five Least Significant Bits (LSBs) of the target identity are the same as five LSBs of the second logical channel identity, and the target identity is different from the first logical channel identity.

Specifically, according to one aspect of the disclosure, the target identity is a logical channel identity other than the first logical channel identity and the second logical channel identity.

Specifically, according to one aspect of the disclosure, a fourth MAC PDU is received, the fourth MAC PDU includes a fourth MAC sub-PDU, the fourth MAC sub-PDU includes the second logical channel identity and a fourth data packet, and the target identity is used for a security algorithm of the fourth data packet; and a fifth MAC PDU is transmitted, wherein the fifth MAC PDU includes a fifth MAC sub-PDU, and the fifth MAC sub-PDU includes the first logical channel identity and a fourth data packet.

Specifically, according to one aspect of the disclosure, a first target signaling is received, wherein the first target signaling is used for configuring the first logical channel identity.

Specifically, according to one aspect of the disclosure, a second target signaling is received, wherein the second target signaling is used for configuring the second logical channel identity.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an aircraft.

The disclosure provides a method in a third node for wireless communication, wherein the method includes:

transmitting a second signaling and a first MAC PDU, the second signaling indicating a target identity.

Herein, the first MAC PDU includes a first MAC sub-PDU, the first MAC sub-PDU includes a first MAC sub-header and a first data packet, and the first MAC sub-header includes a first logical channel identity; the first MAC PDU is used for generating a second MAC PDU; the first MAC PDU is received by a transmitter of the second MAC PDU; the second MAC PDU includes a second MAC sub-PDU, the second MAC sub-PDU includes a second MAC sub-header and the first data packet, and the second MAC sub-header includes a second logical channel identity; the first logical channel identity is different from the second logical channel identity; the target identity is different from at least one of the first logical channel identity and the second logical channel identity, and the target identity is used for a security algorithm of the first data packet.

Specifically, according to one aspect of the disclosure, a second signaling is transmitted, wherein the second signaling is used for indicating the target identity.

Specifically, according to one aspect of the disclosure, the target identity is a logical channel identity.

Specifically, according to one aspect of the disclosure, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

Specifically, according to one aspect of the disclosure, five Least Significant Bits (LSBs) of the target identity are the same as five LSBs of the first logical channel identity, and the target identity is different from the second logical channel identity.

Specifically, according to one aspect of the disclosure, five Least Significant Bits (LSBs) of the target identity are the same as five LSBs of the second logical channel identity, and the target identity is different from the first logical channel identity.

Specifically, according to one aspect of the disclosure, the target identity is a logical channel identity other than the first logical channel identity and the second logical channel identity.

Specifically, according to one aspect of the disclosure, a third MAC PDU is transmitted, wherein the third MAC PDU includes a third MAC sub-PDU, and the third MAC sub-PDU includes the target identity and a third data packet; and the target identity is used for a security algorithm of the third data packet; wherein the third data packet and the first data packet are generated in one same PDCP entity.

Specifically, according to one aspect of the disclosure, a first signaling is received, wherein the first signaling is used for indicating the second logical channel identity.

Specifically, according to one aspect of the disclosure, a fifth MAC PDU is received, wherein the fifth MAC PDU includes a fifth MAC sub-PDU, the fifth MAC sub-PDU includes the first logical channel identity and a fourth data packet, and the target identity is used for a security algorithm of the fourth data packet.

Specifically, according to one aspect of the disclosure, a first target signaling is transmitted, wherein the first target signaling is used for configuring the first logical channel identity.

Specifically, according to one aspect of the disclosure, the first signaling indicates a second candidate logical channel identity, and the second candidate logical channel identity is used for determining the second logical channel identity.

Specifically, according to one aspect of the disclosure, a third signaling is received; the third signaling acts as a response to the fact that the second signaling does not conflict with the current configuration; the third signaling indicates that a configuration of the second signaling is completed; the first signaling includes a first candidate logical channel identity set; the first candidate logical channel identity set includes at least one candidate logical channel identity, and the second candidate logical channel identity belongs to the first candidate logical channel identity set; the first candidate logical channel identity set and the second logical channel identity are used for determining whether the second signaling conflicts with the current configuration.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an aircraft.

The disclosure provides a first node for wireless communication, wherein the first node includes:

a first receiver, to receive a second signaling and a second MAC PDU, the second signaling indicating a target identity.

Herein, the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

The disclosure provides a second node for wireless communication, wherein the second node includes:

a second receiver, to receive a first MAC PDU; and
a second transmitter, to transmit a second MAC PDU.

Herein, the second MAC PDU includes a second MAC sub-PDU, the second MAC sub-PDU includes a second MAC sub-header and a first data packet, and the second MAC sub-header includes a second logical channel identity; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; a target identity is different from at least one of the first logical channel identity and the second logical channel identity, and the target identity is used for a security algorithm of the first data packet.

The disclosure provides a third node for wireless communication, wherein the third node includes:

a third transmitter, to transmit a second signaling and a first MAC PDU, the second signaling indicating a target identity.

Herein, the first MAC PDU includes a first MAC sub-PDU, the first MAC sub-PDU includes a first MAC sub-header and a first data packet, and the first MAC sub-header includes a first logical channel identity; the first MAC PDU is used for generating a second MAC PDU; the first MAC PDU is received by a transmitter of the second MAC PDU; the second MAC PDU includes a second MAC sub-PDU, the second MAC sub-PDU includes a second MAC sub-header and the first data packet, and the second MAC sub-header includes a second logical channel identity; the first logical channel identity is different from the second logical channel identity; the target identity is different from at least one of the first logical channel identity and the second logical channel identity, and the target identity is used for a security algorithm of the first data packet.

In one embodiment, compared with conventional schemes, the disclosure has the following advantages.

Through determining a target identity, the method provided in the disclosure can solve the problem of decryption failure caused by a mismatch between receiving and transmitting ends that occurs in the UE-UE communication involving a relay, and meanwhile can avoid the problem of insufficient encryption caused when multiple entities use a same key and counter.

In one embodiment, compared with conventional schemes, the disclosure has the following advantages. In the method provided in the disclosure, the target logical channel may be the first logical channel identity, which facilitates a source UE to configure a link; the source UE, as an initiator of communication, can better determine parameters such as radio bearer and RLC bearer according to service requirements; meanwhile, when the logical channel of the source node is in shortage, this is helpful for the source node to pick an appropriate logical channel identity.

In one embodiment, compared with conventional schemes, the disclosure has the following advantages. In the method provided in the disclosure, the target logical channel may be the second logical channel identity, which facilitates a destination UE to configure a link. A feedback from the destination node may be viewed as a mark for completing link establishment; therefore, the behavior that the destination node determines the target identity is conducive to making a decision on the basis of a complete information set; depending on different conditions, the destination node probably can acquire parameters provided by the source node; therefore, it is acceptable that the target link layer identity is the source node and the destination node.

In one embodiment, compared with conventional schemes, the disclosure has the following advantages. In the method provided in the disclosure, the target logical channel may be a logical channel identity that is independent of the first logical channel identity and the second logical channel identity, which guarantees the independence; the assignment and usage of the target link identity may be unrestricted by the first logical channel identity and the second logical channel identity. Meanwhile, when a UE converts from relay connection into direct connection to a peer UE to perform communication, the UE can directly use the configured target identity, which may effectively reduce time delay and data interruption.

In one embodiment, compared with conventional schemes, the disclosure has the following advantages.

A logical channel identity from a transmitting end to a relay and a logical channel identity from the relay to a receiving end may need to be differentiated, that is to say, it is difficult to keep them consistent, even it is possible that one of them uses an extended logical channel identity; therefore, if the target identity needs to be identical to both the first logical channel identity and the second logical channel identity, obstacles might occur and it is difficult to implement; the disclosure proposes that only five LSBs of the logical channel identity are used as a parameter of the security algorithm and other bits of the logical channel identity are used to differentiate the carried data or the bearer itself, which not only uses different logical channel identities, but also guarantees the unified input of security algorithm, thereby solving the above problems.

In one embodiment, compared with conventional schemes, the disclosure has the following advantages.

The method provided in the disclosure determines the second logical channel identity by transmitting the second logical channel identity from the first node, which may greatly simplify signaling overheads for the communication between nodes, especially when involving a relay, and may avoid the condition in conventional methods that link configurations are performed by an initiating node merely, for example, the third node, including, for example, the configuration of the second logical channel, when there are many links to the first node; when all logical channels to the first node are identical, the complexity of the first node acting as a receiving node can be reduced; therefore, the first node only needs to process one same logical channel at this time; therefore, the method solves the problem of configuration conflict caused when available logical channels of different links are different because of insufficient coordination between multiple paths, meanwhile, the method is conducive to simplifying signaling process; more important, when the security algorithm of the data transmitted by the transmitting end needs a logical channel identity, a unified logical channel of the receiving end may avoid the ambiguity in the processing of the receiving end and the transmitting end.

In one embodiment, compared with conventional schemes, the disclosure has the following advantages.

When the second node acts as a relay node, one of the problems to be solved includes how to differentiate the data targeting the second node from the data needing forwarding; one method is to differentiate them using different logical channel identities; however, if the logical channel identity is also used for the security algorithm of data, new challenges will be brought about, that is to say, how to ensure the transmitting end and the receiving end to have a same logical channel, for example, the logical channel identity used by the encryption algorithm of the transmitting end and the logical channel identity used by the receiving end to decrypt need to keep consistent to some extent, otherwise, the detection of the security algorithm cannot be passed; meanwhile, due to the foregoing reasons, a logical channel identity from a transmitting end to a relay and a logical channel identity from the relay to a receiving end may need to be differentiated, that is to say, it is difficult to keep them consistent; then, this becomes a dilemma; the disclosure proposes that only five LSBs of the logical channel identity are used as a parameter of the security algorithm and other bits of the logical channel identity are used to differentiate the data targeting the relay node or the data needing relaying and forwarding, which not only uses different logical channel identities, but also guarantees the unified input of security algorithm; thus, the transmitting end and the receiving end can perform transmission and receiving without influences, even no specific signaling is needed to indicate the receiving end to decrypt the required logical channel identity, because the receiving end employs by default the logical channel identity corresponding to the received data to pass the security detection; therefore, the method provided in the disclosure well solves the above problem of dilemma.

The disclosure provides a method in a first node for wireless communication, wherein the method includes:
receiving a first message, the first message including a first parameter set; and
transmitting a second message, the second message including a first parameter set and a second parameter set.

Herein, the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the problem to be solved by the disclosure includes: when UEs perform communication with each other, especially the sidelink communication involving a relay, the establishment of a communication link or connection requires a previous security establishment between the UEs; since each link is independent from each other, different links need to establish security respectively; on the other hand, for an end-to-end link having a relay, the security is end-to-end and is in certain association to each link segment, which is reflected in that each link segment will impact the end-to-end link and the precedence in time of the establishment of each segment of security will generate different results. Conventional processing methods cause time delay and unreliability in communication, and bring out challenges to communications between UEs, especially V2X communications sensitive to time delay, IoT, industrial applications and the like.

In one embodiment, the above method has the following benefits: two links to a relay node constitute a complete end-to-end link and the two links essentially are associated, which impacts the establishment of security. The method provided in the disclosure can establish in one same PC5-S signaling two different security contexts that are in certain association, and meanwhile can implicitly indicate whether it is needed to establish and how to establish security and relay types in different conditions, and can quickly establish an alternative scheme in the condition that partial security cannot be established, thereby guaranteeing the normal conduction of communication and greatly reducing time delay.

In one embodiment, the disclosure is characterized in that: MAC represents Medium Access Control.

In one embodiment, the disclosure is characterized in that: SDU represents Service Data Unit.

In one embodiment, the disclosure is characterized in that: PDU represents Protocol Data Unit.

Specifically, according to one aspect of the disclosure, the first message includes a third parameter set, the third parameter set includes at least partial bits of a third key identity, the third parameter set is used for a security establishment between the first node and the second node.

Specifically, according to one aspect of the disclosure, whether the second message includes a first field is used for indicating a relay type of communication from the second node to the third node, and the relay type includes an L3 relay and an L2 relay.

Specifically, according to one aspect of the disclosure, a third message is received, the third message is used for a security establishment between the second node and the third node; the third message and the first parameter set together include the first key identity; and a fourth message is transmitted, the fourth message is generated by the third message, and the fourth message is used for a security establishment between the second node and the third node.

Specifically, according to one aspect of the disclosure, when the security from the second node to the third node cannot be established, the L3 relay is determined as the relay type of communication from the second node to the third node.

Specifically, according to one aspect of the disclosure, when the security from the first node to the third node cannot be established, the L2 relay is determined as the relay type from the second node to the third node.

Specifically, according to one aspect of the disclosure, a fifth message is received, the fifth message is used for a security establishment between the first node and the third node; the fifth message and the second parameter set together include the second key identity.

Specifically, according to one aspect of the disclosure, a sixth message is transmitted, the sixth message indicates a result of security establishment between the first node and the second node, and a target layer2 identity used to carry the sixth message is the third link layer identity.

Specifically, according to one aspect of the disclosure, a seventh message is transmitted, the seventh message indicates a result of security establishment between the first node and the third node, and a target layer2 identity used to carry the seventh message is the second link layer identity.

Specifically, according to one aspect of the disclosure, a first MAC PDU caries at least partial bits of the first message, the first MAC PDU includes a first MAC header and at least a first MAC sub-PDU, the first MAC header includes at least partial bits of the first link layer identity and at least partial bits of the second link layer identity; a second MAC PDU caries at least partial bits of the second message, the second MAC PDU includes a second MAC header and at least a second MAC sub-PDU, the second MAC header includes at least partial bits of the third link layer identity.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an aircraft.

The disclosure provides a method in a second node for wireless communication, wherein the method includes:
transmitting a first message, the first message including a first parameter set.

Herein, the first parameter set is used for a security establishment between a second node and a third node; the second node is identified by a second link layer identity, and the third node is identified by a third link layer identity; the first message is used for triggering a second message, and the second message includes a first parameter set and a second parameter set; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

Specifically, according to one aspect of the disclosure, the first message includes a third parameter set, the third parameter set includes at least partial bits of a third key identity, the third parameter set is used for a security establishment between the first node and the second node.

Specifically, according to one aspect of the disclosure, whether the second message includes a first field is used for indicating a relay type of communication from the second node to the third node, and the relay type includes an L3 relay and an L2 relay.

Specifically, according to one aspect of the disclosure, a fourth message is received, the fourth message is generated by the third message, and the fourth message is used for a security establishment between the second node and the third node; the fourth message and the first parameter set together include the first key identity.

Specifically, according to one aspect of the disclosure, when the security from the second node to the third node cannot be established, the L3 relay is determined as the relay type of communication from the second node to the third node.

Specifically, according to one aspect of the disclosure, when the security from the first node to the third node cannot be established, the L2 relay is determined as the relay type from the second node to the third node.

Specifically, according to one aspect of the disclosure, a seventh message is received, the seventh message indicates a result of security establishment between the first node and the third node, and a target layer2 identity used to carry the seventh message is the second link layer identity.

Specifically, according to one aspect of the disclosure, a first MAC PDU caries at least partial bits of the first message, the first MAC PDU includes a first MAC header and at least a first MAC sub-PDU, the first MAC header includes at least partial bits of the first link layer identity and at least partial bits of the second link layer identity; a second MAC PDU caries at least partial bits of the second message, the second MAC PDU includes a second MAC header and at least a second MAC sub-PDU, the second MAC header includes at least partial bits of the third link layer identity.

Specifically, according to one aspect of the disclosure, the first node is a UE.

Specifically, according to one aspect of the disclosure, the first node is an IoT terminal.

Specifically, according to one aspect of the disclosure, the first node is a relay.

Specifically, according to one aspect of the disclosure, the first node is a vehicle terminal.

Specifically, according to one aspect of the disclosure, the first node is an aircraft.

The disclosure provides a first node for wireless communication, wherein the first node includes:
a first receiver, to receive a first message, the first message including a first parameter set; and
a first transmitter, to transmit a second message, the second message including a first parameter set and a second parameter set.

Herein, the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

The disclosure provides a second node for wireless communication, wherein the first node includes:

a second transmitter, to transmit a first message, the first message including a first parameter set.

Herein, the first parameter set is used for a security establishment between a second node and a third node; the second node is identified by a second link layer identity, and the third node is identified by a third link layer identity; the first message is used for triggering a receiver of the first message to transmit a second message, and the second message includes a first parameter set and a second parameter set; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, compared with conventional schemes, the disclosure has the following advantages.

The method proposed in the disclosure needs multiple steps in the communication between UEs involving a relay. As the number of relays increases, the number of steps increases sharply too. However, when all the steps are completed, much more time is consumed compared to the direct communication between UEs, which results in that the sidelink communication involving a relay cannot meet the QoS provided by the direct sidelink communication between UEs, in another word, the sidelink communication involving a relay will lead to increase of latency and deterioration of communication quality. Connection and security need to be established before service data can be transmitted, which contributes a lot to the communication latency. In v2x communications, positions of nodes change quickly, consequently a user might need to frequently change a relay node. If the time to establish a connection is shorter, the time available to transmit services is longer, and the link is more reliable. Compared with the cumbersome establishment processes of connection and security in with conventional methods, the method proposed in the disclosure can establish a security more quickly, and meanwhile can make an adjustment quickly according to the failure of security establishment, thereby guaranteeing that the impact to communication is the least.

BRIEF DESCRIPTION OF THE DRAWINGS

Other features, purposes and advantages of the disclosure will become more apparent from the detailed description of non-restrictive embodiments taken in conjunction with the following drawings.

FIG. 9B is a flowchart of a communication link according to one embodiment of the disclosure.

FIG. 10A is a flowchart of transmission according to one embodiment of the disclosure.

FIG. 10B is a diagram of a scenario in which whether a second message includes a first field is used for indicating a relay type of communication from a second node to a third node according to one embodiment of the disclosure.

FIG. 11 is a diagram of one MAC PDU according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1A

Figure 1A:
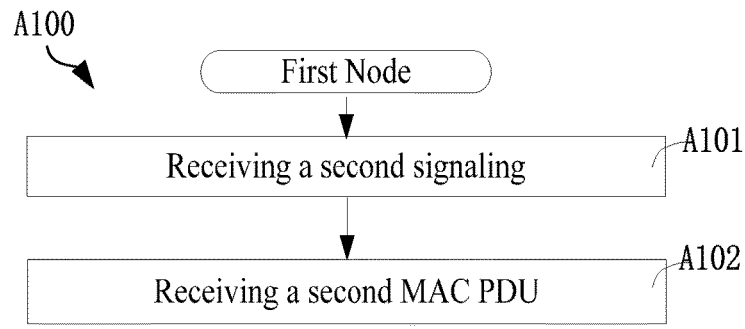
FIG. 1A is a flowchart of receiving a second signaling and a second MAC PDU according to one embodiment of the disclosure.

Embodiment 1A illustrates a flowchart of receiving a second signaling and receiving a second MAC PDU according to one embodiment of the disclosure, as shown in FIG. 1A. In FIG. 1A, each box represents one step. In particular, the order of each box does not represent a specific precedence relationship in time between the steps.

In Embodiment 1A, the first node in the disclosure receives a second signaling in SA101 and receives a second MAC PDU in SA102.

Herein, the second signaling indicates a target identity; the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the first node is a UE.

In one embodiment, the second signaling includes an upper layer signaling.

In one embodiment, the second signaling includes a Radio Resource Control (RRC) signaling.

In one embodiment, the RRC signaling includes a PC5-RRC signaling.

In one embodiment, the second signaling includes a PC5-S signaling.

In one embodiment, the second signaling includes a ProSe signaling.

In one embodiment, the second signaling is transmitted over a Uu interface.

In one embodiment, the second signaling is transmitted over a PC5 interface.

In one embodiment, the second signaling is transmitted through a Sidelink Control Channel (SCCH).

In one embodiment, the second signaling is transmitted through a Sidelink Traffic Channel (STCH).

In one embodiment, the second signaling is transmitted through a Physical sidelink control channel (PSCCH).

In one embodiment, the second signaling is transmitted through a Physical sidelink shared channel (PSSCH).

In one embodiment, the second signaling is transmitted through a Physical sidelink broadcast channel (PSBCH).

In one embodiment, the second signaling is transmitted through a SideLink Shared CHannel (SL-SCH).

In one embodiment, the second signaling is transmitted through a sidelink.

In one embodiment, the second signaling is used for configuring a Data RB (DRB).

In one embodiment, the second signaling is used for configuring a Radio Bearer (RB).

In one embodiment, the second signaling is used for configuring a Sidelink RB (SLRB).

In one embodiment, the second signaling includes an RRCReconfigurationSidelink.

In one embodiment, the second signaling includes an RRCReconfigurationCompleteSidelink.

In one embodiment, the second signaling includes partial fields in an RRCReconfigurationSidelink.

In one embodiment, the second signaling includes an RRCReconfiguration.

In one embodiment, the second signaling includes an SIB12.

In one embodiment, the second signaling includes an SLRB-Config.

In one embodiment, the second signaling includes an sl-PDCP-ConfigPC5.

In one embodiment, the second signaling includes an sl-RLC-ConfigPC5.

In one embodiment, the second signaling includes an sl-MAC-LogicalChannelConfigPC5.

In one embodiment, the second signaling includes a PC5-S signaling.

In one embodiment, the second signaling includes an SL-LogicalChannelConfigPC5.

In one embodiment, the second signaling includes an SL-LogicalChannelConfig.

In one embodiment, the second signaling includes an SL-LogicalChannelConfig-r16.

In one embodiment, the second signaling includes an SL-LogicalChannelConfig-r17.

In one embodiment, the second signaling includes partial fields in an SL-LogicalChannelConfig.

In one embodiment, the second signaling includes an sl-RLC-Config.

In one embodiment, the second signaling includes an sl-RLC-Config-r16.

In one embodiment, the second signaling includes an sl-RLC-Config-r17.

In one embodiment, the second signaling includes partial fields in an sl-RLC-Config.

In one embodiment, the second signaling includes an sl-LogicalChannelGroup.

In one embodiment, the second signaling includes an RRCConnectionReconfigurationSidelink.

In one embodiment, the second signaling includes an RRCConnectionReconfiguration.

In one embodiment, the second signaling includes a DIRECT LINK ESTABLISHMENT REQUEST.

In one embodiment, the second signaling includes a DIRECT LINK ESTABLISHMENT ACCEPT.

In one embodiment, the second signaling includes a DIRECT LINK MODIFICATION REQUEST.

In one embodiment, the second signaling includes a DIRECT LINK MODIFICATION ACCEPT.

In one embodiment, the second signaling includes a DIRECT LINK KEEPALIVE REQUEST.

In one embodiment, the second signaling includes a DIRECT LINK KEEPALIVE RESPONSE.

In one embodiment, the second signaling includes a DISCOVERY_REQUEST.

In one embodiment, the second signaling includes a DISCOVERY_RESPONSE.

In one embodiment, the second signaling includes a Direct Security Mode Command.

In one embodiment, the second signaling includes a Direct Security Mode Complete.

In one embodiment, the first logical channel identity is indicated by a Logical Channel Identity (LCID) included in the first MAC sub-header.

In one embodiment, the second logical channel identity is indicated by an LCID included in the second MAC sub-header.

In one embodiment, the first data packet is one MAC Service Data Unit (SDU).

In one embodiment, the first data packet is one Radio Link Layer (RLC) PDU.

In one embodiment, five Least Significant Bits (LSBs) of the target identity are used as five input bits of a security algorithm for the first data packet.

In one embodiment, a security algorithm of the first data packet includes a security algorithm of a Packet Data Convergence Protocol (PDCP) entity.

In one embodiment, five bits of the target identity are used as inputs of parameters BEARER[0] to BEARER[4] of the security algorithm.

In one embodiment, five least significant bits of the target identity are used as inputs of parameters BEARER[0] to BEARER[4] of the security algorithm.

In one subembodiment, the security algorithm includes encryption and/integrity protection.

In one subembodiment, the security algorithm is used for generating a key for encryption and/integrity protection.

In one embodiment, a security algorithm of the first data packet includes 128-NEA1 and 128-NIA1.

In one embodiment, a security algorithm of the first data packet includes 128-NEA2 and 128-NIA2.

In one embodiment, a security algorithm of the first data packet includes 128-NEA3 and 128-NIA3.

In one embodiment, a security algorithm of the first data packet includes 128-EEA1 and 128-EIA1.

In one embodiment, a security algorithm of the first data packet includes 128-EEA2 and 128-EIA2.

In one embodiment, a security algorithm of the first data packet includes 128-EEA3 and 128-EIA3.

In one embodiment, a security algorithm of the first data packet includes SNOW.

In one embodiment, a security algorithm of the first data packet includes AES.

In one embodiment, a security algorithm of the first data packet includes ZUC.

In one embodiment, the first data packet is forwarded or relayed through a sidelink.

In one embodiment, the first logical channel identity and the second logical channel identity are different in at least one bit.

In one embodiment, the first logical channel identity and the second logical channel identity are different in length.

In one embodiment, the second signaling indicates explicitly a target identity.

In one embodiment, the target identity is indicated by a sl-MAC-LogicalChannelConfigPC5 included in the second signaling.

In one embodiment, the target identity is one field in the second signaling.

In one embodiment, the second signaling caries five least significant bits of the target identity.

In one embodiment, the first MAC PDU is transmitted through a sidelink.

In one embodiment, the second MAC PDU is transmitted through a sidelink.

In one embodiment, the first MAC PDU is transmitted through a PC5 interface.

In one embodiment, the second MAC PDU is transmitted through a PC5 interface.

In one embodiment, the first MAC PDU is transmitted through a Uu interface.

In one embodiment, the second MAC PDU is transmitted through a Uu interface.

In one embodiment, the first MAC PDU is transmitted through a PSSCH.

In one embodiment, the second MAC PDU is transmitted through a PSSCH.

In one embodiment, the first MAC PDU is transmitted through a DTCH.

In one embodiment, the second MAC PDU is transmitted through a DTCH.

In one embodiment, a generator of the second signaling is a node other than a transmitter of the second MAC PDU.

In one embodiment, a generator of the second signaling is the same as a generator of the first MAC PDU.

In one embodiment, the second signaling and the first data packet are generated by one same PDCP entity.

In one embodiment, five least significant bits of the target identity are used for a security algorithm of the first data packet.

In one embodiment, the first data packet includes a first PDCP PDU, and the target identity is used for a security algorithm of the first PDCP PDU.

In one subembodiment, the security algorithm of the first PDCP PDU includes encryption.

In one subembodiment, the security algorithm of the first PDCP PDU includes integrity protection.

In one subembodiment, the first PDCP PDU carries an RRC signaling.

In one subembodiment, the first PDCP PDU carries an SDAP PDU.

In one subembodiment, the first data packet is the first PDCP PDU.

In one embodiment, the first data packet includes a MAC SDU.

In one embodiment, the first data packet includes an RLC PDU.

In one embodiment, the first data packet includes an RLC SDU.

In one embodiment, the first data packet includes a PDCP PDU.

In one embodiment, the first data packet includes at least partial bits of the first PDCP PDU.

In one embodiment, the second MAC PDU only includes a logical channel identity other than the first logical channel identity.

In one embodiment, the second MAC sub-PDU only includes a logical channel identity other than the first logical channel identity.

In one embodiment, the first MAC PDU only includes a logical channel identity other than the second logical channel identity.

In one embodiment, the first MAC sub-PDU only includes a logical channel identity other than the second logical channel identity.

In one embodiment, the first MAC PDU only includes a logical channel identity other than the target identity.

In one embodiment, the first MAC sub-PDU only includes a logical channel identity other than the target identity.

In one embodiment, the second MAC PDU only includes a logical channel identity other than the target identity.

In one embodiment, the second MAC sub-PDU only includes a logical channel identity other than the target identity.

In one embodiment, the second signaling does not include an sl-RLC-ConfigPC5, but includes an sl-MACLogicalChannelConfigPC5.

In one embodiment, the target identity is an LCID.

In one embodiment, a radio bearer to carry the first data packet is only associated to a logical channel identity other than the target identity.

In one embodiment, a radio bearer to carry the first data packet is only associated to a logical channel other than the logical channel determined by the target identity.

In one embodiment, a radio bearer to carry the first data packet is independent of the target identity.

In one embodiment, the phrase that the target identity is used for a security algorithm of the first data packet includes: the target identity is used for encryption of the first data packet.

In one embodiment, the phrase that the target identity is used for a security algorithm of the first data packet includes: the target identity is used for integrity protection of the first data packet.

In one embodiment, the phrase that the target identity is used for a security algorithm of the first data packet includes: five least significant bits of the target identity are used for encryption and/or integrity protection of the first data packet.

In one embodiment, the phrase that the target identity is used for a security algorithm of the first data packet includes: five least significant bits of the target identity are used by a PDCP entity for encryption and/or integrity protection of the first data packet.

In one embodiment, five least significant bits of the target identity are the same as five least significant bits of the first logical channel identity, and the target identity is different from the second logical channel identity.

In one subembodiment, the target identity is the same as the first logical channel identity.

In one subembodiment, at least one bit of the target identity other than the five least significant bits is different from a bit at a corresponding position of the first logical channel identity, the target identity and the first logical channel identity include a same number of bits, and the corresponding position refers to a pairwise correspondence from most significant bits to least significant bits.

In on subembodiment, the target identity and the first logical channel identity include different numbers of bits.

In one embodiment, five least significant bits of the target identity are the same as five least significant bits of the second logical channel identity, and the target identity is different from the first logical channel identity.

In one subembodiment, the target identity is the same as the second logical channel identity.

In one subembodiment, at least one bit of the target identity other than the five least significant bits is different from a bit at a corresponding position of the second logical channel identity, the target identity and the second logical channel identity include a same number of bits, and the corresponding position refers to a pairwise correspondence from most significant bits to least significant bits.

In on subembodiment, the target identity and the second logical channel identity include different numbers of bits.

In one embodiment, the target identity is a logical channel identity other than the first logical channel identity and the second logical channel identity.

In one embodiment, the first MAC PDU does not include the target identity.

In one embodiment, the second MAC PDU does not include the target identity.

In one embodiment, the target identity is one nominal logical channel identity.

In one embodiment, the target identity is used for identifying one nominal logical channel.

In one embodiment, the target identity is not associated to any established RLC bearer.

In one embodiment, the target identity is used for identifying a virtual logical channel between the first node and a generating node of the first MAC PDU.

In one embodiment, the second MAC sub-header includes at least partial bits of a second link layer identity and at least partial bits of a third link layer identity.

In one embodiment, the second MAC sub-header includes 16 most significant bits of the second link layer identity and 8 most significant bits of the third link layer identity.

In one embodiment, the first MAC sub-header includes at least partial bits of the second link layer identity and at least partial bits of the first link layer identity.

In one embodiment, the first MAC sub-header includes 8 most significant bits of the second link layer identity and 16 most significant bits of the first link layer identity.

In one embodiment, the first link layer identity, the second link layer identity and the third link layer identity are link layer identities respectively.

In one embodiment, the first link layer identity, the second link layer identity and the third link layer identity are Layer 2 IDs respectively.

In one embodiment, the first link layer identity, the second link layer identity and the third link layer identity are L2 IDs respectively.

In one embodiment, the first link layer identity, the second link layer identity and the third link layer identity are Layer-2 IDs respectively.

In one embodiment, the first link layer identity, the second link layer identity and the third link layer identity include 24 bits respectively.

In one embodiment, the third link layer identity is used for identifying the first node.

In one embodiment, the second link layer identity is used for identifying a transmitter of the second MAC PDU.

In one embodiment, the second link layer identity is used for identifying a generator of the second MAC PDU.

In one embodiment, the first link layer identity is used for identifying a transmitter of the first MAC PDU.

In one embodiment, the first link layer identity is used for identifying a generator of the first MAC PDU.

In one embodiment, the phrase that a first MAC PDU is received by a transmitter of the second MAC PDU includes the following meaning: the first data packet is relayed by a transmitter of the second MAC PDU.

In one embodiment, the phrase that a first MAC PDU is received by a transmitter of the second MAC PDU includes the following meaning: the first data packet is forwarded by a transmitter of the second MAC PDU.

In one embodiment, the phrase that a first MAC PDU is received by a transmitter of the second MAC PDU includes the following meaning: the first data packet is generated by a node other than a transmitter of the second MAC PDU.

In one embodiment, the second signaling indicates or configures that one field of a header of an adaption layer PDU carried by the second MAC sub-PDU carries or includes at least partial bits of the target identity.

In one embodiment, the second signaling indicates or configures that one field of a header of an adaption layer PDU carried by the second MAC sub-PDU carries or includes five least significant bits of the target identity.

In one embodiment, the first signaling indicates or configures that one field of a header of an adaption layer PDU carried by the second MAC sub-PDU carries or includes at least partial bits of the target identity.

In one embodiment, the first signaling indicates or configures that one field of a header of an adaption layer PDU carried by the second MAC sub-PDU carries or includes five least significant bits of the target identity.

In one embodiment, the first signaling indicates or configures that one field of a header of an adaption layer PDU carried by the fourth MAC sub-PDU carries or includes at least partial bits of the target identity.

In one embodiment, the first signaling indicates or configures that one field of a header of an adaption layer PDU carried by the fourth MAC sub-PDU carries or includes five least significant bits of the target identity.

In one embodiment, the first signaling indicates or configures that one field of a header of an adaption layer PDU carried by the fifth MAC sub-PDU carries or includes at least partial bits of the target identity.

In one embodiment, the first signaling indicates or configures that one field of a header of an adaption layer PDU carried by the fifth MAC sub-PDU carries or includes five least significant bits of the target identity.

In one embodiment, the fourth signaling indicates or configures that one field of a header of an adaption layer PDU carried by the third MAC sub-PDU carries or includes at least partial bits of the target identity.

In one embodiment, the fourth signaling indicates or configures that one field of a header of an adaption layer PDU carried by the third MAC sub-PDU carries or includes five least significant bits of the target identity.

In one embodiment, the first target signaling indicates or configures that one field of a header of an adaption layer PDU carried by the first MAC sub-PDU carries or includes at least partial bits of the target identity.

In one embodiment, the first target signaling indicates or configures that one field of a header of an adaption layer PDU carried by the first MAC sub-PDU carries or includes five least significant bits of the target identity.

In one embodiment, the second target signaling indicates or configures that one field of a header of an adaption layer PDU carried by the fourth MAC sub-PDU carries or includes at least partial bits of the target identity.

In one embodiment, the second target signaling indicates or configures that one field of a header of an adaption layer PDU carried by the fourth MAC sub-PDU carries or includes five least significant bits of the target identity.

In one embodiment, the target identity includes 5 bits.
In one embodiment, the target identity includes 6 bits.
In one embodiment, the target identity includes 8 bits.
In one embodiment, the target identity includes 12 bits.
In one embodiment, the target identity includes 16 bits.

In one embodiment, the second signaling is used for indicating a number of bits included in the target identity.

In one embodiment, the target identity includes a configurable number of bits.

In one embodiment, the target identity is a logical channel identity.

In one embodiment, the target identity is a link layer identity.

In one embodiment, the target identity is a Layer-2 ID of the first node.

In one embodiment, the target identity is a Layer-2 ID of a transmitter of the second signaling.

In one embodiment, the target identity is an Application Layer ID of the first node.

In one embodiment, the target identity is an Application Layer ID of a transmitter of the second signaling.

In one embodiment, the target identity is an identity of an RLC entity of the first node that processes an RLC PDU carried by the second MAC sub-PDU.

In one embodiment, the target identity is an identity of an RLC entity of a generator of the first data packet that generates an RLC PDU carried by the first MAC sub-PDU.

In one embodiment, the target identity is used for identifying an RLC entity that generates an RLC PDU included in the first MAC sub-PDU.

In one embodiment, the target identity is used for identifying an RLC entity that receives an RLC PDU included in the second MAC sub-PDU.

In one embodiment, the target identity is used for identifying a radio bearer associated to the first data packet.

In one embodiment, the target identity is used for identifying an RLC bearer between the first node and the third node.

In one embodiment, the target identity is used for identifying an RLC bearer between the first node and a transmitter of the second signaling.

In one embodiment, the target identity is used for identifying an adaption sublayer entity.

In one subembodiment, the adaption sublayer of the adaption sublayer entity identified by the target identity corresponds to the AP308 or AP358 in Embodiment 3.

In one subembodiment, the adaption sublayer entity identified by the target identity belongs to the first node.

In one subembodiment, the adaption sublayer entity identified by the target identity belongs to a generator of the first data packet.

In one subembodiment, the adaption sublayer entity identified by the target identity belongs to the third node or a generator of the second signaling.

In one embodiment, the target identity is used for identifying a PDCP entity.

In one subembodiment, the PDCP entity identified by the target identity belongs to the first node.

In one subembodiment, the PDCP entity identified by the target identity belongs to a generator of the first data packet.

In one subembodiment, the PDCP entity identified by the target identity belongs to the third node or a generator of the second signaling.

In one subembodiment, the PDCP entity identified by the target identity generates or receives the first data packet.

In one subembodiment, the PDCP entity identified by the target identity corresponds to a radio bearer applicable to the first data packet.

In one subembodiment, a radio bearer configuration included in the second signaling includes a configuration of the PDCP entity identified by the target identity.

In one embodiment, the target identity is used for identifying an interface between an adaption layer or adaption sublayer and the PDCP layer.

In one embodiment, the target identity is used for identifying a service provided by an adaption layer or adaption sublayer to a PDCP layer.

In one embodiment, the target identity is used for identifying a bearer provided by an adaption layer or adaption sublayer to a PDCP layer.

In one embodiment, the target identity is used for identifying a service provided by an adaption layer or adaption sublayer of a node determined by the first link layer identity to a PDCP layer.

In one embodiment, the target identity is used for identifying a service provided by an adaption layer or adaption sublayer of a node determined by the third link layer identity to a PDCP layer.

In one embodiment, the target identity is used for identifying an RLC bearer.

In one subembodiment, the RLC bearer identified by the target identity is an RLC bearer between the first node and the third node.

In one subembodiment, the RLC bearer identified by the target identity is an RLC bearer between the first node and a generator of the second signaling.

In one subembodiment, the RLC bearer identified by the target identity is an RLC bearer between a generator of the first MAC PDU and the first node.

In one embodiment, the target identify is used for identifying an adaption sublayer bearer.

In one embodiment, the target identify is used for identifying an adaption layer bearer.

In one embodiment, the target identify is used for identifying a radio bearer configuration index.

In one embodiment, the radio bearer configuration index identified by the target identity is used for indexing a configuration of a radio bearer occupied by the first MAC PDU.

In one embodiment, the radio bearer configuration index identified by the target identity is used for indexing a configuration of a radio bearer occupied by the first data packet.

In one embodiment, the target identity is a relay bearer identity.

In one embodiment, the target identity is a relay configuration index.

In one embodiment, the target identity is a relay bearer configuration index.

In one embodiment, the target identity is used for associating the first logical channel identity to the second logical channel identity.

In one embodiment, the target identity is used by a transmitter of the second MAC PDU to associate the first logical channel identity to the second logical channel identity.

In one embodiment, the second signaling does not include an sl-MAC-LogicalChannelConfigPC5.

In one embodiment, the first signaling does not include an sl-MAC-LogicalChannelConfigPC5.

In one embodiment, the second signaling includes an sl-RLC-ConfigPC5.

In one subembodiment, the sl-RLC-ConfigPC5 included in the second signaling is used for determining that an sl-RLC-ConfigPC5 included in the second target signaling uses a same RLC mode.

In one subembodiment, the second signaling indicates a first radio bearer, an sl-RLC-ConfigPC5 included in the second signaling does not trigger the first node to create an RLC entity; a transmission of the second target signaling or a reception of a feedback signaling of the second target signaling is used for creating an RLC entity associated to the first radio bearer, and the first data packet uses the first radio bearer.

In one subembodiment, the second signaling indicates a first radio bearer, an sl-sl-RLC-ConfigPC5 included in the second signaling triggers the first node to create a first RLC entity; the first RLC entity is associated to the first radio bearer, a peer RLC entity of the first RLC entity is at a node other than a generator of the second signaling; and the first data packet uses the first radio bearer.

Embodiment 1B

Figure 1B:
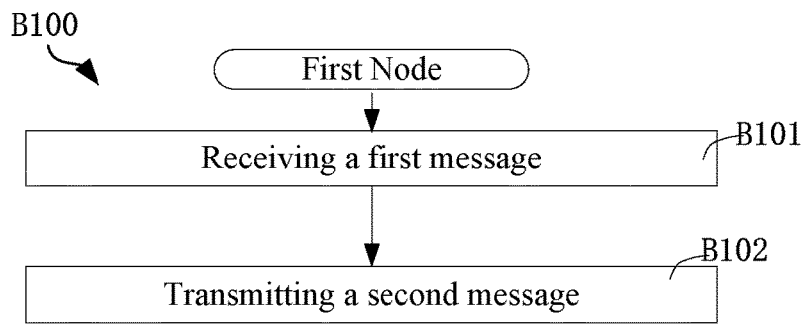
FIG. 1B is a flowchart of receiving a first message and transmitting a second message according to one embodiment of the disclosure.

Embodiment 1B illustrates a flowchart of receiving a first message and transmitting a second message according to one embodiment of the disclosure, as shown in FIG. 1B. In FIG. 1B, each box represents one step. In particular, the order of each box does not represent a specific precedence relationship in time between the steps.

In Embodiment 1B, the first node in the disclosure receives a first message in SB101, and transmits a second message in SB102; the first message including a first parameter set; the second message including a first parameter set and a second parameter set.

Herein, the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first node is a UE.

In one embodiment, the second node is a UE.

In one embodiment, the third node is a UE.

In one embodiment, the first node is a relay node.

In one embodiment, an interface between the first node and the second node is PC5.

In one embodiment, an interface between the first node and the third node is PC5.

In one embodiment, an interface between the third node and the second node is PC5.

In one embodiment, an interface between the first node and the third node is Uu.

In one embodiment, the first node and the second node perform communication through a sidelink.

In one embodiment, the first node and the third node perform communication through a sidelink.

In one embodiment, the third node and the second node perform communication through a sidelink.

In one embodiment, the link layer identity includes a link layer identifier.

In one embodiment, the link layer identity includes a link layer identity.

In one embodiment, the link layer identity includes a link layer ID.

In one embodiment, the link layer identity includes a Layer2 ID.

In one embodiment, the link layer identity includes a Layer-2 ID.

In one embodiment, the link layer identity includes a L2 ID.

In one embodiment, the PC5-S message includes an NAS signaling.

In one embodiment, the PC5-S message includes a v2X layer signaling.

In one embodiment, the PC5-S message includes a v2X application layer signaling.

In one embodiment, the PC5-S message includes an application layer signaling.

In one embodiment, the first link layer identity is the link layer identity.

In one embodiment, the second link layer identity is the link layer identity.

In one embodiment, the third link layer identity is the link layer identity.

In one embodiment, the first link layer identity determines the first node.

In one embodiment, the second link layer identity determines the second node.

In one embodiment, the third link layer identity determines the third node.

In one embodiment, the first message includes a communication connection establishment related message.

In one embodiment, the first message includes a link modification related message.

In one embodiment, the first message includes a security establishment related message.

In one embodiment, the first message includes a DIRECT LINK MODIFICATION REQUEST.

In one embodiment, the first message includes a DIRECT LINK MODIFICATION ACCEPT.

In one embodiment, the first message includes a DIRECT LINK KEEPALIVE REQUEST.

In one embodiment, the first message includes a DIRECT LINK KEEPALIVE RESPONSE.

In one embodiment, the first message includes a PROXIMITY_REQUEST.

In one embodiment, the first message includes a PROXIMITY_REQUEST_RESPONSE.

In one embodiment, the first message includes a PROXIMITY_ALERT.

In one embodiment, the first message includes a PROXIMITY_REQUEST_VALIDATION.

In one embodiment, the first message includes a PROXIMITY_REQUEST_VALIDATION_RESPONSE.

In one embodiment, the first message includes a DISCOVERY_UPDATE_REQUEST.

In one embodiment, the first message includes a DISCOVERY_UPDATE_RESPONSE.

In one embodiment, the first message includes a Direct Security Mode Command.

In one embodiment, the first message includes a Direct Security Mode Complete.

In one embodiment, the first message includes a Link Identifier Update Request.

In one embodiment, the first message includes a Link Identifier Update Response.

In one embodiment, the first message includes a Link Identifier Update Ack.

In one embodiment, the first message includes a DIRECT_REKEYING_REQUEST.

In one embodiment, the first message includes a DIRECT_REKEYING_RESPONSE.

In one embodiment, the first message includes a DIRECT_REKEYING_TRIGGER.

In one embodiment, the first message includes a REMOTE_UE_INFO_REQUEST.

In one embodiment, the first message includes a REMOTE_UE_INFO_RESPONSE.

In one embodiment, the first message includes a DIRECT_COMMUNICATION_REQUEST.

In one embodiment, the first message includes a DIRECT_COMMUNICATION_REJECT.

In one embodiment, the first message includes a DIRECT_COMMUNICATION_ACCEPT.

In one embodiment, the second message includes a communication connection establishment related message.

In one embodiment, the second message includes a link modification related message.

In one embodiment, the second message includes a security establishment related message.

In one embodiment, the first link layer identity is the link layer identity.

In one embodiment, the second link layer identity is the link layer identity.

In one embodiment, the third link layer identity is the link layer identity.

In one embodiment, the first link layer identity determines the first node.

In one embodiment, the second link layer identity determines the second node.

In one embodiment, the third link layer identity determines the third node.

In one embodiment, the first message includes a communication connection establishment related message.

In one embodiment, the first message includes a link modification related message.

In one embodiment, the first message includes a security establishment related message.

In one embodiment, the first message includes a PC5_DISCOVERY.

In one embodiment, the second message includes a PC5_DISCOVERY.

In one embodiment, the first message includes a DIRECT LINK MODIFICATION REQUEST.

In one embodiment, the second message includes a DIRECT LINK MODIFICATION ACCEPT.

In one embodiment, the first message includes a DIRECT LINK KEEPALIVE REQUEST.

In one embodiment, the first message includes a DIRECT LINK KEEPALIVE RESPONSE.

In one embodiment, the first message includes a PROXIMITY_REQUEST.

In one embodiment, the first message includes a PROXIMITY_REQUEST_RESPONSE.

In one embodiment, the first message includes a PROXIMITY_ALERT.

In one embodiment, the first message includes a PROXIMITY_REQUEST_VALIDATION.

In one embodiment, the first message includes a PROXIMITY_REQUEST_VALIDATION_RESPONSE.

In one embodiment, the first message includes a DISCOVERY_UPDATE_REQUEST.

In one embodiment, the first message includes a DISCOVERY_UPDATE_RESPONSE.

In one embodiment, the first message includes a Direct Security Mode Command.

In one embodiment, the first message includes a Direct Security Mode Complete.

In one embodiment, the first message includes a Link Identifier Update Request.

In one embodiment, the first message includes a Link Identifier Update Response.

In one embodiment, the first message includes a Link Identifier Update Ack.

In one embodiment, the first message includes a DIRECT_REKEYING_REQUEST.

In one embodiment, the first message includes a DIRECT_REKEYING_RESPONSE.

In one embodiment, the first message includes a DIRECT_REKEYING_TRIGGER.

In one embodiment, the first message includes a REMOTE_UE_INFO_REQUEST.

In one embodiment, the first message includes a REMOTE_UE_INFO_RESPONSE.

In one embodiment, the first parameter set includes at least one parameter.

In one embodiment, the second parameter set includes at least one parameter.

In one embodiment, an intersection of the first parameter set and the second parameter is empty.

In one embodiment, the first parameter set includes an application layer ID of the first node.

In one embodiment, the first parameter set includes an application layer ID of the second node.

In one embodiment, the first parameter set includes an application layer ID of the third node.

In one embodiment, the first parameter set includes a $K_D$ identity.

In one embodiment, the first parameter set includes a $K_{D\text{-}sess}$ identity.

In one embodiment, the first parameter set includes a user security capability.

In one embodiment, the first parameter set includes a signature.

In one embodiment, the first parameter set includes a local IP address.

In one embodiment, the first parameter set includes user information.

In one embodiment, the first parameter set includes a nonce used only once.

In one embodiment, the first parameter set includes a relay identity.

In one embodiment, the first parameter set includes a relay code.

In one embodiment, the first parameter set includes a network identifier.

In one embodiment, the first parameter set includes an application server identifier.

In one embodiment, the second parameter set includes an application layer ID of the first node.

In one embodiment, the second parameter set includes an application layer ID of the second node.

In one embodiment, the second parameter set includes an application layer ID of the third node.

In one embodiment, the second parameter set includes a $K_D$ identity.

In one embodiment, the second parameter set includes a $K_{D\text{-}sess}$ identity.

In one embodiment, the second parameter set includes a user security capability.

In one embodiment, the second parameter set includes a signature.

In one embodiment, the second parameter set includes a local IP address.

In one embodiment, the second parameter set includes user information.

In one embodiment, the second parameter set includes a nonce used only once.

In one embodiment, the second parameter set includes a relay identity.

In one embodiment, the second parameter set includes a relay code.

In one embodiment, the second parameter set includes a network identifier.

In one embodiment, the second parameter set includes an application server identifier.

In one embodiment, the first key includes a first $K_D$ identity, and the first $K_D$ identity is one $K_D$ identity.

In one embodiment, the first key includes a first $K_{D\text{-}sess}$ identity, and the first $K_{D\text{-}sess}$ identity is one $K_{D\text{-}sess}$ identity.

In one embodiment, the first parameter set includes all bits of the first $K_D$ identity.

In one embodiment, the first parameter set includes partial bits of the first $K_D$ identity.

In one embodiment, the first $K_{D\text{-}sess}$ identity is used for determining a key of communication from the second node to the third node.

In one embodiment, the first parameter set includes N1 most significant bits of the first $K_{D\text{-}sess}$ identity, wherein N1 is a positive integer.

In one subembodiment, N1 is equal to 8.

In one subembodiment, N1 is equal to 16.

In one subembodiment, N2 is equal to 8.

In one subembodiment, N2 is equal to 16.

In one embodiment, the first parameter set includes N2 least significant bits of the first $K_{D\text{-}sess}$ identity, wherein N2 is a positive integer.

In one embodiment, the second key includes a second $K_D$ identity, and the second $K_D$ identity is one $K_D$ identity.

In one embodiment, the second key includes a second $K_{D\text{-}sess}$ identity, and the second $K_D$-secs identity is one $K_{D\text{-}sess}$ identity.

In one embodiment, the second $K_{D\text{-}sess}$ identity is used for determining a key of communication from the first node to the third node.

In one embodiment, the second parameter set includes all bits of the second $K_D$ identity.

In one embodiment, the second parameter set includes partial bits of the second $K_D$ identity.

In one embodiment, the second parameter set includes N3 most significant bits of the second $K_{D\text{-}sess}$ identity, wherein N3 is a positive integer.

In one embodiment, the second parameter set includes N4 least significant bits of the second $K_{D\text{-}sess}$ identity, wherein N4 is a positive integer.

In one subembodiment, N3 is equal to 8.

In one subembodiment, N3 is equal to 16.

In one subembodiment, N4 is equal to 8.

In one subembodiment, N4 is equal to 16.

In one embodiment, the first message is used for establishing a connection between the second node and the third node for a PC5 reference point.

In one embodiment, the first message is used for establishing an L2 connection between the second node and the third node for a PC5 reference point.

In one embodiment, the first message is used for establishing a unicast connection between the second node and the third node.

In one embodiment, the first message is used for establishing a communication link between the second node and the third node.

In one embodiment, the second message is used for establishing a connection between the first node and the third node for a PC5 reference point.

In one embodiment, the second message is used for establishing an L2 connection between the first node and the third node for a PC5 reference point.

In one embodiment, the second message is used for establishing a unicast connection between the first node and the third node.

In one embodiment, the second message is used for establishing a communication link between the first node and the third node.

In one embodiment, the security establishment includes establishing a security connection.

In one embodiment, the security establishment includes establishing a security context.

In one embodiment, the security establishment includes determining a security mode.

In one embodiment, the security establishment includes a security establishment.

In one embodiment, the security establishment includes rekeying.

In one embodiment, the security establishment includes an authentication.

In one embodiment, the security establishment includes determining the first key.

In one subembodiment, the action of determining the first key includes Create.

In one subembodiment, the action of determining the first key includes Establish.

In one subembodiment, the action of determining the first key includes Generate.

In one subembodiment, the action of determining the first key includes Exchange.

In one subembodiment, the action of determining the first key includes Update.

In one subembodiment, the action of determining the first key includes Confirm.

In one embodiment, the security establishment includes determining the second key.

In one subembodiment, the action of determining the second key includes Create.

In one subembodiment, the action of determining the second key includes Establish.

In one subembodiment, the action of determining the second key includes Generate.

In one subembodiment, the action of determining the second key includes Exchange.

In one subembodiment, the action of determining the second key includes Update.

In one subembodiment, the action of determining the second key includes Confirm.

Embodiment 2

Figure 2:
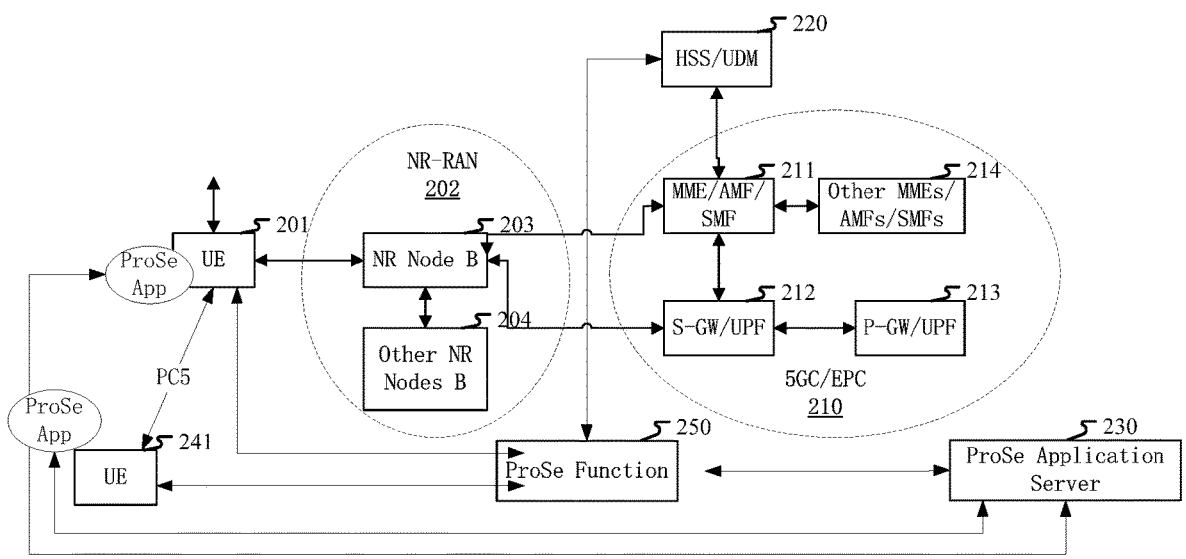
FIG. 2 is a diagram illustrating a network architecture according to one embodiment of the disclosure.

Embodiment 2 illustrates a diagram of a network architecture according to one embodiment of the disclosure, as shown in FIG. 2. FIG. 2 illustrates a V2X communication architecture under 5G New Radio (NR), Long-Term Evolution (LTE), Long-Term Evolution Advanced (LTE-A) system architectures. The 5G NR or LTE network architecture may be called a 5G System (5GS)/Evolved Packet System (EPS) or some other appropriate terms.

The V2X communication architecture in Embodiment 2 includes a UE 201, a UE 241, a Next Generation-Radio Access Network (NG-RAN) 202, an 5G-Core Network/Evolved Packet Core (5GC/EPC) 210, a Home Subscriber Server/Unified Data Management (HSS/UDM) 220, a ProSe function 250 and a ProSe application server 230. The V2X communication architecture may be interconnected with other access networks. For simple description, the entities/interfaces are not shown. As shown in FIG. 2, the V2X communication architecture provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5GC/EPC 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 includes a Mobility Management Entity/Authentication Management Field/Session Management Function (MME/AMF/SMF) 211, other MMEs/AMFs/SMFs 214, a Service Gateway (S-GW)/User Plane Function (UPF) 212 and a Packet Data Network Gateway/UPF (P-GW/UPF) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet service 230. The Internet service 230 includes IP services corresponding to operators, specifically including internet, intranet, IP Multimedia Subsystems (IP IMSs) and PS Streaming Services (PSSs). The ProSe function 250 is a logical function for the network relative behaviors required by Proximity-based Services, including a Direct Provisioning Function (DPF), a Direct Discovery Name Management Function, a EPC-level Discovery ProSe Function, etc. The ProSe application server 230 has functions of storing an EPC ProSe user identifier, mapping between an application layer user identifier and an EPC ProSe user identifier, assigning a ProSe limited code suffix pool, etc.

In one embodiment, the UE 201 and the UE 241 are connected through a PC5 reference point.

In one embodiment, the ProSe function 250 is connected to the UE201 and the UE 241 through a PC3 reference point respectively.

In one embodiment, the ProSe function 250 is connected to the ProSe application server 230 through a PC2 reference point.

In one embodiment, the ProSe application server 230 is connected to a ProSe application of the UE 201 and a ProSe application connection of the UE 241 a through PC1 reference point respectively.

In one embodiment, the second node, the first node and the third node in the disclosure are an NR node B, a UE 201 and a UE 241 respectively.

In one embodiment, the first node and the second node in the disclosure are a UE 201 and a UE 241 respectively.

In one embodiment, the first node and the third node in the disclosure are a UE 201 and a UE 241 respectively.

In one embodiment, the second node and the third node in the disclosure are a UE 201 and a UE 241 respectively.

In one embodiment, a radio link between the UE 201 and the UE241 corresponds to a Sidelink (SL) in the disclosure.

In one embodiment, a radio link from the UE201 to the NR node B is an uplink.

In one embodiment, a radio link from the NR node B to the UE 201 is a downlink.

In one embodiment, the UE 201 supports relay transmission.

In one embodiment, the UE 241 supports relay transmission.

In one embodiment, the UE 201 includes transportation tools containing cars.

In one embodiment, the UE 241 includes transportation tools containing cars.

In one embodiment, the gNB 203 is a Marco Cellular base station.

In one embodiment, the gNB 203 is a Micro cell base station.

In one embodiment, the gNB 203 is a Pico cell base station.

In one embodiment, the gNB 203 is a flying platform equipment.

In one embodiment, the gNB 203 is a satellite equipment.

Embodiment 3

Figure 3:
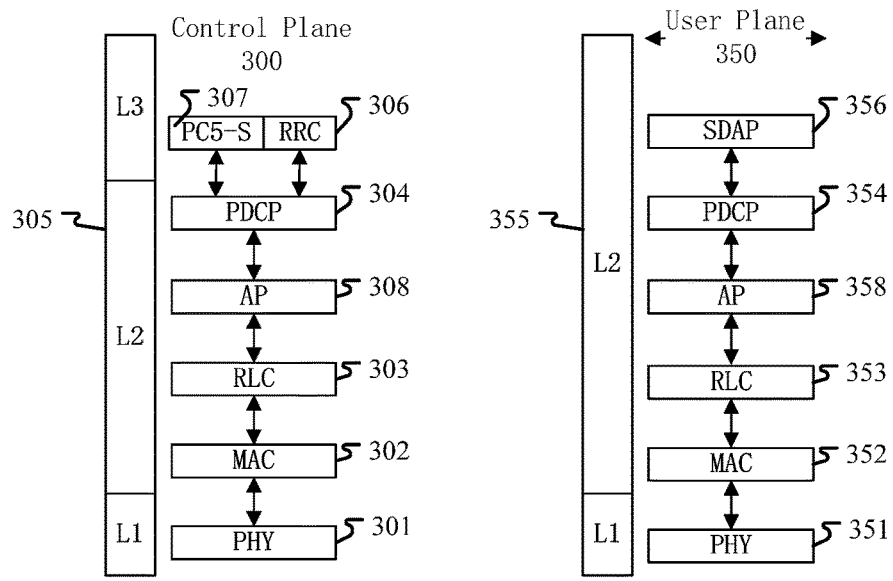
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first node (UE, gNB or satellite or aircraft in NTN) and a second node (gNB, UE or satellite or aircraft in NTN) or between two UEs is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first node and the second node and between two UEs over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second node. The PDCP sublayer 304 provides multiplexing between different radio bearers and logical channels. The PDCP sublayer 304 also provides security by encrypting packets and provides support for handover of the first node between second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first node. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second node and the first node. A PC5 Signaling Protocol (PC5-S) sublayer 307 is responsible for processing signal protocols at the PC5 interface. The radio protocol architecture of the user plane 350 includes a Layer 1 (L1 layer) and a Layer 2 (L2 layer); the radio protocol architecture for the first node and the second node in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first node may include several higher layers above the L2 Layer 355, including a network layer (i.e. IP layer) terminated at the P-GW on the network side and an application layer terminated at the other end (i.e. a peer UE, a server, etc.) of the connection. For UEs involving relay services, the control plane may further include an adaption sublayer AP308, and the user plane may include an adaption sublayer AP358. The introduction of the adaption layer facilitates a lower layer, for example, a MAC layer and an RLC layer, to multiplex and/or distinguish the data coming from multiple source UEs. In addition, the adaption sublayer AP308 and AP358 can serve as sublayers in PDCP304 and PDCP354 respectively.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the radio protocol architecture shown in FIG. 3 is applicable to the third node in the disclosure.

In one embodiment, the first signaling in the disclosure is generated on the AP358 or AP308 or RRC306 or PC5-S307.

In one embodiment, the second signaling in the disclosure is generated on the AP358 or AP308 or RRC306 or PC5-S307.

In one embodiment, the second feedback signaling in the disclosure is generated on the AP358 or AP308 or RRC306 or PC5-S307.

In one embodiment, the third signaling in the disclosure is generated on the AP358 or AP308 or RRC306 or PC5-S307.

In one embodiment, the fourth signaling in the disclosure is generated on the AP358 or AP308 or RRC306 or PC5-S307.

In one embodiment, the first target signaling in the disclosure is generated on the RRC306 or PC5-S307.

In one embodiment, the second target signaling in the disclosure is generated on the RRC306 or PC5-S307.

In one embodiment, the 2ath target signaling in the disclosure is generated on the RRC306 or PC5-S307.

In one embodiment, the 3ath target signaling in the disclosure is generated on the RRC306 or PC5-S307.

In one embodiment, the first MAC PDU in the disclosure is generated on the MAC302 or MAC352.

In one embodiment, the second MAC PDU in the disclosure is generated on the MAC302 or MAC352.

In one embodiment, the third MAC PDU in the disclosure is generated on the MAC302 or MAC352.

In one embodiment, the fourth MAC PDU in the disclosure is generated on the MAC302 or MAC352.

In one embodiment, the first message in the disclosure is generated on the PC5-S307.

In one embodiment, the second message in the disclosure is generated on the PC5-S307.

In one embodiment, the third message in the disclosure is generated on the PC5-S307.

In one embodiment, the fourth message in the disclosure is generated on the PC5-S307.

In one embodiment, the fifth message in the disclosure is generated on the PC5-S307.

In one embodiment, the sixth message in the disclosure is generated on the PC5-S307.

In one embodiment, the seventh message in the disclosure is generated on the PC5-S307.

Embodiment 4

Figure 4:
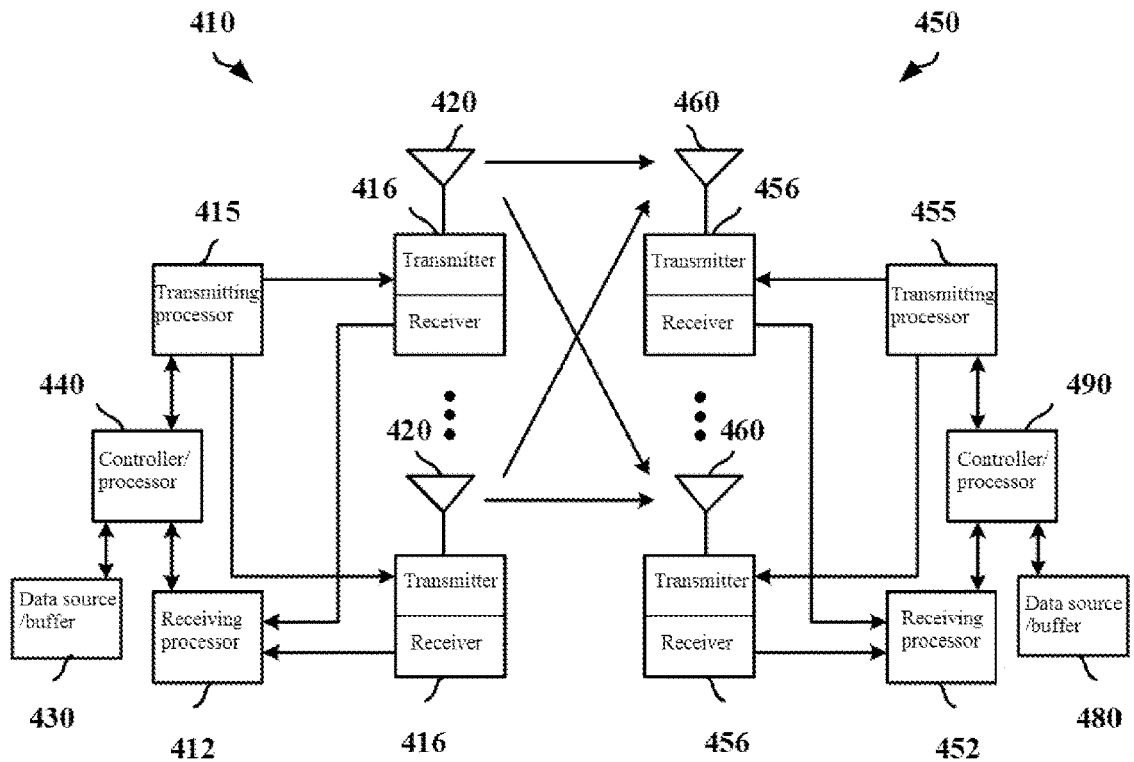
FIG. 4 is a diagram illustrating a first node, a second node and a third node according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 456 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a second signaling and a second MAC PDU, the second signaling indicating a target identity; wherein the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the first communication equipment 450 includes a memory that stores a computer readable instruction program. The computer readable instruction program generates an action when executed by at least one processor. The action includes receiving a second signaling and a second MAC PDU, the second signaling indicating a target identity; wherein the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least receives a first MAC PDU, and transmits a second MAC PDU; wherein the second MAC PDU includes a second MAC sub-PDU, the second MAC sub-PDU includes a second MAC sub-header and a first data packet, and the second MAC sub-header includes a second logical channel identity; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; a target identity is different from at least one of the first logical channel identity and the second logical channel identity, and the target identity is used for a security algorithm of the first data packet.

In one embodiment, the second communication equipment 410 includes a memory that stores a computer readable instruction program. The computer readable instruction program generates an action when executed by at least one processor. The action includes: receiving a first MAC PDU, and transmitting a second MAC PDU; wherein the second MAC PDU includes a second MAC sub-PDU, the second MAC sub-PDU includes a second MAC sub-header and a first data packet, and the second MAC sub-header includes a second logical channel identity; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; a target identity is different from at least one of the first logical channel identity and the second logical channel identity, and the target identity is used for a security algorithm of the first data packet.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a second signaling and a first MAC PDU, the second signaling indicates a target identity; wherein the first MAC PDU includes a first MAC sub-PDU, the first MAC sub-PDU includes a first MAC sub-header and a first data packet, and the first MAC sub-header includes a first logical channel identity; the first MAC PDU is used for generating a second MAC PDU; the first MAC PDU is received by a transmitter of the second MAC PDU; the second MAC PDU includes a second MAC sub-PDU, the second MAC sub-PDU includes a second MAC sub-header and the first data packet, and the second MAC sub-header includes a second logical channel identity; the first logical channel identity is different from the second logical channel identity; the target identity is different from at least one of the first logical channel identity and the second logical channel identity, and the target identity is used for a security algorithm of the first data packet.

In one embodiment, the second communication equipment 410 includes a memory that stores a computer readable instruction program. The computer readable instruction program generates an action when executed by at least one processor. The action includes: transmitting a second signaling and a first MAC PDU, the second signaling indicates a target identity; wherein the first MAC PDU includes a first MAC sub-PDU, the first MAC sub-PDU includes a first MAC sub-header and a first data packet, and the first MAC sub-header includes a first logical channel identity; the first MAC PDU is used for generating a second MAC PDU; the first MAC PDU is received by a transmitter of the second MAC PDU; the second MAC PDU includes a second MAC sub-PDU, the second MAC sub-PDU includes a second MAC sub-header and the first data packet, and the second MAC sub-header includes a second logical channel identity; the first logical channel identity is different from the second logical channel identity; the target identity is different from at least one of the first logical channel identity and the second logical channel identity, and the target identity is used for a security algorithm of the first data packet.

In one embodiment, the first communication equipment 450 corresponds to the first node in the disclosure.

In one embodiment, the second communication equipment 410 corresponds to the second node in the disclosure.

In one embodiment, the second communication equipment 410 corresponds to the third node in the disclosure.

In one embodiment, the first communication equipment 450 is one UE.

In one embodiment, the first communication equipment 450 is one vehicle terminal.

In one embodiment, the second communication equipment 410 is one UE.

In one embodiment, the second communication equipment 410 is one vehicle terminal.

In one embodiment, the receiver 456 (including antenna 460), the receiving processor 452 and the controller/processor 490 are used for receiving the second MAC PDU in the disclosure.

In one embodiment, the receiver 456 (including antenna 460), the receiving processor 452 and the controller/processor 490 are used for receiving the third MAC PDU in the disclosure.

In one embodiment, the receiver 456 (including antenna 460), the receiving processor 452 and the controller/processor 490 are used for receiving the second signaling in the disclosure.

In one embodiment, the receiver 456 (including antenna 460), the receiving processor 452 and the controller/processor 490 are used for receiving the 2ath target signaling in the disclosure.

In one embodiment, the transmitter 456 (including antenna 460), the transmitting processor 455 and the controller/processor 490 are used for transmitting the first signaling in the disclosure.

In one embodiment, the transmitter 456 (including antenna 460), the transmitting processor 455 and the controller/processor 490 are used for transmitting the second feedback signaling in the disclosure.

In one embodiment, the transmitter 456 (including antenna 460), the transmitting processor 455 and the controller/processor 490 are used for transmitting the second target signaling in the disclosure.

In one embodiment, the transmitter 456 (including antenna 460), the transmitting processor 455 and the controller/processor 490 are used for transmitting the fourth MAC PDU in the disclosure.

In one embodiment, the transmitter 416 (including antenna 420), the transmitting processor 412 and the controller/processor 440 are used for transmitting the first MAC PDU in the disclosure.

In one embodiment, the transmitter 416 (including antenna 420), the transmitting processor 412 and the controller/processor 440 are used for transmitting the second MAC PDU in the disclosure.

In one embodiment, the transmitter 416 (including antenna 420), the transmitting processor 412 and the controller/processor 440 are used for transmitting the third MAC PDU in the disclosure.

In one embodiment, the transmitter 416 (including antenna 420), the transmitting processor 412 and the controller/processor 440 are used for transmitting the first target signaling in the disclosure.

In one embodiment, the transmitter 416 (including antenna 420), the transmitting processor 412 and the controller/processor 440 are used for transmitting the 3ath target signaling in the disclosure.

In one embodiment, the transmitter 416 (including antenna 420), the transmitting processor 412 and the controller/processor 440 are used for transmitting the 2ath target signaling in the disclosure.

In one embodiment, the receiver 416 (including antenna 420), the receiving processor 412 and the controller/processor 440 are used for receiving the fourth MAC PDU in the disclosure.

In one embodiment, the receiver 416 (including antenna 420), the receiving processor 412 and the controller/processor 440 are used for receiving the first MAC PDU in the disclosure.

In one embodiment, the receiver 416 (including antenna 420), the receiving processor 412 and the controller/processor 440 are used for receiving the first target signaling in the disclosure.

In one embodiment, the receiver 416 (including antenna 420), the receiving processor 412 and the controller/processor 440 are used for receiving the second target signaling in the disclosure.

In one embodiment, the receiver 416 (including antenna 420), the receiving processor 412 and the controller/processor 440 are used for receiving the 3ath target signaling in the disclosure.

In one embodiment, the receiver 416 (including antenna 420), the receiving processor 412 and the controller/processor 440 are used for receiving the second feedback signaling in the disclosure.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first message, the first message including a first parameter set, and transmits a second message, the second message including a first parameter set and a second parameter set; wherein the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first communication equipment 450 includes a memory that stores a computer readable instruction program. The computer readable instruction program generates an action when executed by at least one processor. The action includes receiving a first message, the first message including a first parameter set, and transmitting a second message, the second message including a first parameter set and a second parameter set; wherein the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first message, the first message including a first parameter set, wherein the first parameter set is used for a security establishment between a second node and a third node; the second node is identified by a second link layer identity, and the third node is identified by a third link layer identity; the first message is used for triggering a second message, and the second message includes a first parameter set and a second parameter set; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the second communication equipment 410 includes a memory that stores a computer readable instruction program. The computer readable instruction program generates an action when executed by at least one processor. The action includes transmitting a first message, the first message including a first parameter set, wherein the first parameter set is used for a security establishment between a second node and a third node; the second node is identified by a second link layer identity, and the third node is identified by a third link layer identity; the first message is used for triggering a second message, and the second message includes a first parameter set and a second parameter set; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the first communication equipment 450 is one vehicle terminal.

In one embodiment, the second communication equipment 410 is one UE.

In one embodiment, the second communication equipment 410 is one vehicle terminal.

In one embodiment, the receiver 456 (including antenna 460), the receiving processor 452 and the controller/processor 490 are used for receiving the first message in the disclosure.

In one embodiment, the receiver 456 (including antenna 460), the receiving processor 452 and the controller/processor 490 are used for receiving the third message in the disclosure.

In one embodiment, the receiver 456 (including antenna 460), the receiving processor 452 and the controller/processor 490 are used for receiving the fifth message in the disclosure.

In one embodiment, the receiver 456 (including antenna 460), the receiving processor 452 and the controller/processor 490 are used for receiving the first MAC PDU in the disclosure.

In one embodiment, the transmitter 456 (including antenna 460), the transmitting processor 455 and the controller/processor 490 are used for transmitting the second message in the disclosure.

In one embodiment, the transmitter 456 (including antenna 460), the transmitting processor 455 and the controller/processor 490 are used for transmitting the fourth message in the disclosure.

In one embodiment, the transmitter 456 (including antenna 460), the transmitting processor 455 and the controller/processor 490 are used for transmitting the sixth message in the disclosure.

In one embodiment, the transmitter 456 (including antenna 460), the transmitting processor 455 and the controller/processor 490 are used for transmitting the seventh message in the disclosure.

In one embodiment, the transmitter 456 (including antenna 460), the transmitting processor 455 and the controller/processor 490 are used for transmitting the second MAC PDU in the disclosure.

In one embodiment, the transmitter 416 (including antenna 420), the transmitting processor 412 and the controller/processor 440 are used for transmitting the first MAC PDU in the disclosure.

In one embodiment, the transmitter 416 (including antenna 420), the transmitting processor 412 and the controller/processor 440 are used for transmitting the first message in the disclosure.

In one embodiment, the receiver 416 (including antenna 420), the receiving processor 412 and the controller/processor 440 are used for receiving the fourth message in the disclosure.

In one embodiment, the receiver 416 (including antenna 420), the receiving processor 412 and the controller/processor 440 are used for receiving the seventh message in the disclosure.

Embodiment 5A

Figure 5A:
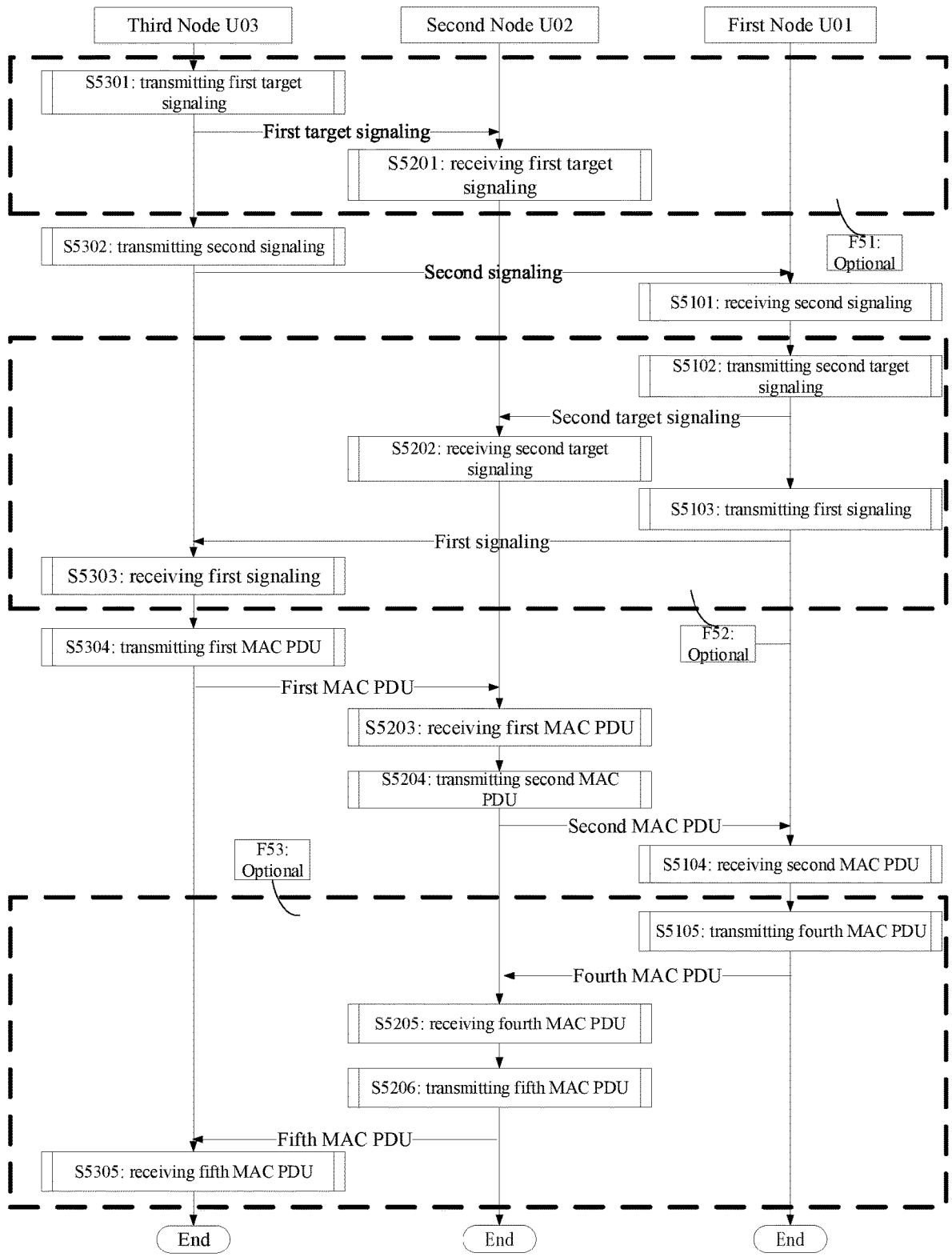
FIG. 5A is a flowchart of transmission according to one embodiment of the disclosure.

Embodiment 5A illustrates a flowchart of transmission of a radio signal according to one embodiment of the disclosure, as shown in FIG. 5A. In FIG. 5A, U01 corresponds to the first node in the disclosure, U02 corresponds to the second node in the disclosure, and U03 corresponds to the third node in the disclosure; in particular, the sequence in the present embodiment does not limit the sequence of signal transmission and the sequence of implementation in the disclosure, and steps in F51, F52 and F53 are optional.

The first node U01 receives a second signaling in S5101, transmits a second target signaling in S5102, transmits a first signaling in S5103, receives a second MAC PDU in S5104, and transmits a fourth MAC PDU in S5105.

The second node U02 receives a first target signaling in S5201, receives a second target signaling in S5202, receives a first MAC PDU in S5203, transmits a second MAC PDU in S5204, receives a fourth MAC PDU in S5205, and transmits a fifth MAC PDU in S5206.

The third node U03 transmits a first target signaling in S5301, transmits a second signaling in S5302, receives a first signaling in S5303, transmits a first MAC PDU in S5304, and receives a fifth MAC PDU in S5305.

In Embodiment 5A, the second signaling indicates a target identity; the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, a communication interface between the first node U01 and the second node U02 is PC5.

In one embodiment, a communication interface between the first node U01 and the third node U03 is PC5.

In one embodiment, a communication interface between the third node U03 and the second node U02 is PC5.

In one embodiment, a communication interface between the first node U01 and the second node U02 is Uu.

In one embodiment, a communication interface between the first node U01 and the third node U03 is Uu.

In one embodiment, a communication interface between the third node U03 and the second node U02 is Uu.

In one embodiment, the second node U02 is a relay node between the first node U01 and the third node U03.

In one embodiment, the second node U02 is a Layer2 (L2) relay node between the first node U01 and the third node U03.

In one embodiment, the second logical channel identity includes 5 bits.

In one embodiment, the second logical channel identity includes 6 bits.

In one embodiment, the second logical channel identity includes P1 bits, wherein P1 is an integer greater than 6.

In one embodiment, the first logical channel identity includes 5 bits.

In one embodiment, the first logical channel identity includes 6 bits.

In one embodiment, the first logical channel identity includes P2 bits, wherein P2 is an integer greater than 6.

In one embodiment, a name of the target identity is LCID.

In one embodiment, a name of the target identity is BEARER.

In one embodiment, a name of the target identity is RLCBEARERID.

In one embodiment, a name of the target identity is APID.

In one embodiment, a name of the target identity is AdaptationLayerID.

In one embodiment, the target identity includes 5 bits.

In one embodiment, the target identity includes 6 bits.

In one embodiment, the target identity includes P3 bits, wherein P3 is an integer greater than 6.

In one embodiment, the target identity includes 8 bits.

In one embodiment, a number of bits included in the target identity is different from a number of bits included in the first logical channel identity.

In one embodiment, a number of bits included in the target identity is different from a number of bits included in the second logical channel identity.

In one embodiment, one of the first logical channel identity and the second logical channel identity is used for determining the target identity.

In one embodiment, five least significant bits of the first logical channel identity are determined as five least significant bits of the target identity.

In one embodiment, five least significant bits of the second logical channel identity are determined as five least significant bits of the target identity.

In one embodiment, the first identity is an identity indicated by an adaption layer.

In one embodiment, the target identity and the first identity appear in one same message.

In one embodiment, the target identity and the first identity appear in one same message.

In one embodiment, the target identity is specific to the first identity.

In one embodiment, the target identity is specific to the first identity.

In one embodiment, the second signaling indicates all bits of the first identity.

In one embodiment, the second signaling indicates 8 bits of the first identity.

In one embodiment, the second signaling indicates 16 bits of the first identity.

In one embodiment, the second signaling indicates 12 bits of the first identity.

In one embodiment, the first target signaling includes an upper layer signaling.

In one embodiment, the first target signaling includes an RRC signaling.

In one embodiment, the first target signaling includes a PC5-S signaling.

In one embodiment, the first target signaling includes an application layer signaling.

In one embodiment, the first target signaling includes a ProSe signaling.

In one embodiment, the first target signaling is transmitted over a Uu interface.

In one embodiment, the first target signaling is transmitted over a PC5 interface.

In one embodiment, the first target signaling is transmitted through an SCCH.

In one embodiment, the first target signaling is transmitted through an STCH.

In one embodiment, the first target signaling is transmitted through a PSCCH.

In one embodiment, the first target signaling is transmitted through a PSSCH.

In one embodiment, the first target signaling is transmitted through a PSBCH.

In one embodiment, the first target signaling is transmitted through an SL-SCH.

In one embodiment, the first target signaling is transmitted through a sidelink.

In one embodiment, the first target signaling is used for configuring a DRB.

In one embodiment, the first target signaling is used for configuring an RB.

In one embodiment, the first target signaling includes an RRCReconfigurationSidelink.

In one embodiment, the first target signaling includes an RRCReconfigurationCompleteSidelink.

In one embodiment, the first target signaling includes partial fields in an RRCReconfigurationSidelink.

In one embodiment, the first target signaling includes an RRCReconfiguration.

In one embodiment, the first target signaling includes an SIB12.

In one embodiment, the first target signaling includes an SL-LogicalChannelConfigPC5.

In one embodiment, the first target signaling includes an SL-LogicalChannelConfig.

In one embodiment, the first target signaling includes an SL-LogicalChannelConfig-r16.

In one embodiment, the first target signaling includes an SL-LogicalChannelConfig-r17.

In one embodiment, the first target signaling includes partial fields in an SL-LogicalChannelConfig.

In one embodiment, the first target signaling includes an sl-RLC-Config.

In one embodiment, the first target signaling includes an sl-RLC-Config-r16.

In one embodiment, the first target signaling includes an sl-RLC-Config-r17.

In one embodiment, the first target signaling includes partial fields in an sl-RLC-Config.

In one embodiment, the first target signaling includes an sl-LogicalChannelGroup.

In one embodiment, the first target signaling includes an RRCConnectionReconfigurationSidelink.

In one embodiment, the first target signaling includes an RRCConnectionReconfiguration.

In one embodiment, the first target signaling includes a DIRECT LINK ESTABLISHMENT REQUEST.

In one embodiment, the first target signaling includes a DIRECT LINK ESTABLISHMENT ACCEPT.

In one embodiment, the first target signaling includes a DIRECT LINK MODIFICATION REQUEST.

In one embodiment, the first target signaling includes a DIRECT LINK MODIFICATION ACCEPT.

In one embodiment, the first target signaling includes a DIRECT LINK KEEPALIVE REQUEST.

In one embodiment, the first target signaling includes a DIRECT LINK KEEPALIVE RESPONSE.

In one embodiment, the first target signaling includes a DISCOVERY_REQUEST.

In one embodiment, the first target signaling includes a DISCOVERY_RESPONSE.

In one embodiment, the first target signaling includes a MATCH_REPORT.

In one embodiment, the first target signaling includes a MATCH_REPORT_ACK.

In one embodiment, the first target signaling includes a PROXIMITY_REQUEST.

In one embodiment, the first target signaling includes a PROXIMITY_REQUEST_RESPONSE.

In one embodiment, the first target signaling includes a PROXIMITY_ALERT.

In one embodiment, the first target signaling includes a PROXIMITY_REQUEST_VALIDATION.

In one embodiment, the first target signaling includes a PROXIMITY_REQUEST_VALIDATION_RESPONSE.

In one embodiment, the first target signaling includes a DISCOVERY_UPDATE_REQUEST.

In one embodiment, the first target signaling includes a DISCOVERY_UPDATE_RESPONSE.

In one embodiment, the first target signaling includes an ANNOUNCING_ALERT_REQUEST.

In one embodiment, the first target signaling includes an ANNOUNCING_ALERT_RESPONSE.

In one embodiment, the first target signaling includes a Direct Security Mode Command.

In one embodiment, the first target signaling includes a Direct Security Mode Complete.

In one embodiment, the first target signaling indicates explicitly the second logical channel identity.

In one embodiment, the first target signaling carries the second logical channel identity.

In one embodiment, the first target signaling indicates explicitly the first logical channel identity.

In one embodiment, the first target signaling carries the first logical channel identity.

In one embodiment, the second target signaling includes an upper layer signaling.

In one embodiment, the second target signaling includes an RRC signaling.

In one embodiment, the second target signaling includes a PC5-S signaling.

In one embodiment, the second target signaling includes an application layer signaling.

In one embodiment, the second target signaling includes a ProSe signaling.

In one embodiment, the second target signaling is transmitted over a Uu interface.

In one embodiment, the second target signaling is transmitted over a PC5 interface.

In one embodiment, the second target signaling is transmitted through an SCCH.

In one embodiment, the second target signaling is transmitted through an STCH.

In one embodiment, the second target signaling is transmitted through a PSCCH.

In one embodiment, the second target signaling is transmitted through a PSSCH.

In one embodiment, the second target signaling is transmitted through a PSBCH.

In one embodiment, the second target signaling is transmitted through an SL-SCH.

In one embodiment, the second target signaling is transmitted through a sidelink.

In one embodiment, the second target signaling is used for configuring a DRB.

In one embodiment, the second target signaling is used for configuring an RB.

In one embodiment, the second target signaling includes an RRCReconfigurationSidelink.

In one embodiment, the second target signaling includes an RRCReconfigurationCompleteSidelink.

In one embodiment, the second target signaling includes partial fields in an RRCReconfigurationSidelink.

In one embodiment, the second target signaling includes an RRCReconfiguration.

In one embodiment, the second target signaling includes an SIB12.

In one embodiment, the second target signaling includes an SL-LogicalChannelConfigPC5.

In one embodiment, the second target signaling includes an SL-LogicalChannelConfig.

In one embodiment, the second target signaling includes an SL-LogicalChannelConfig-r16.

In one embodiment, the second target signaling includes an SL-LogicalChannelConfig-r17.

In one embodiment, the second target signaling includes partial fields in an SL-LogicalChannelConfig.

In one embodiment, the second target signaling includes an sl-RLC-Config.

In one embodiment, the second target signaling includes an sl-RLC-Config-r16.

In one embodiment, the second target signaling includes an sl-RLC-Config-r17.

In one embodiment, the second target signaling includes partial fields in an sl-RLC-Config.

In one embodiment, the second target signaling includes an sl-LogicalChannelGroup.

In one embodiment, the second target signaling includes an RRCConnectionReconfigurationSidelink.

In one embodiment, the second target signaling includes an RRCConnectionReconfiguration.

In one embodiment, the second target signaling includes a DIRECT LINK ESTABLISHMENT REQUEST.

In one embodiment, the second target signaling includes a DIRECT LINK ESTABLISHMENT ACCEPT.

In one embodiment, the second target signaling includes a DIRECT LINK MODIFICATION REQUEST.

In one embodiment, the second target signaling includes a DIRECT LINK MODIFICATION ACCEPT.

In one embodiment, the second target signaling includes a DIRECT LINK KEEPALIVE REQUEST.

In one embodiment, the second target signaling includes a DIRECT LINK KEEPALIVE RESPONSE.

In one embodiment, the second target signaling includes a DISCOVERY_REQUEST.

In one embodiment, the second target signaling includes a DISCOVERY_RESPONSE.

In one embodiment, the second target signaling includes a MATCH_REPORT.

In one embodiment, the second target signaling includes a MATCH_REPORT_ACK.

In one embodiment, the second target signaling includes a PROXIMITY_REQUEST.

In one embodiment, the second target signaling includes a PROXIMITY_REQUEST_RESPONSE.

In one embodiment, the second target signaling includes a PROXIMITY_ALERT.

In one embodiment, the second target signaling includes a PROXIMITY_REQUEST_VALIDATION.

In one embodiment, the second target signaling includes a PROXIMITY_REQUEST_VALIDATION_RESPONSE.

In one embodiment, the second target signaling includes a DISCOVERY_UPDATE_REQUEST.

In one embodiment, the second target signaling includes a DISCOVERY_UPDATE_RESPONSE.

In one embodiment, the second target signaling includes an ANNOUNCING_ALERT_REQUEST.

In one embodiment, the second target signaling includes an ANNOUNCING_ALERT_RESPONSE.

In one embodiment, the second target signaling includes a Direct Security Mode Command.

In one embodiment, the second target signaling includes a Direct Security Mode Complete.

In one embodiment, the second target signaling indicates explicitly the second logical channel identity.

In one embodiment, the second target signaling carries the second logical channel identity.

In one embodiment, the second target signaling indicates explicitly the first logical channel identity.

In one embodiment, the second target signaling carries the first logical channel.

In one embodiment, a reception of the second signaling is used for triggering a transmission of the second target signaling.

In one embodiment, the second node U02 transmits a feedback signaling of the second target signaling.

In one subembodiment, the first node U01 receives the feedback signaling of the second target signaling transmitted by the second node U02, and a reception of the feedback signaling of the second target signaling transmitted by the second node U02 triggers a transmission of the first signaling.

In one embodiment, the first signaling is used for acknowledging the second signaling.

In one embodiment, the first signaling includes an upper layer signaling.

In one embodiment, the first signaling includes an RRC signaling.

In one embodiment, the first signaling includes a PC5-S signaling.

In one embodiment, the first signaling includes a ProSe signaling.

In one embodiment, the first signaling is transmitted over a Uu interface.

In one embodiment, the first signaling is transmitted over a PC5 interface.

In one embodiment, the first signaling is transmitted through an SCCH.

In one embodiment, the first signaling is transmitted through an STCH.

In one embodiment, the first signaling is transmitted through a PSCCH.

In one embodiment, the first signaling is transmitted through a PSSCH.

In one embodiment, the first signaling is transmitted through a PSBCH.

In one embodiment, the first signaling is transmitted through an SL-SCH.

In one embodiment, the first signaling is transmitted through a sidelink.

In one embodiment, the first signaling is used for configuring a DRB.

In one embodiment, the first signaling is used for configuring an RB.

In one embodiment, the first signaling is used for configuring an SLRB.

In one embodiment, the first signaling includes an RRCReconfigurationSidelink.

In one embodiment, the first signaling includes an RRCReconfigurationCompleteSidelink.

In one embodiment, the first signaling includes partial fields in an RRCReconfigurationSidelink.

In one embodiment, the first signaling includes an RRCReconfiguration.

In one embodiment, the first signaling includes an SIB12.

In one embodiment, the first signaling includes an SLRB-Config.

In one embodiment, the first signaling includes an sl-PDCP-ConfigPC5.

In one embodiment, the first signaling includes an sl-RLC-ConfigPC5.

In one embodiment, the first signaling includes an sl-MAC-LogicalChannelConfigPC5.

In one embodiment, the first signaling includes a PC5-S signaling.

In one embodiment, the first signaling includes an SL-LogicalChannelConfigPC5.

In one embodiment, the first signaling includes an SL-LogicalChannelConfig.

In one embodiment, the first signaling includes an SL-LogicalChannelConfig-r16.

In one embodiment, the first signaling includes an SL-LogicalChannelConfig-r17.

In one embodiment, the first signaling includes partial fields in an SL-LogicalChannelConfig.

In one embodiment, the first signaling includes an sl-RLC-Config.

In one embodiment, the first signaling includes an sl-RLC-Config-r16.

In one embodiment, the first signaling includes an sl-RLC-Config-r17.

In one embodiment, the first signaling includes partial fields in an sl-RLC-Config.

In one embodiment, the first signaling includes an sl-LogicalChannelGroup.

In one embodiment, the first signaling includes an RRC-ConnectionReconfigurationSidelink.

In one embodiment, the first signaling includes an RRC-ConnectionReconfiguration.

In one embodiment, the first signaling includes a DIRECT LINK ESTABLISHMENT REQUEST.

In one embodiment, the first signaling includes a DIRECT LINK ESTABLISHMENT ACCEPT.

In one embodiment, the first signaling includes a DIRECT LINK MODIFICATION REQUEST.

In one embodiment, the first signaling includes a DIRECT LINK MODIFICATION ACCEPT.

In one embodiment, the first signaling includes a DIRECT LINK KEEPALIVE REQUEST.

In one embodiment, the first signaling includes a DIRECT LINK KEEPALIVE RESPONSE.

In one embodiment, the first signaling includes a DISCOVERY_REQUEST.

In one embodiment, the first signaling includes a DISCOVERY_RESPONSE.

In one embodiment, the first signaling includes a Direct Security Mode Command.

In one embodiment, the first signaling includes a Direct Security Mode Complete.

In one embodiment, the first signaling includes a first candidate logical channel set, and the first candidate logical channel set is used for determining the second logical channel identity.

In one embodiment, the second node U02 forwards the first data packet carried by the first MAC PDU.

In one embodiment, the first data packet includes an adaption layer PDU.

In one embodiment, the first data packet includes an adaption layer SDU.

In one embodiment, the logical channel identity included in the first MAC sub-PDU is different from the logical channel identity included in the second MAC sub-PDU.

In one embodiment, an RLC PDU carried in the first MAC PDU and an RLC PDU carried in the second MAC PDU are generated by different RLC entities.

In one embodiment, a PDCP PDU carried in the first MAC PDU and a PDCP PDU carried in the second MAC PDU are generated by a same PDCP entity.

In one embodiment, an RLC bearer associated to the first MAC PDU is different from an RLC bearer associated to the second MAC PDU.

In one embodiment, a radio bearer associated to the first MAC PDU is the same as a radio bearer associated to the second MAC PDU.

In one embodiment, the first node U01 decrypts the first data packet using the target identity.

In one embodiment, the first node U01 performs integrity verification for the first data packet using the target identity.

In one subembodiment, the first data packet is one PDCP PDU.

In one embodiment, the first node U01 decrypts a PDCP PDU included in the first data packet using the target identity.

In one embodiment, the first node U01 performs integrity verification for a PDCP PDU included in the first data packet using the target identity.

In one embodiment, the fourth MAC PDU includes a fourth MAC sub-PDU, the fourth MAC sub-PDU includes the second logical channel identity and a fourth data packet, and the target identity is used for a security algorithm of the fourth data packet.

In one embodiment, the fourth MAC sub-header includes at least partial bits of the third link layer identity and at least partial bits of the second link layer identity.

In one embodiment, the fifth MAC PDU includes a fifth MAC sub-PDU, and the fifth MAC sub-PDU includes the first logical channel identity and a fourth data packet, and the target identity is used for a security algorithm of the fourth data packet.

In one embodiment, the fifth MAC sub-header includes at least partial bits of the first link layer identity and at least partial bits of the second link layer identity.

In one embodiment, the phrase that the target identity is used for a security algorithm of the fourth data packet includes: the target identity is used for encryption of the fourth data packet.

In one embodiment, the phrase that the target identity is used for a security algorithm of the fourth data packet includes: the target identity is used for integrity protection of the fourth data packet.

In one embodiment, the phrase that the target identity is used for a security algorithm of the fourth data packet includes: the target identity is used as an input parameter to generate an encryption key for encrypting the fourth data packet.

In one embodiment, the phrase that the target identity is used for a security algorithm of the fourth data packet includes: the target identity is used as an input parameter to generate an integrity key for integrity protection of the fourth data packet.

In one embodiment, the fourth data packet and the first data packet use a same security algorithm.

In one embodiment, the first logical channel identity is used for identifying a logical channel between the second node U02 and the third node U03.

In one embodiment, the second logical channel identity is used for identifying a logical channel between the first node U01 and the second node U02.

In one embodiment, a first target MAC PDU carries the first target signaling, the first target MAC PDU includes a first target MAC sub-PDU, the first target MAC sub-PDU includes at least partial bits of the first link layer identity and at least partial bits of the second link layer identity.

In one embodiment, a second target MAC PDU carries the second target signaling, the second target MAC PDU includes a second target MAC sub-PDU, the second target MAC sub-PDU includes at least partial bits of the third link layer identity and at least partial bits of the second link layer identity.

In one embodiment, the third node U03 neglects an sl-RLC-ConfigPC5 included in the second signaling.

In one embodiment, the third node U03 neglects a logical channel configuration corresponding to the target identity, which is configured by the second signaling.

In one embodiment, the first signaling indicates a second candidate logical channel identity, and the second candidate logical channel identity is used for determining the second logical channel identity.

In one embodiment, as a response to the fact that the second signaling does not conflict with the current configuration, a third signaling is transmitted; the third signaling indicates that a configuration of the second signaling is completed; the first signaling includes a first candidate logical channel identity set; the first candidate logical channel identity set includes at least one candidate logical channel identity, and the second candidate logical channel identity belongs to the first candidate logical channel identity set; the first candidate logical channel identity set and the second logical channel identity are used for determining whether the second signaling conflicts with the current configuration.

In one embodiment, the second candidate logical channel identity has at least five least significant bits the same as the second logical channel identity.

In one embodiment, the second candidate logical channel identity is used for determining a first logical channel identity.

In one embodiment, the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

In one embodiment, a second logical channel identity is indicated by an LCID field included in a second MAC sub-header.

In one embodiment, a second candidate logical channel identity is indicated through an LCID.

In one embodiment, a second candidate logical channel identity is indicated through five least significant bits of an LCID.

In one embodiment, a second candidate logical channel identity includes five bits only.

In one embodiment, the first signaling indicates explicitly the second candidate logical channel identity.

In one embodiment, the second candidate logical channel identity is one field in the first signaling.

In one embodiment, the first signaling carries five least significant bits of the second candidate logical channel identity.

In one embodiment, the first signaling includes the second candidate logical channel identity.

In one embodiment, the first signaling indicates a first candidate logical channel identity set, and the first candidate logical channel identity set includes the second candidate logical channel identity.

In one embodiment, the second candidate logical channel identity has at least five least significant bits the same as the second logical channel identity.

In one embodiment, the second candidate logical channel identity includes at least five bits.

In one embodiment, the second candidate logical channel identity includes five least significant bits and one mask, and the mask is used for indicating that a bit other than the five least significant bits may be an arbitrary bit.

In one embodiment, the second candidate logical channel identity includes six bits.

In one embodiment, the second candidate logical channel identity includes Q bits, wherein the Q is a positive integer greater than 6.

In one embodiment, values of five least significant bits of the second logical channel identity are set as values of five least significant bits of the second candidate logical channel identity.

In one embodiment, the second candidate logical channel identity is used for determining a first logical channel identity.

In one embodiment, values of five least significant bits of the first logical channel identity are set as values of five least significant bits of the second candidate logical channel identity.

In one embodiment, the second candidate logical channel identity is set as the first logical channel identity.

In one embodiment, values of five least significant bits of the first logical channel identity are set as values of five least significant bits of the second candidate logical channel identity, and a value of a bit other than the five least significant bits of the first logical channel identity is set as an XOR (Exclusive-OR) of 1 and a value of a corresponding bit other than the five least significant bits of the second candidate logical channel identity.

In one embodiment, values of five least significant bits of the first logical channel identity are set as values of five least significant bits of the second candidate logical channel identity, and a value of a bit other than the five least significant bits of the first logical channel identity is set as a 0/1 reversal value of a value of a corresponding bit other than the five least significant bits of the second candidate logical channel identity.

In one embodiment, values of five least significant bits of the first logical channel identity are set as values of five least significant bits of the second candidate logical channel identity, and a value of a most significant bit among six least significant bits of the first logical channel identity is set as an XOR of 1 and a most significant bit among six least significant bits of the second candidate logical channel identity.

In one embodiment, values of five least significant bits of the first logical channel identity are set as values of five least significant bits of the second candidate logical channel identity, and a value of a most significant bit among six least significant bits of the first logical channel identity is set as a 0/1 reversal value of a most significant bit among six least significant bits of the second candidate logical channel identity.

In one embodiment, the second candidate logical channel identity is used for determining a second logical channel identity, and the second logical channel identity is used for determining the first logical channel identity.

In one embodiment, the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

In one embodiment, the first candidate logical channel identity and the second candidate logical channel identity appear pairwise.

In one embodiment, the first candidate logical channel identity has at least one bit different from the second candidate logical channel identity, and the first candidate logical channel identity has five least significant bits the same as the second candidate logical channel identity.

In one embodiment, the first signaling indicates explicitly one of the first candidate logical channel identity and the second candidate logical channel identity, and implicitly the other one.

In one embodiment, when the first candidate logical channel identity is determined as the second logical channel identity, the second candidate logical channel identity is determined as the first logical channel identity.

In one embodiment, when the first candidate logical channel identity is determined as the first logical channel identity, the second candidate logical channel identity is determined as the second logical channel identity.

In one embodiment, the second signaling indicates that the second candidate logical channel identity is determined as the second logical channel identity.

In one embodiment, the first signaling includes a first candidate logical channel identity set, the second signaling indicates which candidate logical channel identity in the first candidate logical channel identity set is determined as the second logical channel identity.

In one embodiment, when the second logical channel identity included in the second signaling is the same as the second candidate logical channel identity, the second signaling is determined to not conflict with the current configuration.

In one embodiment, when the second logical channel identity included in the second signaling has five least significant bits the same as the second candidate logical channel identity, the second signaling is determined to not conflict with the current configuration.

In one embodiment, when the second logical channel identity included in the second signaling belongs to the first candidate logical channel identity set, the second signaling is determined to not conflict with the current configuration.

In one embodiment, the second signaling includes the first logical channel identity, and when the first logical channel identity and the second logical channel identity included in the second signaling both belong to the first candidate logical channel identity set, the second signaling is determined to not conflict with the current configuration.

In one embodiment, the second candidate logical channel identity belongs to the first candidate logical channel identity set, and when the second logical channel included in the second signaling is the same as the second candidate logical channel identity, the second signaling is determined to not conflict with the current configuration.

In one embodiment, the second signaling includes the first logical channel identity.

In one embodiment, the first candidate logical channel identity set includes the first candidate logical channel identity and the second candidate logical channel identity, and when the second logical channel identity is the same as the second candidate logical channel identity while the first logical channel identity is the same as the first candidate logical channel identity, the second signaling is determined to not conflict with the current configuration.

In one embodiment, the first candidate logical channel identity set includes the first candidate logical channel identity and the second candidate logical channel identity, and when the second logical channel identity is the same as the first candidate logical channel identity while the first logical channel identity is the same as the second candidate logical channel identity, the second signaling is determined to not conflict with the current configuration.

In one embodiment, the third signaling includes an upper layer signaling.

In one embodiment, the third signaling includes an RRC signaling.

In one embodiment, the third signaling includes a PC5-S signaling.

In one embodiment, the third signaling includes an application layer signaling.

In one embodiment, the third signaling includes a ProSe signaling.

In one embodiment, the third signaling is transmitted over a Uu interface.

In one embodiment, the third signaling is transmitted over a PC5 interface.

In one embodiment, the third signaling is transmitted through an SCCH.

In one embodiment, the third signaling is transmitted through an STCH.

In one embodiment, the third signaling is transmitted through a PSCCH.

In one embodiment, the third signaling is transmitted through a PSSCH.

In one embodiment, the third signaling is transmitted through a PSBCH.

In one embodiment, the third signaling is transmitted through an SL-SCH.

In one embodiment, the third signaling is transmitted through a sidelink.

In one embodiment, the third signaling is used for configuring a DRB.

In one embodiment, the third signaling is used for configuring an RB.

In one embodiment, the third signaling includes an RRCReconfigurationSidelink.

In one embodiment, the third signaling includes partial fields in an RRCReconfigurationSidelink.

In one embodiment, the third signaling includes an RRCReconfiguration.

In one embodiment, the third signaling includes an SIB12.

In one embodiment, the third signaling includes an SL-LogicalChannelConfigPC5.

In one embodiment, the third signaling includes an SL-LogicalChannelConfig.

In one embodiment, the third signaling includes an SL-LogicalChannelConfig-r16.

In one embodiment, the third signaling includes an SL-LogicalChannelConfig-r17.

In one embodiment, the third signaling includes partial fields in an SL-LogicalChannelConfig.

In one embodiment, the third signaling includes an sl-RLC-Config.

In one embodiment, the third signaling includes an sl-RLC-Config-r16.

In one embodiment, the third signaling includes an sl-RLC-Config-r17.

In one embodiment, the third signaling includes partial fields in an sl-RLC-Config.

In one embodiment, the third signaling includes an sl-LogicalChannelGroup.

In one embodiment, the third signaling includes an RRC-ConnectionReconfigurationSidelink.

In one embodiment, the third signaling includes an RRC-ConnectionReconfiguration.

In one embodiment, the third signaling includes a DIRECT LINK ESTABLISHMENT REQUEST.

In one embodiment, the third signaling includes a DIRECT LINK ESTABLISHMENT ACCEPT.

In one embodiment, the third signaling includes a DIRECT LINK MODIFICATION REQUEST.

In one embodiment, the third signaling includes a DIRECT LINK MODIFICATION ACCEPT.

In one embodiment, the third signaling includes a DIRECT LINK KEEPALIVE REQUEST.

In one embodiment, the third signaling includes a DIRECT LINK KEEPALIVE RESPONSE.

In one embodiment, the third signaling includes a DISCOVERY_REQUEST.

In one embodiment, the third signaling includes a DISCOVERY_RESPONSE.

In one embodiment, the third signaling includes a MATCH_REPORT.

In one embodiment, the third signaling includes a MATCH_REPORT_ACK.

In one embodiment, the third signaling includes a PROXIMITY_REQUEST.

In one embodiment, the third signaling includes a PROXIMITY_REQUEST_RESPONSE.

In one embodiment, the third signaling includes a PROXIMITY_ALERT.

In one embodiment, the third signaling includes a PROXIMITY_REQUEST_VALIDATION.

In one embodiment, the third signaling includes a PROXIMITY_REQUEST_VALIDATION_RESPONSE.

In one embodiment, the third signaling includes a DISCOVERY_UPDATE_REQUEST.

In one embodiment, the third signaling includes a DISCOVERY_UPDATE_RESPONSE.

In one embodiment, the third signaling includes an ANNOUNCING_ALERT_REQUEST.

In one embodiment, the third signaling includes an ANNOUNCING_ALERT_RESPONSE.

In one embodiment, the third signaling includes a Direct Security Mode Command.

In one embodiment, the third signaling includes a Direct Security Mode Complete.

In one embodiment, the third signaling indicates explicitly the second logical channel identity.

In one embodiment, the third signaling carries the second logical channel identity.

In one embodiment, the third signaling indicates that a receiver of the second signaling performs configuration according to the configuration indicated by the second signaling.

In one embodiment, the first signaling includes a first candidate logical channel identity set, and the logical channel identities in the first candidate logical channel identity set are available logical channel identities in all radio links that are occupied by the first data packet and carry the MAC PDU of the first data packet and carry the first node identity.

In one embodiment, the first signaling includes a first candidate logical channel identity set, and the candidate logical channel identities in the first candidate logical channel identity set are available logical channel identities.

In one embodiment, the first signaling includes a first candidate logical channel identity set, and at least two candidate logical channel identities in the first candidate logical channel identity set have the same five least significant bits.

In one embodiment, the first signaling includes the target identity, and the target identity is used for associating the first logical channel identity to the second logical channel identity.

In one embodiment, the second signaling is used for triggering a transmission of the first signaling.

Embodiment 5B

Figure 5B:
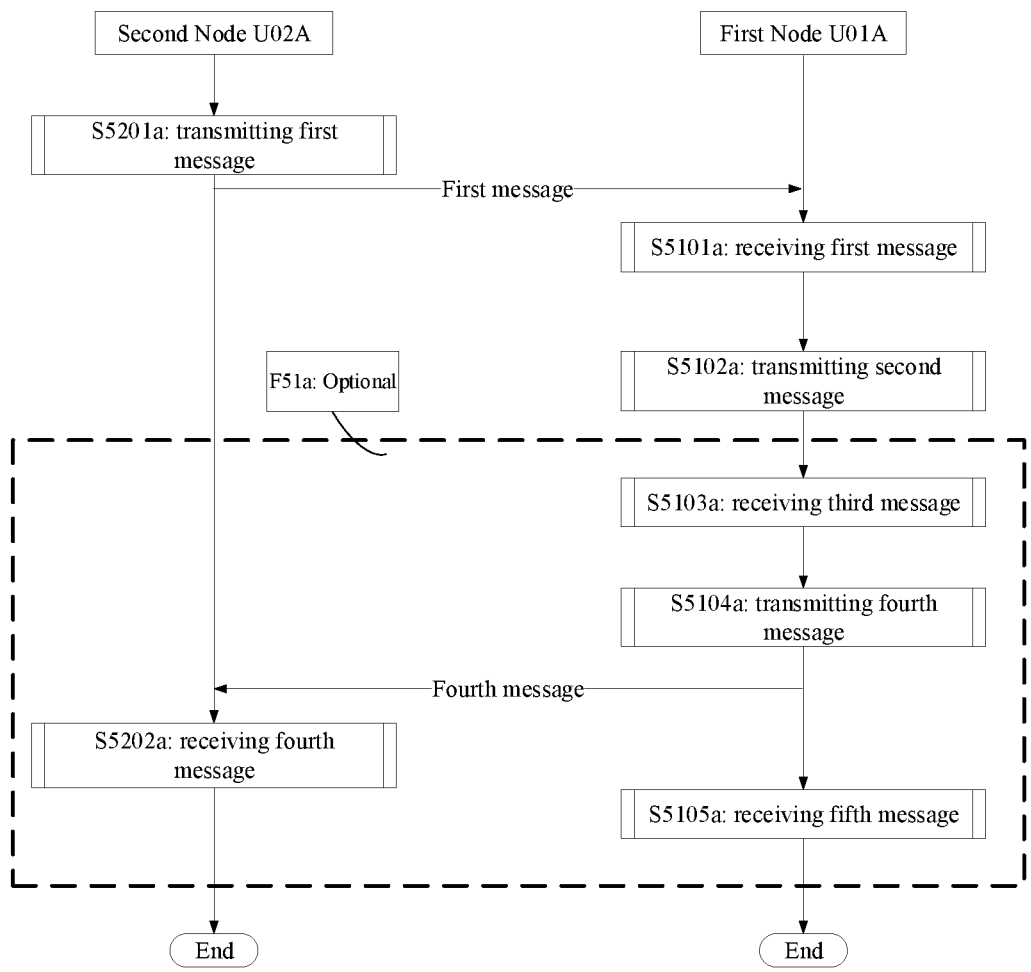
FIG. 5B is a flowchart of transmission according to one embodiment of the disclosure.

Embodiment 5B illustrates a flowchart of transmission of a radio signal according to one embodiment of the disclosure, as shown in FIG. 5B. In FIG. 5B, U01A corresponds to the first node in the disclosure, U02A corresponds to the second node in the disclosure, in particular, the sequence in the present embodiment does not limit the sequence of signal transmission and the sequence of implementation in the disclosure, and steps in F51a are optional.

The first node U01A receives a first message in S5101a, transmits a second message in S5102a, receives a third message in S5103a, transmits a fourth message in S5104a, and receives a fifth message in S5105a.

The second node U02A transmits the first message in S5201a and receives the fourth message in S5202a.

In Embodiment 5B, the first message includes a first parameter set; the second message includes a first parameter set and a second parameter set; wherein the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first node U01A is a relay node.

In one embodiment, the first node U01A provides relay services for the second node U02A.

In one embodiment, the first node U01A provides L2 relay services for the second node U02A.

In one embodiment, the first node U01A provides L3 relay services for the second node U02A.

In one embodiment, the first node U01A is a header of the second node U02A.

In one embodiment, a communication interface between the first node U01A and the second node U02A is PC5.

In one embodiment, a communication interface between the first node U01A and the second node U02A is Uu.

In one embodiment, the third node is one UE.

In one embodiment, the third node is a node other than the first node U01A and the second node U02A.

In one embodiment, the second node U02A communicates with the third node through the first node U01A.

In one embodiment, the first message includes a first parameter set, and the first parameter set provides necessary parameters for a security establishment between the second node U02A and the third node.

In one subembodiment, the first parameter set includes at least partial bits of a first key identity, the first key identity determines a first key, and the first key is used for communication between the second node U02A and the third node.

In one embodiment, the second message includes a second parameter set, and the second parameter set provides necessary parameters for a security establishment between the first node U01A and the third node.

In one subembodiment, the second parameter set includes at least partial bits of a second key identity, the second key identity determines a second key, and the second key is used for communication between the first node U01A and the third node.

In one embodiment, the first message and the second message are both DIRECT_COMMUNICATION_REQUEST.

In one embodiment, the second message includes all sources of the first message.

In one embodiment, the second message includes partial sources of the first message.

In one embodiment, the first message includes whether relay is allowed.

In one embodiment, the second message includes whether relay is allowed.

In one embodiment, the second message indicates that relay is prohibited.

In one embodiment, the first message includes a third parameter set, the third parameter set includes at least partial bits of a third key identity, the third parameter set is used for a security establishment between the first node U01A and the second node U02A.

In one subembodiment, the third parameter set includes Nx bits of the third key identity, wherein Nx is a positive integer.

In one subembodiment, the third key identity determines a third key, and the third key is used for communication between the first node U01A and the second node U02A.

In one subembodiment, determining the third key is mandatory for security establishment between the first node U01A and the second node U02A.

In one embodiment, the third parameter set includes an application layer ID of the first node U01A.

In one embodiment, the third parameter set includes an application layer ID of the second node U02A.

In one embodiment, the third parameter set includes a $K_D$ identity.

In one embodiment, the third parameter set includes a $K_{D\text{-}sess}$ identity.

In one embodiment, the third parameter set includes a user security capability.

In one embodiment, the third parameter set includes a signature.

In one embodiment, the third parameter set includes a local IP address.

In one embodiment, the third parameter set includes user information.

In one embodiment, the third parameter set includes a nonce used only once.

In one embodiment, the third parameter set includes a relay identity.

In one embodiment, the third parameter set includes a relay code.

In one embodiment, the third parameter set includes a network identifier.

In one embodiment, the third parameter set includes an application server identifier.

In one embodiment, an intersection of the first parameter set and the second parameter set is not empty.

In one embodiment, an intersection of the first parameter set and the third second parameter set is not empty.

In one embodiment, an intersection of the third parameter set and the second parameter set is not empty.

In one embodiment, a security establishment between the first node U01A and the second node U02A includes establishing a security context.

In one embodiment, a security establishment between the first node U01A and the second node U02A includes establishing a key.

In one embodiment, a security establishment between the first node U01A and the second node U02A includes entering a security mode.

In one embodiment, the second node U02A transmits a first MAC PDU, and the first node U01A receives the first MAC PDU; the first MAC PDU carries at least partial bits of the first message, the first MAC PDU includes a first MAC header and at least a first MAC sub-PDU, the first MAC header includes at least partial bits of a first link layer identity and at least partial bits of a second link layer identity; the second MAC PDU carries at least partial bits of the second message, the second MAC PDU includes a second MAC header and at least a second MAC sub-PDU, the second MAC header includes at least partial bits of a third link layer identity.

In one embodiment, the third link layer identity is one link layer identity, and the third link layer identity determines the third node.

In one embodiment, the first link layer identity is one link layer identity, and the first link layer identity determines the first node U01A.

In one embodiment, the second link layer identity is one link layer identity, and the second link layer identity determines the second node U02A.

In one embodiment, an SRC field of the first MAC header includes at least M1 most significant bits of the second link layer identity, and a DST field of the first MAC header includes at least M2 most significant bits of the first link layer identity, wherein M1 and M2 are both positive integers.

In one subembodiment, M1 is equal to 16 and M2 is equal to 8.

In one embodiment, a DST field of the second MAC header includes at least M3 most significant bits of the third link layer identity, wherein M3 is a positive integer.

In one subembodiment, M3 is equal to 8.

In one subembodiment, an SRC field of the second MAC header includes at least M4 most significant bits of the first link layer identity, wherein M4 is a positive integer.

In one subembodiment, an SRC field of the second MAC header includes at least M5 most significant bits of the fourth link layer identity, wherein M6 is a positive integer, the fourth link layer identity is a link layer identity other than the first link layer identity, and the fourth link layer identity determines the first node U01A.

In one subembodiment, M4 is equal to 16 and M5 is equal to 16.

In one embodiment, the first MAC PDU is transmitted over a PC5 interface.

In one embodiment, the first MAC PDU is transmitted through an SL-SCH.

In one embodiment, the first MAC PDU is transmitted through a sidelink.

In one embodiment, the first MAC PDU is transmitted through an SCCH.

In one embodiment, the first MAC PDU is transmitted through a PSCCH.

In one embodiment, the first MAC PDU is transmitted through a PSSCH.

In one embodiment, the second MAC PDU is transmitted over a PC5 interface.

In one embodiment, the second MAC PDU is transmitted through an SL-SCH.

In one embodiment, the second MAC PDU is transmitted through a sidelink.

In one embodiment, the second MAC PDU is transmitted through an SCCH.

In one embodiment, the second MAC PDU is transmitted through a PSCCH.

In one embodiment, the second MAC PDU is transmitted through a PSSCH.

In one embodiment, the third message is used for a security establishment between the second node U02A and the third node; the third message and the first parameter set together include the first key identity.

In one embodiment, the third message is a PC5-S message.

In one embodiment, the third message is an NAS message.

In one embodiment, the third message is an upper layer message.

In one embodiment, the third message is an RRC message.

In one embodiment, the third message is an application layer message.

In one embodiment, the third message is an v2x layer message.

In one embodiment, the third message includes a DIRECT_SECURITY_MODE_COMMAND.

In one embodiment, the third message includes a DIRECT_SECURITY_MODE_COMPLETE.

In one embodiment, the third message includes a DIRECT_SECURITY_MODE_REJECT.

In one embodiment, the third message includes a DIRECT_REKEYING_REQUEST.

In one embodiment, the third message includes a DIRECT_REKEYING_RESPONSE.

In one embodiment, the third message includes a DIRECT_REKEYING_TRIGGER.

In one embodiment, the first parameter set includes MX most significant bits of the first key identity, and third message includes MY least significant bits of the first key identity, wherein MX and MY are both positive integers.

In one subembodiment, MX is equal to 16 and MY is equal to 16.

In one embodiment, the third message includes at least partial bits of the second key identity, the third message and the second parameter set together include the second key identity.

In one embodiment, when the security from the second node U02A to the third node cannot be established, the L3 relay is determined as the relay type of communication from the second node U02A to the third node.

In one subembodiment, the phrase that the security from the second node U02A to the third node cannot be established includes: the security establishment from the second node U02A to the third node is failed.

In one subembodiment, the phrase that the security from the second node U02A to the third node cannot be established includes: the security from the second node U02A to the third node is denied.

In one subembodiment, the phrase that the security from the second node U02A to the third node cannot be established includes: the security establishment from the second node U02A to the third node times out.

In one subembodiment, the phrase that the security from the second node U02A to the third node cannot be established includes: the second node U02A or the third node receives a DIRECT_SECURITY_MODE_REJECT.

In one embodiment, when the security from the first node U01A to the third node cannot be established, the L2 relay is determined as the relay type from the second node U02A to the third node.

In one subembodiment, the phrase that the security from the first node U01A to the third node cannot be established includes: the security establishment from the first node U01A to the third node is failed.

In one subembodiment, the phrase that the security from the first node U01A to the third node cannot be established includes: the security from the first node U01A to the third node is denied.

In one subembodiment, the phrase that the security from the first node U01A to the third node cannot be established includes: the security establishment from the first node U01A to the third node times out.

In one subembodiment, the phrase that the security from the first node U01A to the third node cannot be established includes: the first node U01A or the third node receives a DIRECT_SECURITY_MODE_REJECT.

In one embodiment, the fifth message is used for a security establishment between the first node U01A and the third node; the fifth message and the second parameter set together include the second key identity.

In one embodiment, the fifth message is a PC5-S message.

In one embodiment, the fifth message is an NAS message.

In one embodiment, the fifth message is an upper layer message.

In one embodiment, the fifth message is an RRC message.

In one embodiment, the fifth message is an application layer message.

In one embodiment, the fifth message is an v2x layer message.

In one embodiment, the fifth message includes a DIRECT_SECURITY_MODE_COMMAND.

In one embodiment, the fifth message includes a DIRECT_SECURITY_MODE_COMPLETE.

In one embodiment, the fifth message includes a DIRECT_SECURITY_MODE_REJECT.

In one embodiment, the fifth message includes a DIRECT_REKEYING_REQUEST.

In one embodiment, the fifth message includes a DIRECT_REKEYING_RESPONSE.

In one embodiment, the fifth message includes a DIRECT_REKEYING_TRIGGER.

In one embodiment, the second parameter set includes MM most significant bits of the second key identity, and the fifth message includes MN least significant bits of the second key identity, wherein MM and MN are both positive integers.

In one subembodiment, MM is equal to 16 and MN is equal to 16.

In one embodiment, the fifth message and the second parameter set include all bits of the second key identity.

Embodiment 6A

Figure 6A:
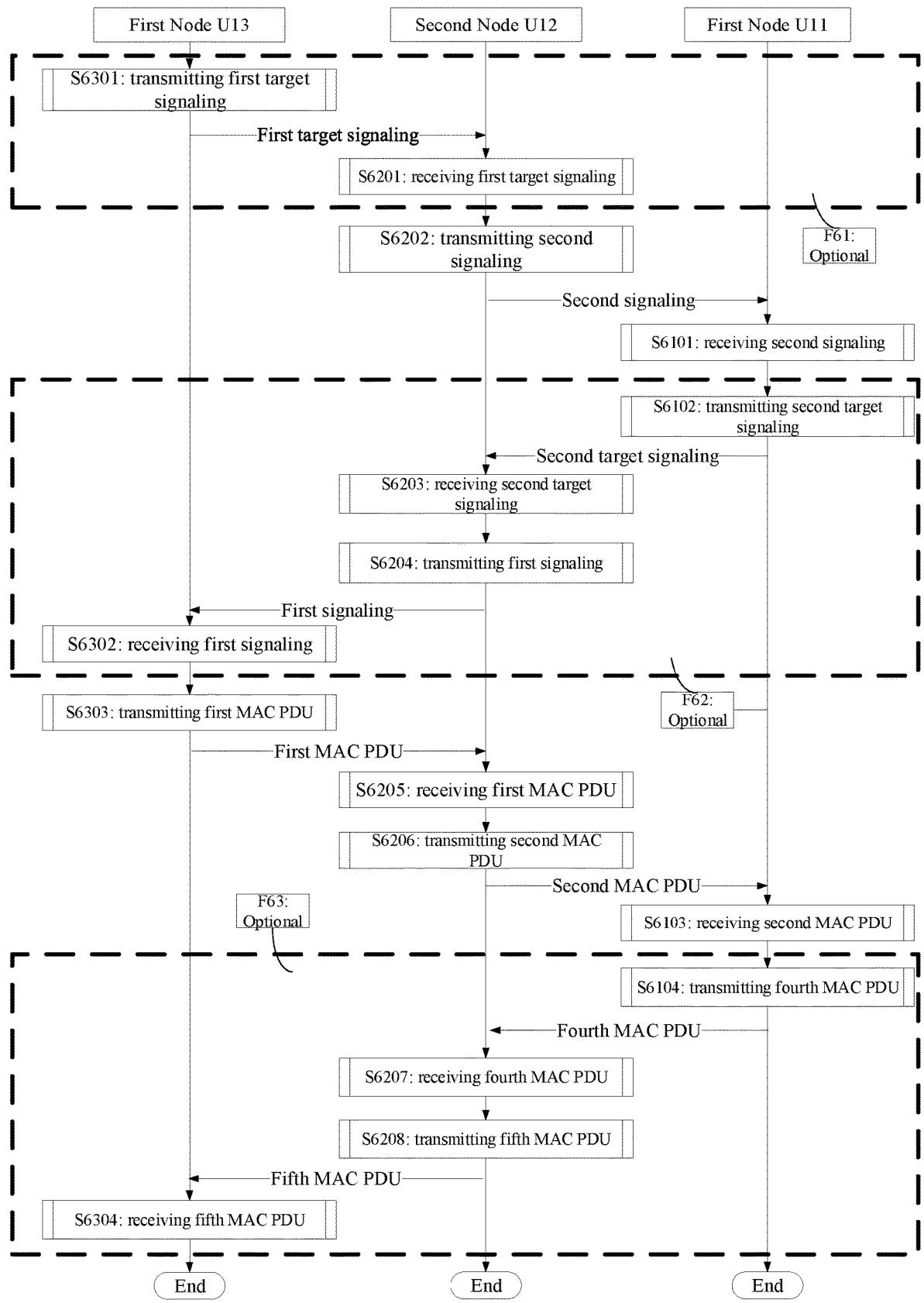
FIG. 6A is a flowchart of transmission according to one embodiment of the disclosure.

Embodiment 6A illustrates a flowchart of transmission of a radio signal according to one embodiment of the disclosure, as shown in FIG. 6A. In FIG. 6A, U11 corresponds to the first node in the disclosure, U12 corresponds to the second node in the disclosure, U13 corresponds to the third node in the disclosure, in particular, the sequence in the present embodiment does not limit the sequence of signal transmission and the sequence of implementation in the disclosure, and steps in F61, F62 and F63 are optional.

Embodiment 6A is based on Embodiment 5A, and the parts covered but not detailed in Embodiment 6A can refer to Embodiment 5A.

The first node U11 receives a second signaling in S6101, transmits a second target signaling in S6102, receives a second MAC PDU in S6103, and transmits a fourth MAC PDU in S6104.

The second node U12 receives a first target signaling in S6201, transmits a second signaling in S6202, receives a second target signaling in S6203, transmits a first signaling in S6204, receives a first MAC PDU in S6205, transmits a second MAC PDU in S6206, receives a fourth MAC PDU in S6207, and transmits a fifth MAC PDU in S6208.

The third node U13 transmits a first target signaling in S6301, receives a first signaling in S6302, transmits a first MAC PDU in S6303, and receives a fifth MAC PDU in S6304.

In Embodiment 6A, the second signaling indicates a target identity; the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the second node U12 is a relay node for the third node U13 to communicate with the first node U11.

In one embodiment, the reception of the first target signaling is used for triggering the second node U12 to transmit the second signaling.

In one embodiment, the first target signaling is a PC5-S signaling, and the second signaling is an RRC signaling.

In one embodiment, the first target signaling is an RRC signaling, and the second signaling is an RRC signaling.

In one embodiment, the first target signaling is an RRCReconfigurationSidelink, and the second signaling is an RRCReconfigurationSidelink.

In one embodiment, the first target signaling indicates the target identity.

In one embodiment, the first target signaling indicates the first logical channel identity.

In one embodiment, the second signaling indicates that the target identity is the first logical channel identity.

In one embodiment, the second signaling indicates that the target identity is the second logical channel identity.

In one embodiment, the second signaling indicates the second logical channel identity.

In one embodiment, the second signaling indicates that the second logical channel identity is the target identity.

In one embodiment, the second target signaling indicates the target identity.

In one embodiment, the second target signaling indicates that the second logical channel identity is used as the target identity.

In one embodiment, the first signaling indicates that the second logical channel identity is used as the target identity.

In one embodiment, the reception of the second signaling is used for triggering the first node U11 to transmit the second target signaling.

In one embodiment, the reception of the second target signaling is used for triggering the second node U12 to transmit the first signaling.

In one embodiment, the second target signaling is used for confirming the target identity.

In one embodiment, the first signaling is used for confirming the target identity.

In one embodiment, the first signaling is used for indicating the target identity.

In one embodiment, the first signaling includes the target identity.

In one embodiment, the second target signaling includes an RRCReconfigurationSidelink.

In one embodiment, the second target signaling includes an RRCReconfigurationCompleteSidelink.

In one embodiment, the second target signaling includes an RRCReconfigurationSidelink.

In one embodiment, the second target signaling includes an RRCReconfigurationCompleteSidelink.

In one embodiment, the reception of the first target signaling is used for confirming that the target identity is confirmed.

In one embodiment, the reception of the first target signaling is used for confirming that the target identity does not conflict with the configuration of the first node U11.

In one embodiment, the first signaling indicates that the first logical channel identity is the target identity.

In one embodiment, the first signaling indicates that the second logical channel identity is the target identity.

In one embodiment, whether the first target signaling includes the target identity is used for determining whether the target identity indicated by the second signaling is the first logical channel identity.

In one embodiment, when the first target signaling indicates that the first logical channel identity is the target identity, the second signaling indicates that the first logical channel identity is the target identity; when the first target signaling does not indicate the target identity, the second signaling indicates that the second logical channel identity is the target identity.

In one subembodiment, when a number of used logical channels is greater than L for the third node U13, L being a positive integer, the first target signaling indicates the target logical channel; when a number of used logical channels is not greater than L for the third node U13, the first target signaling gives up indicating the target logical channel.

In one embodiment, the above method has the following benefits: the third node U13 determines whether the target identity is determined by itself or by the opposite end according to the allocation of the logical channels; in the condition that the logical channels of the third node U13 are tense, if the target logical channel is allocated by the opposite end, it is very possible that the target logical channel conflicts with one already allocated by the third node U13, therefore, the third node U13 chooses to allocate the target logical channel itself to avoid collision; if the third node U13 has a large number of idle logical channels, the third node U13 may endow the opposite end node with the flexibility of allocation, thereby enhancing the flexibility of the overall system and ensuring a minimum of potential collisions during the link establishment.

In one embodiment, the third node U13 neglects the sl-RLC-ConfigPC5 included in the second signaling.

In one embodiment, the third node U13 neglects the logical channel configuration configured by the second signaling corresponding to the target identity.

Embodiment 6B

Figure 6B:
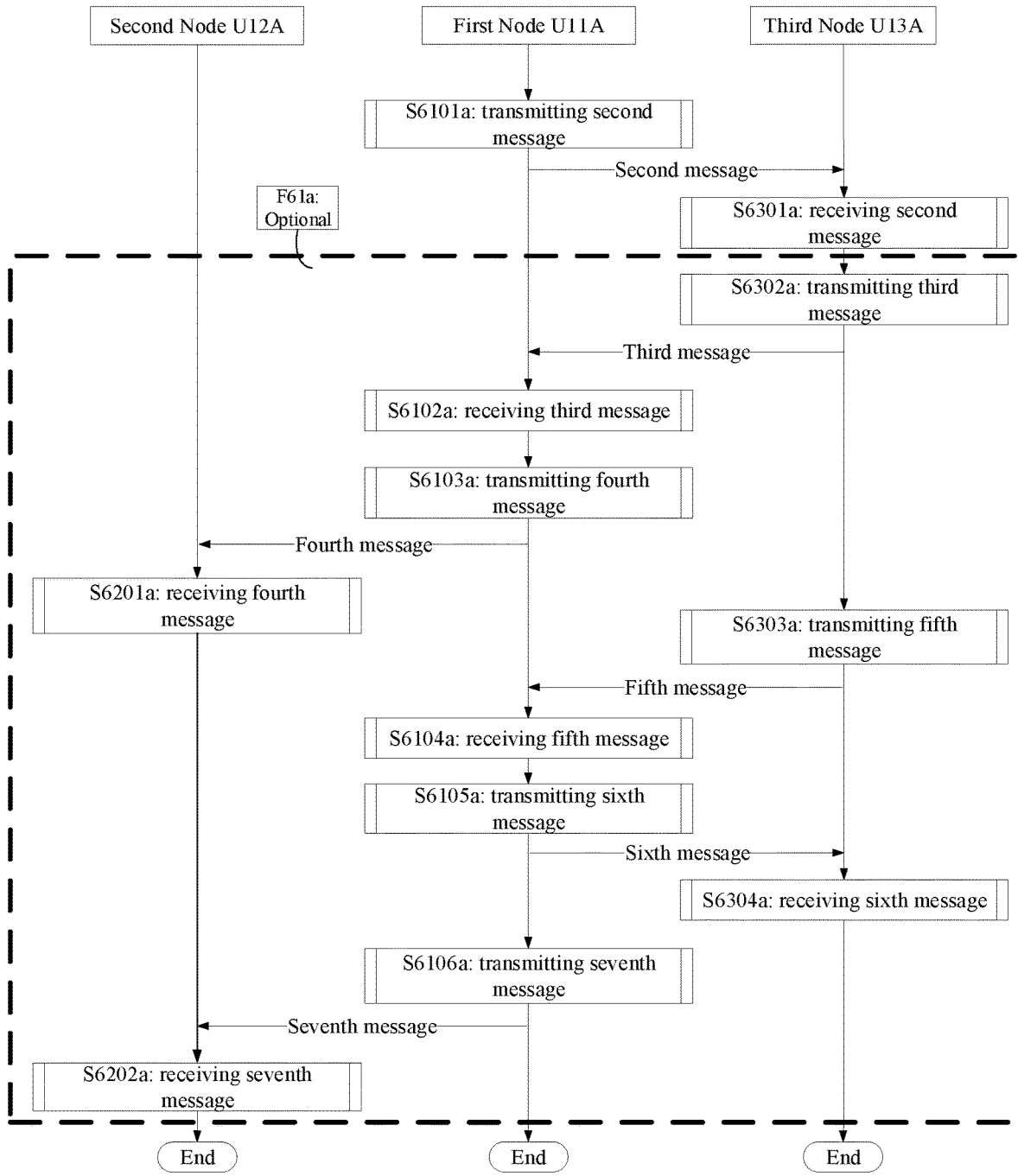
FIG. 6B is a flowchart of transmission according to one embodiment of the disclosure.

Embodiment 6B illustrates a flowchart of transmission of a radio signal according to one embodiment of the disclosure, as shown in FIG. 6B. In FIG. 6B, U11A corresponds to the first node in the disclosure, U12A corresponds to the second node in the disclosure, and U13A corresponds to the third node in the disclosure, in particular, the sequence in the present embodiment does not limit the sequence of signal transmission and the sequence of implementation in the disclosure. Embodiment 6B is based on Embodiment 5B, and the parts needed but not illustrated in Embodiment 6B can refer to Embodiment 5B. Steps in F61a are optional.

The first node U11A transmits a second message in S6101a, receives a third message in S6102a, transmits a fourth message in S6103a, receives a fifth message in S6104a, transmits a sixth message in S6105a, and transmits a seventh message in S6106a.

The second node U12A receives the fourth message in S6201a, and receives the seventh message in S6202a.

The third node U13A receives the second message in S6301a, transmits the third message in S6302a, transmits the fifth message in S6303a, and receives the sixth message in S6304a.

In one embodiment, the first node U11A is a relay node.

In one embodiment, the first node U11A provides relay services for the second node U12A.

In one embodiment, the first node U11A provides relay services for the third node U13A.

In one embodiment, the first node U11A provides L2 relay services for the second node U12A.

In one embodiment, the first node U11A provides L3 relay services for the second node U12A.

In one embodiment, the first node U11A is a header of the second node U12A.

In one embodiment, the first node U11A is a header of the third node U13A.

In one embodiment, a communication interface between the first node U11A and the second node U12A is PC5.

In one embodiment, a communication interface between the first node U11A and the third node U13A is PC5.

In one embodiment, a communication interface between the first node U11A and the third node U13A is Uu.

In one embodiment, the third node U13A is one UE.

In one embodiment, the third node U13A is one base station.

In one embodiment, the third node U13A is a node other than the first node U11A and the second node U12A.

In one embodiment, the second node U12A communicates with the third node U13A through the first node U11A.

In one embodiment, the second node U12A and the third node U13A both belong to a group managed by the first node U11A.

In one embodiment, the second node U12A and the third node U13A discover the first node U11A through a discovery process.

In one embodiment, the second node U12A and the third node U13A are discovered by the first node U11A through a discovery process.

In one embodiment, the second node U12A stores at least partial bits of the first key identity of the second node U12A to the first node U11A through a discovery process.

In one embodiment, the second node U12A stores at least one parameter in the first parameter set of the second node U12A to the first node U11A through a discovery process.

In one subembodiment, at least one parameter in the first parameter set is transmitted to the third node U13A in the discovery process of the third node U13A.

In one embodiment, the third node U13A stores at least partial bits of the second key identity of the third node U13A to the first node U11A through a discovery process.

In one subembodiment, at least one parameter in the second parameter set is transmitted to the third node U13A in the discovery process of the third node U13A.

In one embodiment, the second message triggers the third message.

In one embodiment, a feedback message triggered by the third message indicates that the security establishment is complete.

In one embodiment, the third message is used for establishing a security between the second node U12A and the third node U13A.

In one embodiment, the third message is used for establishing both a security between the second node U12A and the third node U13A and a security between the first node U11A and the third node U13A.

In one embodiment, the third message and the fifth message are multiplexed in one same MAC PDU.

In one embodiment, the second message is used for establishing a security between the second node U12A and the third node U13A and a security between the first node U11A and the third node U13A.

In one embodiment, when the third message is a DIRECT_SECURITY_MODE_REJECT, the fifth message may be a DIRECT_SECURITY_MODE_COMMAND.

In one embodiment, when the fifth message is a DIRECT_SECURITY_MODE_REJECT, the third message may be a DIRECT_SECURITY_MODE_COMMAND.

In one embodiment, when the third message is a DIRECT_SECURITY_MODE_REJECT, and the cause is a first reason, the third message indicates that an L3 relay is used from the second node U12A to the third node U13A.

In one embodiment, when the third message is a DIRECT_SECURITY_MODE_REJECT, and the cause is a first reason, the third message indicates that an L3 relay may be used or recommended from the second node U12A to the third node U13A.

In one embodiment, the first reason includes Direct communication to target UE not allowed.

In one embodiment, the first reason includes Authentication failure.

In one embodiment, the first reason includes Conflict of Layer 2 ID for unicast communication is detected.

In one embodiment, the first reason includes Lack of resources for proposed link.

In one embodiment, the first reason includes IP version mismatch.

In one embodiment, the first reason includes Link setup failure due to other errors.

In one embodiment, the first reason includes UE security capabilities mismatch.

In one embodiment, the first reason includes Unspecified error.

In one embodiment, the first reason includes Authentication synchronization error.

In one embodiment, the first reason includes Non-responsive peer during security mode procedure.

In one embodiment, when the third message is a DIRECT_SECURITY_MODE_REJECT, and the cause is a second reason, the fifth message is a DIRECT_SECURITY_MODE_REJECT too.

In one embodiment, the second reason includes Direct communication to target UE not allowed.

In one embodiment, the second reason includes Authentication failure.

In one embodiment, the second reason includes Conflict of Layer 2 ID for unicast communication is detected.

In one embodiment, the second reason includes Lack of resources for proposed link.

In one embodiment, the second reason includes IP version mismatch.

In one embodiment, the second reason includes Link setup failure due to other errors.

In one embodiment, the second reason includes UE security capabilities mismatch.

In one embodiment, the second reason includes Unspecified error.

In one embodiment, the second reason includes Authentication synchronisation error.

In one embodiment, the second reason includes Non-responsive peer during security mode procedure.

In one embodiment, when the third message is a DIRECT_SECURITY_MODE_REJECT, the fifth message is a DIRECT_COMMUNICATION_REJECT.

In one embodiment, when the fifth message is a DIRECT_SECURITY_MODE_REJECT, the third message is a DIRECT_COMMUNICATION_REJECT.

In one embodiment, the second message indicates an association relationship between the third message and the fifth message, whether the third message is a DIRECT_COMMUNICATION_REJECT or a DIRECT_SECURITY_MODE_COMMAND when the fifth message is a DIRECT_SECURITY_MODE_REJECT.

In one embodiment, the fourth message is generated by the third message, and the fourth message includes at least one source carried by the third message.

In one embodiment, the fourth message and the third message are both PC5-S messages.

In one embodiment, when the third message is a DIRECT_SECURITY_MODE_REJECT, the fourth message indicates whether an L3 relay is supported.

In one embodiment, when the third message is a DIRECT_SECURITY_MODE_REJECT, the fourth message indicates that an L3 relay may be used or recommended.

In one embodiment, the fourth message indicates whether the security establishment between the first node U11A and the third node U13A is successful or complete.

In one embodiment, the fourth message indicates whether the security establishment between the first node U11A and the third node U13A is failed.

In one embodiment, the fourth message indicates whether the direct communication between the first node U11A and the third node U13A is failed.

In one embodiment, the fourth message indicates whether the direct communication between the first node U11A and the third node U13A is complete.

In one embodiment, the fourth message indicates whether the fifth message is a DIRECT_SECURITY_MODE_REJECT.

In one embodiment, when the fourth message is a DIRECT_SECURITY_MODE_COMMAND or DIRECT_SECURITY_MODE_COMPLET, and the fourth message indicates that the fifth message is a DIRECT_SECURITY_MODE_REJECT, the second node U12A establishes an RRC entity for the third node U13A.

In one embodiment, when the fourth message is a DIRECT_SECURITY_MODE_COMMAND or DIRECT_SECURITY_MODE_COMPLETE, and the fourth message indicates that the fifth message is a DIRECT_SECURITY_MODE_REJECT, the second node U12A establishes an RRC entity for a connection between the second node U12A and the third node U13A.

In one embodiment, the sixth message is used for indicating a state of security establishment between the first node U11A and the second node U12A.

In one subembodiment, the state of security establishment includes at least one of Reject, Success, Complete or Executing.

In one embodiment, the sixth message is used for indicating a state of communication connection establishment between the first node U11A and the second node U12A.

In one subembodiment, the state of communication connection establishment includes at least one of Reject, Success, Complete or Executing.

In one embodiment, the sixth message indicates that a security establishment between the first node U11A and the second node U12A is failed, then the third node U13A transmits a message about security establishment reject or direct communication reject.

In one subembodiment, the security establishment reject includes a DIRECT_SECURITY_MODE_REJECT.

In one subembodiment, the security establishment reject includes a DIRECT_COMMUNICATION_REJECT.

In one embodiment, the seventh message is used for indicating a state of security establishment between the first node U11A and the third node U13A.

In one subembodiment, the state of security establishment includes at least one of Reject, Failed, Success, Complete or Executing.

In one embodiment, the seventh message is used for indicating a state of communication connection establishment between the first node U11A and the third node U13A.

In one subembodiment, the state of communication connection establishment includes at least one of Reject, Failed, Success, Complete or Executing.

In one embodiment, when the seventh message indicates that a security establishment between the first node U11A and the third node U13A is failed, the second node U12A transmits a DIRECT_SECURITY_MODE_REJECT or DIRECT_COMMUNICATION_REJECT for the third node U13A.

In one embodiment, when the seventh message indicates that a security establishment between the first node U11A and the third node U13A is failed, the second node U12A transmits a DIRECT_SECURITY_MODE_COMPLETE for the third node U13A.

In one subembodiment, the security establishment failed includes failure or failed.

In one subembodiment, the security establishment failed includes reject.

In one embodiment, when the seventh message indicates that a security establishment between the first node U11A and the third node U13A is failed, an L2 relay is used for the communication from the second node U12A to the third node U13A.

In one embodiment, when the seventh message indicates that a direct communication establishment between the first node U11A and the third node U13A is failed, an L2 relay is used for the communication from the second node U12A to the third node U13A.

In one embodiment, when the seventh message indicates that a security establishment between the first node U11A and the third node U13A is failed, an RRC signaling transmitted from the first node U11A to the third node U13A is generated by the second node U12A.

In one embodiment, the third message indicates whether the third node U13 is within a serving cell.

In one embodiment, the fifth message indicates whether the third node U13 is within a serving cell.

In one embodiment, the seventh message indicates whether the third node U13 is within a serving cell.

In one embodiment, the fourth message indicates whether the third node U13 is within a serving cell.

In one embodiment, when the third node U13A is within a serving cell, the third node U13A determines a relay type used in the communication from the second node U12A to the third node U13A.

In one embodiment, when the third node U13A is not within a serving cell, the first node U11A determines a relay type used in the communication from the second node U12A to the third node U13A.

In one embodiment, when the third node U13A is not within a serving cell, the second node U12A determines a relay type used in the communication from the second node U12A to the third node U13A.

In one embodiment, when the third node U13A is not within a serving cell and the third message is a DIRECT_SECURITY_MODE_REJEC, an L3 relay is used for the communication between the second node U12A and the third node U13A.

In one embodiment, when the third node U13A is not within a serving cell and the fifth message is a DIRECT_SECURITY_MODE_REJECT, an L2 relay is used for the communication between the second node U12A and the third node U13A.

In one embodiment, when the second node U12A is not within a serving cell and the fourth message is a DIRECT_SECURITY_MODE_REJECT, an L3 relay is used for the communication between the second node U12A and the third node U13A.

In one embodiment, when the second node U12A is not within a serving cell and the seventh message is a DIRECT_SECURITY_MODE_REJECT, an L2 relay is used for the communication between the second node U12A and the third node U13A.

In one embodiment, when the second node U12A determines that an L3 relay is used for the communication between the second node U12A and the third node U13A, the second node U12A indicates that the first node U11A L3 relay is used for the communication between the second node U12A and the third node U13A.

In one embodiment, when the third node U13A determines that an L3 relay is used for the communication between the second node U12A and the third node U13A, the third node U13A indicates that the first node U11A L3 relay is used for the communication between the second node U12A and the third node U13A.

Embodiment 7A

Figure 7A:
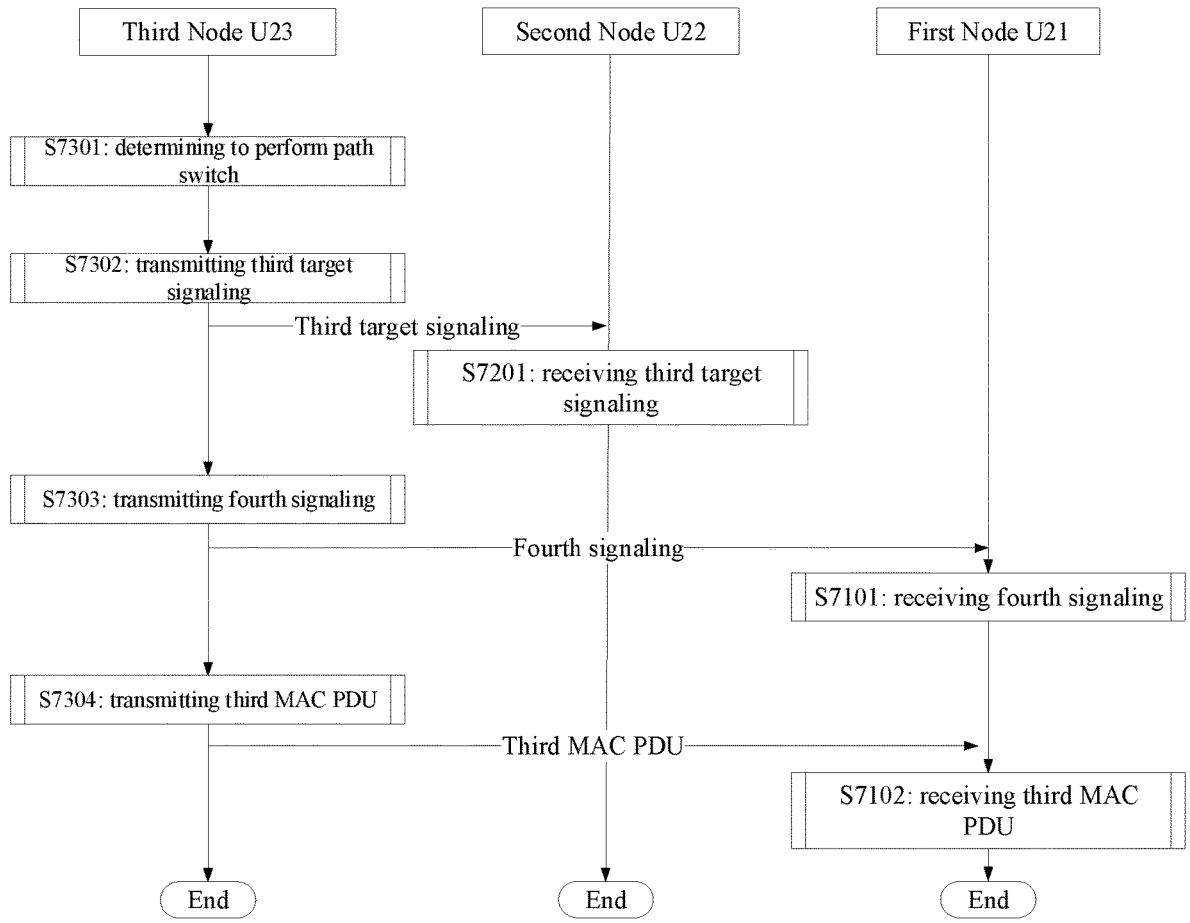
FIG. 7A is a flowchart of transmission according to one embodiment of the disclosure.

Embodiment 7A illustrates a flowchart of transmission of a radio signal according to one embodiment of the disclosure, as shown in FIG. 7A. In FIG. 7A, U21 corresponds to the first node in the disclosure, U22 corresponds to the second node in the disclosure, U23 corresponds to the third node in the disclosure, in particular, the sequence in the present embodiment does not limit the sequence of signal transmission and the sequence of implementation in the disclosure. Embodiment 7A is based on Embodiment 5A, and the parts covered but not detailed in Embodiment 7A can refer to Embodiment 5A.

The first node U21 receives a fourth signaling in S7101, and receives a third MAC PDU in S7102.

The second node U22 receives a third target signaling in S7201.

The third node U23 determines to perform path switch in S7301, transmits a third target signaling in S7302, transmits a fourth signaling in S7303, and transmits a third MAC PDU in S7304.

In one embodiment, in S7301, the third node U23 determines according to a measurement of a reference signal transmitted by the first node U1 that a radio link from the third node U23 to the first node U21 is better or meets service requirements, and thereby determining to perform path switch.

In one subembodiment, the measurement of the reference signal includes measuring at least one of an RSRP, an RSRQ, an SNR or an SINR.

In one embodiment, in S7301, the third node U23 determines to perform path switch according to an upper layer indication.

In one embodiment, the behavior to perform path switch includes using a new RLC bearer to transmit the same data on a radio bearer.

In one embodiment, the behavior to perform path switch includes using a new relay node to transmit data.

In one embodiment, the behavior to perform path switch includes changing from using a relay to using no relay to directly transmit data.

In one embodiment, the behavior to perform path switch includes changing a transmission path between a source node and a destination node.

In one embodiment, the behavior to perform path switch includes changing a radio bearer of a unicast link between a source node and a destination node.

In one embodiment, the behavior to perform path switch includes changing an RLC bearer of a unicast link between a source node and a destination node.

In one embodiment, the behavior to perform path switch includes changing an MAC entity of a unicast link between a source node and a destination node.

In one embodiment, the behavior to perform path switch includes reconfiguring at least one of a radio bearer, an RLC bearer or an MAC entity between a source node and a destination node.

In one embodiment, the third MAC PDU includes a third MAC sub-PDU, the third MAC sub-PDU includes the target identity and a third data packet, and the target identity is used for a security algorithm of the third data packet, wherein the third data packet and the first data packet are generated in one same PDCP entity.

In one embodiment, a transmitter of the third MAC PDU is QCLed with a transmitter of the first MAC PDU.

In one embodiment, a transmitter of the third MAC PDU and a transmitter of the first MAC PDU are one same node.

In one embodiment, a transmitter of the third MAC PDU and a transmitter of the first MAC PDU have a same link layer identity.

In one embodiment, a source identity included in the third MAC PDU is the same as a source identity included in the first MAC PDU.

In one embodiment, the second signaling is used for indicating that the first logical channel identity and the second logical channel identity are both associated to a first radio bearer; and the first radio bearer includes the one same PDCP entity.

In one embodiment, the second signaling is used for indicating that the first logical channel identity and the second logical channel identity are both associated to a first radio bearer; and the one same PDCP entity is established according to a signaling for configuring the first radio bearer.

In one embodiment, the fourth signaling is used for indicating that the first radio bearer is associated to the target logical channel and the first radio bearer is no longer simultaneously associated to an RLC bearer corresponding to the first logical channel identity and an RLC bearer corresponding to the second logical channel identity; and the first radio bearer includes the one same PDCP entity.

In one embodiment, the fourth signaling is used for indicating that the one same PDCP entity is associated to an RLC entity corresponding to the target identity, and the one same PDCP entity is no longer simultaneously associated to an RLC entity corresponding to the first logical channel identity and an RLC entity corresponding to the second logical channel identity.

In one embodiment, the fourth signaling is used for indicating that the first radio bearer is associated to the target logical channel and the first radio bearer is no longer simultaneously associated to the first logical channel identity and the second logical channel identity; and the first radio bearer includes the one same PDCP entity.

In one embodiment, the fourth signaling is used for indicating that the first radio bearer is associated to the target logical channel and the first radio bearer is no longer simultaneously associated to the first logical channel identity and the second logical channel identity; and the one same PDCP entity is established according to a signaling for configuring the first radio bearer.

In one embodiment, the fourth signaling is used for indicating to remove or release the first logical channel identity.

In one embodiment, the fourth signaling is used for indicating to remove or release the second logical channel identity.

In one embodiment, as a response to the reception of the fourth signaling, the first node U31 transmits a third target signaling to the second node U22, indicating to remove or release the second logical channel identity.

In one embodiment, as a response to the reception of the fourth signaling, the first node U31 transmits a third target signaling to the second node U22, indicating to remove or release an RLC bearer corresponding to the second logical channel identity.

In one embodiment, the third target signaling includes an RRC signaling.

In one embodiment, the third target signaling includes a PC5-S signaling.

In one embodiment, the third target signaling includes an RRCReconfigurationSidelink.

In one embodiment, the third target signaling includes an RRCReconfigurationCompleteSidelink.

In one embodiment, the third target signaling includes a Direct link release request.

In one embodiment, the third target signaling includes a DIRECT LINK MODIFICATION REQUEST.

In one embodiment, the third target signaling includes a DIRECT LINK MODIFICATION ACCEPT.

In one embodiment, the first signaling is used for configuring the first radio bearer.

In one embodiment, the second signaling is used for configuring the first radio bearer.

In one embodiment, the second signaling indicates that the first radio bearer is associated to both the first logical channel identity and the second logical channel identity.

In one embodiment, the second signaling indicates that the first radio bearer is associated to both an RLC bearer corresponding to the first logical channel identity and an RLC bearer corresponding to the second logical channel identity.

In one embodiment, the second signaling indicates that the one same PDCP entity is associated to both an RLC entity corresponding to the first logical channel identity and an RLC entity corresponding to the second logical channel identity.

In one embodiment, the third MAC sub-PDU includes a third MAC sub-header, and the third MAC sub-header includes the target identity.

In one embodiment, the third MAC sub-header includes at least partial bits of the first link layer identity and at least partial bits of the third link layer identity.

In one embodiment, the third MAC sub-header includes 16 most significant bits of the first link layer identity and 8 most significant bits of the third link layer identity.

In one embodiment, the fourth signaling includes an RRC signaling.

In one embodiment, the fourth signaling includes a PC5-S signaling.

In one embodiment, the fourth signaling includes an RRCReconfigurationSidelink.

In one embodiment, the fourth signaling includes an RRCReconfigurationCompleteSidelink.

In one embodiment, the fourth signaling includes a DIRECT LINK ESTABLISHMENT REQUEST.

In one embodiment, the fourth signaling includes a DIRECT LINK ESTABLISHMENT ACCEPT.

In one embodiment, the fourth signaling includes a DIRECT LINK MODIFICATION REQUEST.

In one embodiment, the fourth signaling includes a DIRECT LINK MODIFICATION ACCEPT.

In one embodiment, the first radio bearer is used for carrying the first MAC PDU.

In one embodiment, the first radio bearer is used for carrying the second MAC PDU.

In one embodiment, the first radio bearer is an SLRB.

In one embodiment, the first radio bearer is a DRB.

In one embodiment, the first radio bearer is an SRB.

In one embodiment, the first MAC PDU is associated to the first radio bearer.

In one embodiment, the second MAC PDU is associated to the first radio bearer.

In one embodiment, the first MAC PDU is used for transmitting the data carried by the first radio bearer.

In one embodiment, the second MAC PDU is used for transmitting the data carried by the first radio bearer.

In one embodiment, the first data packet is transmitted through the first radio bearer.

In one embodiment, the third data packet and the first data packet are generated in one same PDCP entity.

In one embodiment, the phrase that the third data packet and the first data packet are generated in one same PDCP entity includes: the third data packet and the first data packet use one same radio bearer.

In one embodiment, the phrase that the third data packet and the first data packet are generated in one same PDCP entity includes: the third data packet and the first data packet use one same end-to-end radio link.

In one embodiment, the phrase that the third data packet and the first data packet are generated in one same PDCP entity includes: the third data packet and the first data packet use a same encryption algorithm.

In one embodiment, the phrase that the third data packet and the first data packet are generated in one same PDCP entity includes: the third data packet and the first data packet are encrypted using a same key.

Embodiment 7B

Figure 7B:
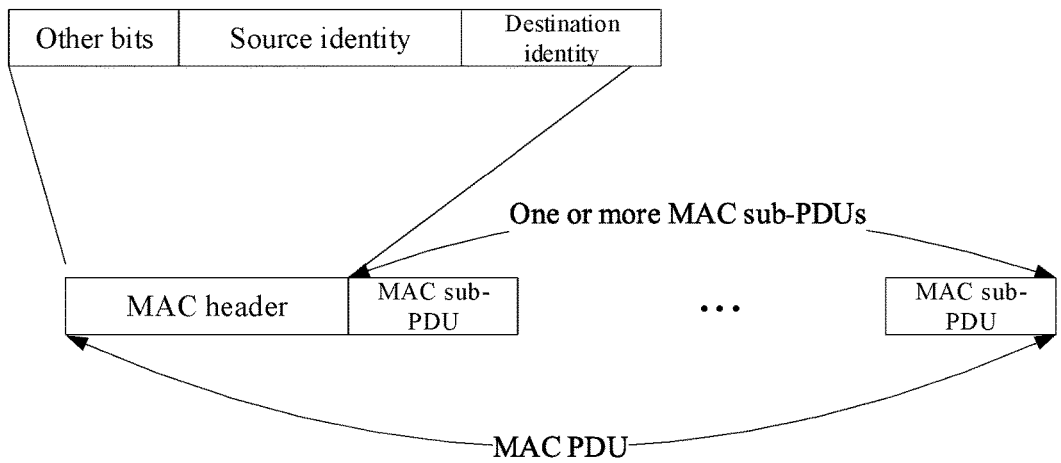
FIG. 7B is diagram of one MAC PDU according to one embodiment of the disclosure.

Embodiment 7B illustrates a diagram of one MAC PDU according to one embodiment of the disclosure, as shown in FIG. 7B.

In Embodiment 7B, one MAC PDU includes one MAC header and at least one MAC sub-PDU, and the MAC header includes a source identity, a destination identity and other bits.

In one embodiment, the MAC PDU is transmitted on an SL-SCH.

In one embodiment, the MAC header includes a fixed number of bits.

In one embodiment, the MAC header includes 32 bits.

In one embodiment, the MAC header is an SL-SCH MAC sub-header.

In one embodiment, the MAC header is an SL-SCH sub-header.

In one embodiment, the other bits include five fields: V, R, R, R, R, which include 4, 1, 1, 1, 1 bit(s) respectively.

In one embodiment, the source identity and the destination identity include 16 bits and 8 bits respectively.

In one embodiment, the source identity in the MAC header and the destination identity in the MAC header are an SRC field and a DST field respectively.

In one embodiment, each MAC sub-PDU includes one MAC sub-header and one MAC SDU, the MAC sub-header in each MAC sub-PDU includes an LCID field, and the LCID field indicates a channel identity of a logical channel corresponding to the MAC SDU.

In one embodiment, the LCID field includes 5 bits.

In one embodiment, the LCID field includes 6 bits.

In one embodiment, each MAC PDU is also allowed to include a padding bit.

In one embodiment, one MAC sub-PDU includes an RLC PDU.

In one embodiment, one MAC sub-PDU includes an MAC CE.

In one embodiment, the MAC PDU in FIG. 7B is the first MAC PDU in the disclosure.

In one subembodiment, the first MAC PDU at least includes a first MAC sub-PDU.

In one embodiment, the MAC PDU in FIG. 7B is the second MAC PDU in the disclosure.

In one subembodiment, the second MAC PDU at least includes a second MAC sub-PDU.

Embodiment 8A

Figure 8A:
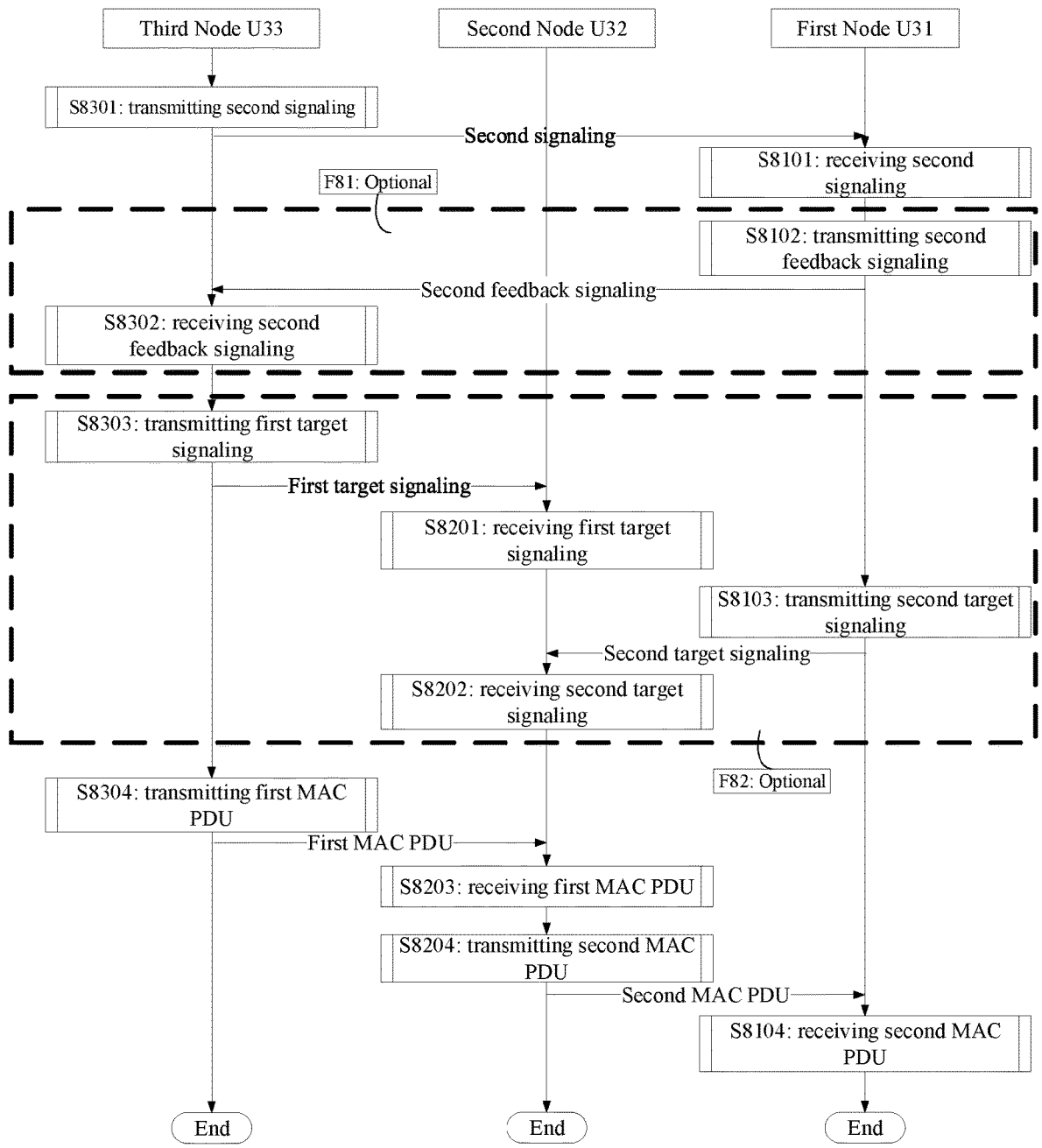
FIG. 8A is a flowchart of transmission according to one embodiment of the disclosure.

Embodiment 8A illustrates a flowchart of transmission of a radio signal according to one embodiment of the disclosure, as shown in FIG. 8A. In FIG. 8A, U31 corresponds to the first node in the disclosure, U32 corresponds to the second node in the disclosure, and U33 corresponds to the third node in the disclosure; in particular, the sequence in the present embodiment does not limit the sequence of signal transmission and the sequence of implementation in the disclosure, and steps in F81 and F82 are optional. Embodiment 8A is based on Embodiment 5A, and the parts needed by not illustrated in Embodiment 8A can refer to Embodiment 5A.

The first node U31 receives a second signaling in S8101, transmits a second feedback signaling in S8102, transmits a second target signaling in S8103, and receives a second MAC PDU in S8104.

The second node U32 receives a first target signaling in S8201, receives a second target signaling in S8202, receives a first MAC PDU in S8203, and transmits a second MAC PDU in S8204.

The third node U33 transmits a second signaling in S8301, receives a second feedback signaling in S8302, transmits a first target signaling in S8303, and transmits a first MAC PDU in S8304.

In Embodiment 8A, the second signaling indicates a target identity; the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, a communication interface between the first node U31 and the second node U32 is PC5.

In one embodiment, a communication interface between the first node U31 and the third node U33 is PC5.

In one embodiment, a communication interface between the third node U33 and the second node U32 is PC5.

In one embodiment, a communication interface between the first node U31 and the second node U32 is Uu.

In one embodiment, a communication interface between the first node U31 and the third node U33 is Uu.

In one embodiment, a communication interface between the third node U33 and the second node U32 is Uu.

In one embodiment, the second node U32 is a relay node between the first node U31 and the third node U33.

In one embodiment, the second node U32 is a Layer2 (L2) relay node between the first node U31 and the third node U33.

In one embodiment, the second signaling includes an RRC signaling.

In one embodiment, the second signaling includes an RRCReconfigurationSidelink signaling.

In one embodiment, the second feedback signaling is used for feeding back the second signaling.

In one embodiment, the second feedback signaling includes an RRCReconfigurationCompleteSidelink signaling.

In one embodiment, the first target signaling includes an RRC signaling.

In one embodiment, the first target signaling includes an RRCReconfigurationSidelink.

In one embodiment, the first target signaling includes an RRCConnectionReconfigurationSidelink.

In one embodiment, the second node U32 transmits to the third node U33 a signaling used for acknowledging the first target signaling.

In one embodiment, the first target signaling includes the target identity.

In one embodiment, the first target signaling includes the first logical channel identity.

In one embodiment, the first target signaling does not include an identity of a radio bearer used for carrying the first data packet.

In one embodiment, the first target signaling does not include a radio bearer configuration index of a radio bearer used for carrying the first data packet.

In one embodiment, the first target signaling includes a configuration of an adaption layer or adaption sublayer.

In one embodiment, the first target signaling includes a configuration of an adaption layer or adaption sublayer, and the target identity belongs to one item in the configuration of the adaption layer or adaption sublayer.

In one embodiment, the first target signaling includes a configuration of an adaption layer or adaption sublayer, and the first link layer identity belongs to one item in the configuration of the adaption layer or adaption sublayer.

In one embodiment, the first target signaling includes a configuration of an adaption layer or adaption sublayer, and the third link layer identity belongs to one item in the configuration of the adaption layer or adaption sublayer.

In one embodiment, the second target signaling includes an RRC signaling.

In one embodiment, the second target signaling includes an RRCReconfigurationSidelink.

In one embodiment, the second target signaling includes an RRCConnectionReconfiguration Side link.

In one embodiment, the second node U32 transmits to the first node U31 a signaling used for acknowledging the second target signaling.

In one embodiment, the second target signaling includes the target identity.

In one embodiment, the second target signaling includes the second logical channel identity.

In one embodiment, the second target signaling does not include an identity of a radio bearer used for carrying the first data packet.

In one embodiment, the second target signaling does not include a radio bearer configuration index of a radio bearer used for carrying the first data packet.

In one embodiment, the second target signaling includes a configuration of an adaption layer or adaption sublayer.

In one embodiment, the second target signaling includes a configuration of an adaption layer or adaption sublayer, and the target identity belongs to one item in the configuration of the adaption layer or adaption sublayer.

In one embodiment, the second target signaling includes a configuration of an adaption layer or adaption sublayer, and the first link layer identity belongs to one item in the configuration of the adaption layer or adaption sublayer.

In one embodiment, the second target signaling includes a configuration of an adaption layer or adaption sublayer, and the third link layer identity belongs to one item in the configuration of the adaption layer or adaption sublayer.

In one embodiment, the adaption layer or adaption sublayer configured by the second target signaling terminates at the first node U31 and the second node U32.

In one embodiment, the adaption layer or adaption sublayer configured by the first target signaling terminates at the third node U33 and the second node U32.

In one embodiment, the second node U32 associates the first logical channel identity to the second logical channel identity through the target identity.

In one embodiment, the second node U32 associates the first logical channel identity to the second logical channel identity through the target identity, the first link layer identity and the third link layer identity.

In one embodiment, a reception of the second feedback signaling triggers a transmission of the first target signaling.

In one embodiment, a transmission of the second feedback signaling triggers a transmission of the second target signaling.

In one embodiment, a reception of the second signaling triggers a transmission of the second target signaling.

Embodiment 8B

Figure 8B:
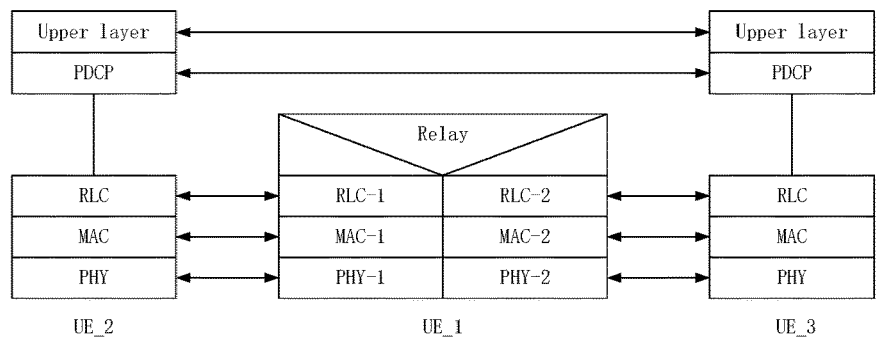
FIG. 8B is a diagram of L2 and L3 relays according to one embodiment of the disclosure.
Figure 8B:
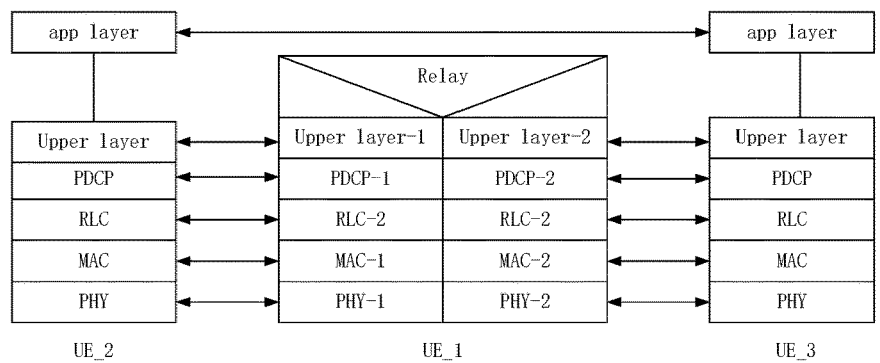

Embodiment 8B illustrates a diagram of L2 and L3 relays according to one embodiment of the disclosure, as shown in FIG. 8B.

Embodiment 8B (a) illustrates a protocol stack of L2 relay, and (b) illustrates a protocol stack of L3 relay.

In Embodiment 8B, UE_1 corresponds to the first node in the disclosure, UE_2 corresponds to the second node in the disclosure, and UE_3 corresponds to the third node in the disclosure.

In one embodiment, in the protocol stack of L2 relay shown in (a), the layers PHY, MAC and RLC of the UE_2 have connections to the layers PHY-1, MAC-1 and RLC-1 of the UE_1 respectively.

In one embodiment, in the protocol stack of L2 relay shown in (a), the layers PHY, MAC and RLC of the UE_2 have direct connections to the layers PHY-1, MAC-1 and RLC-1 of the UE_1 respectively.

In one embodiment, in the protocol stack of L2 relay shown in (a), the layers PHY, MAC and RLC of the UE_2 terminate at the layers PHY-1, MAC-1 and RLC-1 of the UE_1 respectively.

In one embodiment, in the protocol stack of L2 relay shown in (a), the layers PHY, MAC and RLC of the UE_3 have connections to the layers PHY-2, MAC-2 and RLC-2 of the UE_1 respectively.

In one embodiment, in the protocol stack of L2 relay shown in (a), the layers PHY, MAC and RLC of the UE_3 have direct connections to the layers PHY-2, MAC-2 and RLC-2 of the UE_1 respectively.

In one embodiment, in the protocol stack of L2 relay shown in (a), the layers PHY, MAC and RLC of the UE_3 terminate at the layers PHY-2, MAC-2 and RLC-2 of the UE_1 respectively.

In one embodiment, in the protocol stack of L2 relay shown in (a), the PDCP layer and Upper layer of the UE_2 have connections to the PDCP layer and Upper layer of the UE_3 respectively.

In one embodiment, in the protocol stack of L2 relay shown in (a), the PDCP layer and Upper layer of the UE_2 have direct connections to the PDCP layer and Upper layer of the UE_3 respectively.

In one embodiment, in the protocol stack of L2 relay shown in (a), the PDCP layer and Upper layer of the UE_2 terminate at the PDCP layer and Upper layer of the UE_3 respectively.

In one embodiment, when the protocol stack shown in (a) is a user plane, the Upper layer includes an SDAP layer.

In one embodiment, when the protocol stack shown in (a) is a user plane, the Upper layer includes an IP layer.

In one embodiment, when the protocol stack shown in (a) is a control plane, the Upper layer includes an RRC layer.

In one embodiment, when the protocol stack shown in (a) is a control plane, the Upper layer includes a PC5-S layer.

In one embodiment, when the protocol stack shown in (a) is a control plane, the Upper layer includes an NAS layer.

In one embodiment, when the protocol stack shown in (a) is a control plane, the Upper layer includes a v2x application layer.

In one embodiment, the first message, the second message, the third message, the fourth message, the fifth message, the sixth message and the seventh message in the disclosure come from the Upper layer.

In one embodiment, the UE_1 forwards messages coming from the PDCP layer and the Upper layer of the UE_2 and the UE_3.

In one embodiment, the UE_1 processes messages coming from layers below the PDCP layer of the UE_2 and the UE_3.

In one embodiment, in the protocol stack of L3 relay shown in (b), the layers PHY, MAC, RLC, PDCP and Upper layer of the UE_2 have connections to the layers PHY-1, MAC-1, RLC-1, PDCP-1 and Upper layer-1 of the UE_1 respectively.

In one embodiment, in the protocol stack of L3 relay shown in (b), the layers PHY, MAC, RLC, PDCP and Upper layer of the UE_2 have direct connections to the layers PHY-1, MAC-1, RLC-1, PDCP-1 and Upper layer-1 of the UE_1 respectively.

In one embodiment, in the protocol stack of L3 relay shown in (b), the layers PHY, MAC, RLC, PDCP and Upper layer of the UE_2 terminate at the layers PHY-1, MAC-1, RLC-1, PDCP-1 and Upper layer-1 of the UE_1 respectively.

In one embodiment, in the protocol stack of L3 relay shown in (b), the layers PHY, MAC, RLC, PDCP and Upper layer of the UE_3 have connections to the layers PHY-2, MAC-2, RLC-2, PDCP-2 and Upper layer-2 of the UE_1 respectively.

In one embodiment, in the protocol stack of L3 relay shown in (b), the layers PHY, MAC, RLC, PDCP and Upper layer of the UE_3 have direct connections to the layers PHY-2, MAC-2, RLC-2, PDCP-2 and Upper layer-2 of the UE_1 respectively.

In one embodiment, in the protocol stack of L3 relay shown in (b), the layers PHY, MAC, RLC, PDCP and Upper layer of the UE_3 terminate at the layers PHY-2, MAC-2, RLC-2, PDCP-2 and Upper layer-1 of the UE_1 respectively.

In one embodiment, when the protocol stack shown in (b) is a user plane, the Upper layer includes an SDAP layer.

In one embodiment, when the protocol stack shown in (b) is a user plane, the Upper layer includes an IP layer.

In one embodiment, when the protocol stack shown in (b) is a control plane, the Upper layer includes an RRC layer.

In one embodiment, when the protocol stack shown in (b) is a control plane, the Upper layer includes a PC5-S layer.

In one embodiment, when the protocol stack shown in (b) is a control plane, the Upper layer includes an NAS layer.

In one embodiment, when the protocol stack shown in (b) is a control plane, the Upper layer includes a v2x application layer.

In one embodiment, application layers of the UE_1 and the UE_3 have a connection.

In one embodiment, the application layer includes an IP layer.

In one embodiment, the application layer includes a TCP layer.

In one embodiment, when the L3 relay is used, an RRC signaling transmitted by the UE_2 terminates at the UE_1; and when the L2 relay is used, an RRC signaling transmitted by the UE_2 terminates at the UE_3.

In one embodiment, the Upper layer-2 of the UE_1 receives the third message, and the Upper layer-1 of the UE_1 transmits the fourth message.

In one embodiment, the Upper layer-2 of the UE_1 receives the third message, and the Upper layer-1 of the UE_1 transmits the fourth message.

In one embodiment, when a security is not established between the UE_2 and the UE_3, the L3 relay is used for communication between the UE_2 and the UE_3; when a security is established between the UE_2 and the UE_3, the L2 relay is used for communication between the UE_2 and the UE_3.

In one embodiment, the L3 relay is used for transmitting an unprotected message between the UE_2 and the UE_3, and the L2 relay is used for transmitting a protected message between the UE_2 and the UE_3.

Embodiment 9A

Figure 9A:
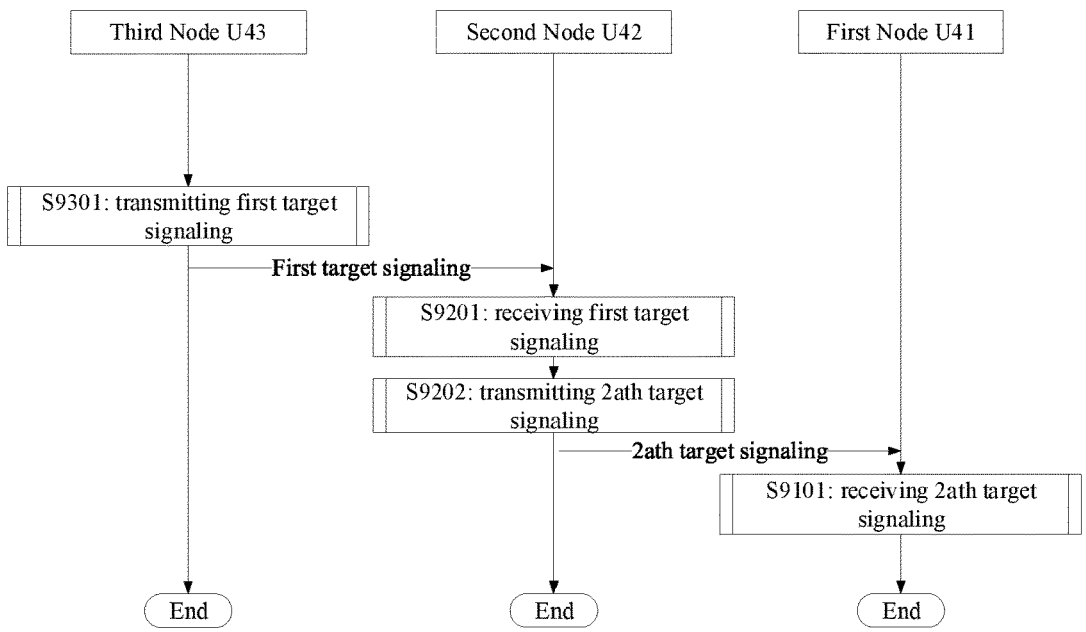
FIG. 9A is a flowchart of transmission according to one embodiment of the disclosure.

Embodiment 9A illustrates a flowchart of transmission of a radio signal according to one embodiment of the disclosure, as shown in FIG. 9A. In FIG. 9A, U41 corresponds to the first node in the disclosure, U42 corresponds to the second node in the disclosure, U43 corresponds to the third node in the disclosure, in particular, the sequence in the present embodiment does not limit the sequence of signal transmission and the sequence of implementation in the disclosure. Embodiment 9A is based on Embodiment 8A, and the parts needed but not illustrated in Embodiment 9A can refer to Embodiment 8A. Steps in Embodiment 9A are another implementation of F82 in Embodiment 8A.

The first node U41 receives a 2ath target signaling in S9101.

The second node U42 receives a first target signaling in S9201, and transmits a 2ath target signaling in S9202.

The third node U43 transmits a first target signaling in S9301.

In one embodiment, the 2ath target signaling includes an RRC signaling.

In one embodiment, the 2ath target signaling includes an RRCReconfigurationSidelink.

In one embodiment, the 2ath target signaling includes an RRCConnectionReconfigurationSidelink.

In one embodiment, the first node U41 transmits to the second node U42 a signaling used for acknowledging the 2ath target signaling.

In one embodiment, the 2ath target signaling includes the target identity.

In one embodiment, the 2ath target signaling includes the second logical channel identity.

In one embodiment, the 2ath target signaling does not include an identity of a radio bearer used for carrying the first data packet.

In one embodiment, the 2ath target signaling does not include a radio bearer configuration index of a radio bearer used for carrying the first data packet.

In one embodiment, the 2ath target signaling does not include the first logical channel identity.

In one embodiment, the 2ath target signaling includes a configuration of an adaption layer or adaption sublayer.

In one embodiment, the 2ath target signaling includes a configuration of an adaption layer or adaption sublayer, and the target identity belongs to one item in the configuration of the adaption layer or adaption sublayer.

In one embodiment, the 2ath target signaling includes a configuration of an adaption layer or adaption sublayer, and the first link layer identity belongs to one item in the configuration of the adaption layer or adaption sublayer.

In one embodiment, the 2ath target signaling includes a configuration of an adaption layer or adaption sublayer, and the third link layer identity belongs to one item in the configuration of the adaption layer or adaption sublayer.

In one embodiment, the adaption layer or adaption sublayer configured by the 2ath target signaling terminates at the first node U41 and the second node U42.

In one embodiment, a reception of the 2ath target signaling is used for triggering a transmission of the second feedback signaling.

In one embodiment, a reception of the first target signaling is used for triggering a transmission of the 2ath target signaling.

In one embodiment, the behavior that the second node U42 receives a feedback signaling for the 2ath target signaling triggers the second node U42 to associate the first logical channel identity to the second logical channel identity.

Embodiment 9B

Embodiment 9B illustrates a diagram of a communication link according to one embodiment of the disclosure, as shown in FIG. 9B.

In Embodiment 9B, a node A1 corresponds to the second node in the disclosure, a node B1 corresponds to the first node in the disclosure, and a node C1 corresponds to the third node in the disclosure.

In one embodiment, a link 3 is a communication link between the node A1 and the node C1.

In one subembodiment, the link 3 includes an L2 connection.

In one subembodiment, the link 3 includes an L3 connection.

In one subembodiment, the link 3 includes a unicast connection.

In one subembodiment, the link 3 includes a unicast link.

In one subembodiment, the link 3 includes a radio bearer.

In one embodiment, a link 1 is a communication link between the node A1 and the node B1.

In one subembodiment, the link 1 includes an L2 connection.

In one subembodiment, the link 1 includes an L3 connection.

In one subembodiment, the link 1 includes a unicast connection.

In one subembodiment, the link 1 includes a unicast link.

In one subembodiment, the link 1 includes a radio bearer.

In one embodiment, a link 2 is a communication link between the node B1 and the node C1.

In one subembodiment, the link 2 includes an L2 connection.

In one subembodiment, the link 2 includes an L3 connection.

In one subembodiment, the link 2 includes a unicast connection.

In one subembodiment, the link 2 includes a unicast link.

In one subembodiment, the link 2 includes a radio bearer.

In one embodiment, when an L3 relay is used, the link 3 includes an application layer only.

In one embodiment, when an L2 relay is used, the link 3 at least includes a PDCP layer.

In one embodiment, when an L2 relay is used, the link 3 at least includes an RRC layer.

In one embodiment, when an L2 relay is used, the link 3 at least includes a PC5-S layer.

In one embodiment, the first message in the disclosure is used for establishing a security of the link 3.

In one embodiment, the second message in the disclosure is used for establishing a security of the link 2.

In one embodiment, the first message in the disclosure is used for establishing a security of the link 1.

In one embodiment, the third message in the disclosure is used for establishing a security of the link 3.

In one embodiment, the fourth message in the disclosure is used for establishing a security of the link 3.

In one embodiment, the fifth message in the disclosure is used for establishing a security of the link 2.

In one embodiment, the sixth message in the disclosure is used for indicating a result of security establishment of the link 1.

In one embodiment, the seventh message in the disclosure is used for indicating a result of security establishment of the link 2.

In one embodiment, when a security establishment of the link 3 is failed, an L3 relay is determined as a relay type used by the link 3.

In one embodiment, when a security establishment of the link 2 is failed, an L2 relay is determined as a relay type used by the link 3.

Embodiment 10A

Embodiment 10A illustrates a flowchart of transmission of a radio signal according to one embodiment of the disclosure, as shown in FIG. 10A. In FIG. 10A, U51 corresponds to the first node in the disclosure, U52 corresponds to the second node in the disclosure, and U53 corresponds to the third node in the disclosure; in particular, the sequence in the present embodiment does not limit the sequence of signal transmission and the sequence of implementation in the disclosure. Embodiment 10A is based on Embodiment 8A, and the parts needed by not illustrated in Embodiment 10A can refer to Embodiment 8A. Steps in Embodiment 10A are another implementation of F82 in Embodiment 8A.

The first node U51 receives a 2ath target signaling in S10101.

The second node U52 transmits a 3ath target signaling in S10201 and transmits a 2ath target signaling in S10202.

The third node U53 receives a 3ath target signaling in S10301.

In one embodiment, the 3ath target signaling includes an RRC signaling.

In one embodiment, the 3ath target signaling includes an RRCReconfigurationSidelink.

In one embodiment, the 3ath target signaling includes an RRCConnectionReconfigurationSidelink.

In one embodiment, the third node U53 transmits to the second node U52 a signaling used for acknowledging the 3ath target signaling.

In one embodiment, the 3ath target signaling includes the target identity.

In one embodiment, the 3ath target signaling includes the first logical channel identity.

In one embodiment, the 3ath target signaling does not include an identity of a radio bearer used for carrying the first data packet.

In one embodiment, the 3ath target signaling does not include a radio bearer configuration index of a radio bearer used for carrying the first data packet.

In one embodiment, the 3ath target signaling does not include the second logical channel identity.

In one embodiment, the 3ath target signaling includes a configuration of an adaption layer or adaption sublayer.

In one embodiment, the 3ath target signaling includes a configuration of an adaption layer or adaption sublayer, and the target identity belongs to one item in the configuration of the adaption layer or adaption sublayer.

In one embodiment, the 3ath target signaling includes a configuration of an adaption layer or adaption sublayer, and the first link layer identity belongs to one item in the configuration of the adaption layer or adaption sublayer.

In one embodiment, the 3ath target signaling includes a configuration of an adaption layer or adaption sublayer, and the third link layer identity belongs to one item in the configuration of the adaption layer or adaption sublayer.

In one embodiment, the adaption layer or adaption sublayer configured by the 3ath target signaling terminates at the third node U53 and the second node U52.

In one embodiment, a reception of the first target signaling is used for triggering a transmission of the 3ath target signaling.

In one embodiment, the 2ath target signaling includes an RRC signaling.

In one embodiment, the 2ath target signaling includes an RRCReconfigurationSidelink.

In one embodiment, the 2ath target signaling includes an RRCConnectionReconfigurationSidelink.

In one embodiment, the first node U41 transmits to the second node U42 a signaling used for acknowledging the 2ath target signaling.

In one embodiment, the 2ath target signaling includes the target identity.

In one embodiment, the 2ath target signaling includes the second logical channel identity.

In one embodiment, the 2ath target signaling does not include an identity of a radio bearer used for carrying the first data packet.

In one embodiment, the 2ath target signaling does not include a radio bearer configuration index of a radio bearer used for carrying the first data packet.

In one embodiment, the 2ath target signaling does not include the first logical channel identity.

In one embodiment, the 2ath target signaling includes a configuration of an adaption layer or adaption sublayer.

In one embodiment, the 2ath target signaling includes a configuration of an adaption layer or adaption sublayer, and the target identity belongs to one item in the configuration of the adaption layer or adaption sublayer.

In one embodiment, the 2ath target signaling includes a configuration of an adaption layer or adaption sublayer, and the first link layer identity belongs to one item in the configuration of the adaption layer or adaption sublayer.

In one embodiment, the 2ath target signaling includes a configuration of an adaption layer or adaption sublayer, and the third link layer identity belongs to one item in the configuration of the adaption layer or adaption sublayer.

In one embodiment, the adaption layer or adaption sublayer configured by the 2ath target signaling terminates at the first node U41 and the second node U42.

In one embodiment, a reception of the 2ath target signaling is used for triggering a transmission of a second feedback signaling.

In one embodiment, a reception of the first target signaling is used for triggering a transmission of the 2ath target signaling.

In one embodiment, the behavior that the second node U42 receives a feedback signaling for the 2ath target signaling triggers the second node U42 to associate the first logical channel identity to the second logical channel identity.

Embodiment 10B

Embodiment 10B illustrates a diagram of a scenario in which whether a second message includes a first field is used for indicating a relay type of communication from a second node to a third node according to one embodiment of the disclosure, as shown in FIG. 10B.

In one embodiment, the first node provides relay services for the second node.

In one embodiment, the first node provides relay services for the third node.

In one embodiment, a type of relay services provided by the first node includes L2 relay.

In one embodiment, a type of relay services provided by the first node includes L3 relay.

In one embodiment, the first field is a field relative to security, and when the second message includes the first field, the relay type of communication from the second node to the third node is L2 relay.

In one subembodiment, the first field includes UE Security Capabilities of the second node.

In one subembodiment, the first field includes an AUTS.

In one subembodiment, the first field includes an RAND.

In one embodiment, the first field includes UE Security Capabilities of the second node, and a security algorithm indicated by the first field is not supported by the third node, then the L3 relay is determined as the relay type of communication from the second node to the third node.

In one embodiment, the first field includes UE Security Capabilities of the second node, and a security algorithm indicated by the first field is not supported by the third node, then the L2 relay is determined as the relay type of communication from the second node to the third node.

In one embodiment, the first field includes a higher-layer security algorithm required by the first node, and when the higher-layer security algorithm is not supported by the third node, the L2 relay is determined as the relay type of communication from the second node to the third node.

In one embodiment, the first field includes a higher-layer security algorithm required by the second node, and when the higher-layer security algorithm is not supported by the third node, the L3 relay is determined as the relay type of communication from the second node to the third node.

In one embodiment, the first field is a field relative to services.

In one subembodiment, the first field is a field relative to service requirements.

In one subembodiment, the first field is a field relative to a QoS.

In one subembodiment, the first field includes a QoS, and when the QoS indicated by the first field includes a QoS type that the third node cannot identity, the L3 relay is determined as the relay type between the second node and the third node.

In one embodiment, the first field is a field relative to user information.

In one subembodiment, the first field includes User Info.

In one subembodiment, the first field includes User Info of the third node.

In one subembodiment, the first field includes Target User Info of the third node.

In one subembodiment, when the first field includes User Info of the third node, the L2 relay is determined as the relay type between the second node and the third node.

In one embodiment, the first field is a field relative to a wireless network.

In one embodiment, the first field includes an RRC protocol release supported by the second node, and when the RRC protocol release supported by the second node is not supported by the third node, the L3 relay is determined as the relay type between the second node and the third node.

In one embodiment, the first field includes an RRC protocol release supported by the first node, and when the RRC protocol release supported by the first node is not supported by the third node, the L2 relay is determined as the relay type between the second node and the third node.

In one embodiment, the first field includes whether the first node is within a coverage, and when the first node is within the coverage, the L2 relay is determined as the relay type between the second node and the third node, otherwise, the L3 relay is determined as the relay type between the second node and the third node.

In one embodiment, the first field includes whether the first node is within a coverage, and when the first node is within the coverage, the L3 relay is determined as the relay type between the second node and the third node, otherwise, the L2 relay is determined as the relay type between the second node and the third node.

In one embodiment, the first field includes whether the second node is within a coverage, and when the second node is within the coverage, the L2 relay is determined as the relay type between the second node and the third node, otherwise, the L3 relay is determined as the relay type between the second node and the third node.

In one embodiment, the first field includes whether the second node is within a coverage, and when the second node is within the coverage, the L3 relay is determined as the relay type between the second node and the third node, otherwise, the L2 relay is determined as the relay type between the second node and the third node.

In one embodiment, the first field includes a PLMN; when a cell in which the first node resides requires to use the L2 relay, the L2 relay is determined as the relay type between the second node and the third node; when a cell in which the first node resides requires to use the L3 relay, the L3 relay is determined as the relay type between the second node and the third node.

In one embodiment, the first field includes a cell identity; when a cell in which the first node resides requires to use the L2 relay, the L2 relay is determined as the relay type between the second node and the third node; when a cell in which the first node resides requires to use the L3 relay, the L3 relay is determined as the relay type between the second node and the third node.

In one embodiment, the first field includes whether the first node is within a coverage, and when the first node is within the coverage and the third node is within the coverage, the L2 relay is determined as the relay type between the second node and the third node, otherwise, the L3 relay is determined as the relay type between the second node and the third node.

In one embodiment, the first field includes whether the first node is within a coverage, and when the first node is within the coverage and the third node is within the coverage, the L3 relay is determined as the relay type between the second node and the third node, otherwise, the L2 relay is determined as the relay type between the second node and the third node.

Embodiment 11

Embodiment 11 illustrates a diagram of one MAC PDU according to one embodiment of the disclosure, as shown in FIG. 11.

In Embodiment 11, one MAC PDU includes one MAC header and at least one MAC sub-PDU, and the MAC header includes a source identity, a destination identity and other bits.

In one embodiment, the MAC PDU is transmitted on an SL-SCH.

In one embodiment, the MAC header includes a fixed number of bits.

In one embodiment, the MAC header includes 32 bits.

In one embodiment, the MAC header is an SL-SCH MAC sub-header.

In one embodiment, the other bits include five fields: V, R, R, R, R, which include 4, 1, 1, 1, 1 bit(s) respectively.

In one embodiment, the source identity and the destination identity include 16 bits and 8 bits respectively.

In one embodiment, the source identity in the MAC header and the destination identity in the MAC header are an SRC field and a DST field respectively.

In one embodiment, the source identity corresponds to one of the first link layer identity, the first link layer identity or the first link layer identity in the disclosure.

In one embodiment, the destination identity corresponds to one of the first link layer identity, the first link layer identity or the first link layer identity in the disclosure.

In one embodiment, each MAC sub-PDU includes one MAC sub-header and one MAC SDU, the MAC sub-header in each MAC sub-PDU includes an LCID field, and the LCID field indicates a logical channel identity of a logical channel corresponding to the MAC SDU.

In one embodiment, one MAC sub-header includes one LCID field only.

In one embodiment, the LCID field indicates the first logical channel identity in the disclosure.

In one embodiment, the LCID field indicates the second logical channel identity in the disclosure.

In one embodiment, the LCID field in the third MAC PDU indicates the target identity in the disclosure.

In one embodiment, the LCID field includes 5 bits.

In one embodiment, the LCID field includes 6 bits.

In one embodiment, the MAC SDU field carries the first data packet in the disclosure.

In one embodiment, the MAC SDU field carries the second data packet in the disclosure.

In one embodiment, the MAC SDU field carries the third data packet in the disclosure.

In one embodiment, the MAC SDU field carries the fourth data packet in the disclosure.

In one embodiment, the first data packet is one PDCP PDU.

In one embodiment, the second data packet is one PDCP PDU.

In one embodiment, the third data packet is one PDCP PDU.

In one embodiment, the fourth data packet is one PDCP PDU.

In one embodiment, the first data packet is one PDCP SDU.

In one embodiment, the second data packet is one PDCP SDU.

In one embodiment, the third data packet is one PDCP SDU.

In one embodiment, the fourth data packet is one PDCP SDU.

In one embodiment, the first data packet includes one PDCP PDU.

In one embodiment, the second data packet includes one PDCP PDU.

In one embodiment, the third data packet includes one PDCP PDU.

In one embodiment, the fourth data packet includes one PDCP PDU.

In one embodiment, the MAC PDU in FIG. 11 is the first MAC PDU in the disclosure.

In one subembodiment, the first MAC PDU at least includes a first MAC sub-PDU.

In one embodiment, the MAC PDU in FIG. 11 is the second MAC PDU in the disclosure.

In one subembodiment, the second MAC PDU at least includes a second MAC sub-PDU.

In one embodiment, the MAC PDU in FIG. 11 is the target MAC PDU in the disclosure.

In one subembodiment, the target MAC PDU at least includes a target MAC sub-PDU.

In one embodiment, the MAC PDU in FIG. 11 is the third MAC PDU in Embodiment 12 of the disclosure.

In one subembodiment, the third MAC PDU at least includes a third MAC sub-PDU.

In one embodiment, the MAC PDU in FIG. 11 is the fourth MAC PDU in Embodiment 12 of the disclosure.

In one subembodiment, the fourth MAC PDU at least includes a fourth MAC sub-PDU.

In one embodiment, the MAC PDU in FIG. 11 is the fifth MAC PDU in Embodiment 12 of the disclosure.

In one subembodiment, the fifth MAC PDU at least includes a fifth MAC sub-PDU.

In one embodiment, the MAC PDU in FIG. 11 is the fourth MAC PDU in Embodiment 6 of the disclosure.

In one subembodiment, the fourth MAC PDU at least includes a fourth MAC sub-PDU.

In one embodiment, the MAC PDU in FIG. 11 is the fifth MAC PDU in Embodiment 6 of the disclosure.

In one subembodiment, the fifth MAC PDU at least includes a fifth MAC sub-PDU.

In one embodiment, the MAC PDU in FIG. 11 is the third MAC PDU in Embodiment 7 of the disclosure.

In one subembodiment, the third MAC PDU at least includes a third MAC sub-PDU.

Embodiment 12

Figure 12:
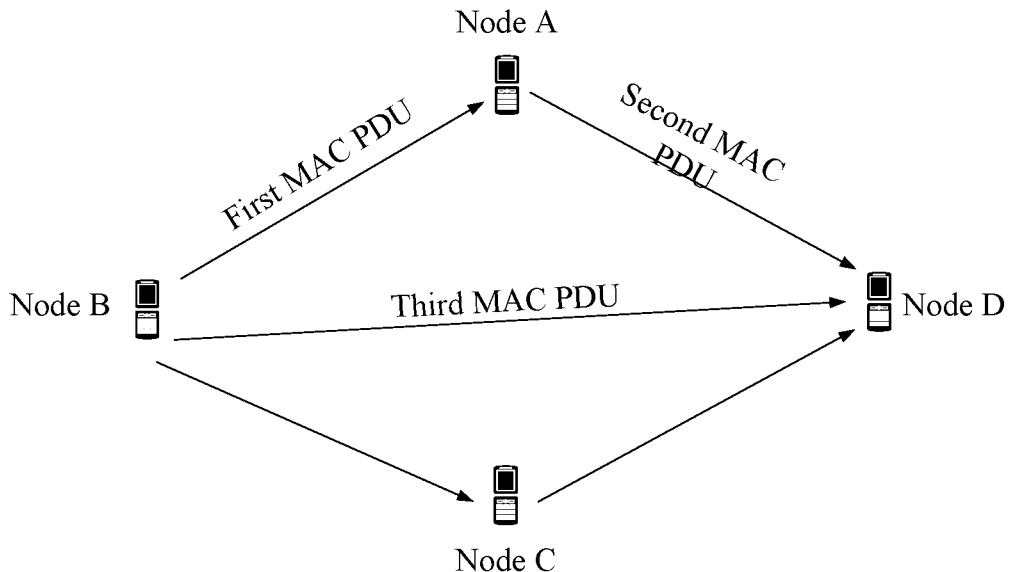
FIG. 12 is a diagram of communication between a node B and a node B according to one embodiment of the disclosure.

Embodiment 12 illustrates a diagram of communication between a node B and a node D according to one embodiment of the disclosure, as shown in FIG. 12.

In Embodiment 12, a node A corresponds to the second node in the disclosure, a node C is another relay node, a node B corresponds to the third node in the disclosure, and a node D corresponds to the first node in the disclosure.

In one embodiment, an interface between the node A and the node B is a PC5 interface.

In one embodiment, an interface between the node A and the node D is a PC5 interface.

In one embodiment, an interface between the node B and the node C is a PC5 interface.

In one embodiment, an interface between the node D and the node C is a PC5 interface.

In one embodiment, the node A and the node C are relay nodes in communication from the node B to the node D.

In one embodiment, the node B transmits a first data packet to the node D through the node A, the first data packet is carried by a first MAC PDU between the node B and the node A, the first MAC PDU includes a first MAC sub-PDU, and the first MAC sub-PDU includes a first MAC sub-header and a first data packet; the node A transmits a second MAC PDU to the node D to carry the first data packet, the first MAC PDU is used for generating the second MAC PDU, the second MAC PDU includes a second MAC sub-PDU, and the second MAC sub-PDU includes a second MAC sub-header and a first data packet.

In one embodiment, the first data packet included in the second MAC PDU comes from the first MAC PDU.

In one embodiment, the first data packet included in the second MAC PDU is directly copied from the first data packet carried in the first MAC PDU.

In one embodiment, the first data packet included in the second MAC PDU comes from the first data packet carried in the first MAC PDU, and the first data packet included in the second MAC PDU is not decrypted or encrypted by the node A.

In one embodiment, a source identity indicated by the second MAC sub-PDU is the same as a destination identity indicated by the first MAC sub-PDU.

In one embodiment, the second MAC PDU is used for forwarding data carried by the first MAC PDU.

In one embodiment, the node D transmits a fourth MAC PDU to the node A, the fourth MAC PDU is used for generating a fifth MAC PDU, the fourth MAC PDU includes a fourth MAC sub-PDU, and the fourth MAC sub-PDU includes a fourth MAC sub-header and a fourth data packet; the node A transmits the fifth MAC PDU, the fifth MAC PDU includes a fifth MAC sub-PDU, the fifth MAC sub-PDU includes a fifth MAC sub-header and a fourth data packet; a destination identity indicated by the fourth MAC sub-header is equal to a source identity indicated by the fifth MAC sub-header; and the target logical channel is used for a security algorithm of the fourth data packet.

In one embodiment, when the node B determines to perform path switch, the third MAC PDU is transmitted.

In one subembodiment, the behavior to perform path switch triggers the node B to perform direct communication with the node D.

In one subembodiment, the behavior to perform path switch triggers the node B and the node D to perform data transmission without the node A serving as a relay.

In one subembodiment, the node B transmits a third MAC PDU to the node D, the third MAC PDU includes a third MAC sub-PDU, the third MAC sub-PDU includes a third MAC sub-header and a third data packet, the target identity is used for a security algorithm of the third data packet, and the logical channel identity indicated by the third MAC sub-header is the target identity.

In one embodiment, a receiver of the first signaling is one of the node A or the node B.

In one embodiment, a transmitter of the second signaling is one of the node B or the node A.

In one embodiment, when the node B determines to perform path switch, the third MAC PDU is transmitted.

In one embodiment, when the node B determines to perform path switch, the target logical channel is used for a security algorithm of a PDCP PDU transmitted from the node B to the node D.

In one subembodiment, the behavior to perform path switch triggers the node B to perform communication/data transmission with the node D through the node C.

In one subembodiment, the behavior to perform path switch triggers a radio bearer between the node B and the node D to be associated to an RLC bearer between the node B and the node C and an RLC bearer between the node C and the node D.

Embodiment 13

Figure 13:
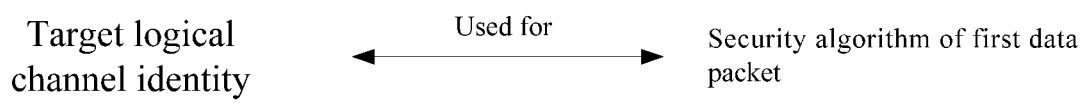
FIG. 13 is a diagram of a scenario in which a target identity is used for a security algorithm of a first data packet according to one embodiment of the disclosure.

Embodiment 13 illustrates a diagram of a scenario in which a target identity is used for a security algorithm of a first data packet according to one embodiment of the disclosure, as shown in FIG. 13.

In one embodiment, the security algorithm of the first data packet is executed by a PDCP entity.

In one embodiment, the security algorithm of the first data packet includes an encryption algorithm.

In one embodiment, the security algorithm of the first data packet includes a decryption algorithm In one embodiment, the security algorithm of the first data packet includes an integrity protection algorithm.

In one embodiment, the security algorithm of the first data packet includes an integrity protection verification algorithm.

In one embodiment, the third node executes the encryption and/or integrity protection algorithm of the first data packet.

In one embodiment, the first node executes the decryption and/or integrity protection verification algorithm of the first data packet.

In one embodiment, the first node and/or the third node obtains a first key through an internal algorithm and/or a signaling to a network, using a long-term certificate issued by a network or locally stored or in an SIM card; the first key has a length of K1 bits, for example, K1 is equal to 256; the first key is, for example, $K_{NRP}$; the first node and the third node share the first key; for example, the first node and the third node switch or synchronize the first key through a signaling, or switch or synchronize parameters used for obtaining the first key.

In one embodiment, the first node and/or the third node obtains a second key from the first key through an internal algorithm and/or signaling interaction, the second key includes K2 bits, and the K2 is equal to 256; for example, the second key is $K_{NRP-sess}$; the first node and/or the third node can uniquely determine the second key according to a Key Derivation Function (KDF), the first key and input parameters; the input parameters include {FC, P0, L0, P1, L1}; the parameters can be set to, for example: FC=0x7F; P0=Nonce_1; L0=0x00 0x10; P1=Nonce_2; L1=0x00 0x10.

In one embodiment, the first node and/or the third node generates a fourth key and/or a fifth key through the KDF, a third input parameter and a fourth input parameter according to the second key; the fourth key is used for encryption, and the fifth key is used for integrity protection; the third input parameter includes {FC=0x7E, P0=0x00, L0=0x00 0x01, P1=algorithm identity, L1=length of algorithm identity, for example, 0x00 0x01}; and the fourth input parameter includes {FC=0x7E, P0=0x01, L0=0x00 0x01, P1=algorithm identity, L1=length of algorithm identity, for example, 0x00 0x01}.

In one embodiment, the first node and/or the third node encrypts the first data packet through an encryption algorithm using the third key, wherein the identity of the algorithm is used for identifying the encryption algorithm.

In one embodiment, the encryption algorithm includes 128-NEA1.

In one embodiment, the encryption algorithm includes 128-NEA2.

In one embodiment, the encryption algorithm includes 128-NEA3.

In one embodiment, the first node and/or the third node performs integrity protection for the first data packet through an integrity protection algorithm using the fourth key, wherein the identity of the algorithm is used for identifying the integrity protection algorithm.

In one embodiment, the integrity protection algorithm includes 128-NIA1.

In one embodiment, the integrity protection algorithm includes 128-NIA2.

In one embodiment, the integrity protection algorithm includes 128-NIA3.

Embodiment 14

Figure 14:
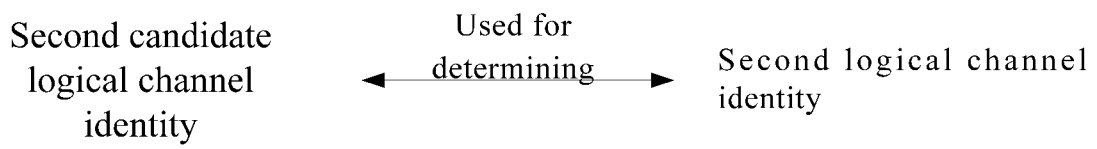
FIG. 14 is a diagram of a scenario in which a second candidate logical channel identity is used for determining a second logical channel identity according to one embodiment of the disclosure.

Embodiment 14 illustrates a diagram of a scenario in which a second candidate logical channel identity is used for determining a second logical channel identity according to one embodiment of the disclosure, as shown in FIG. 14.

In one embodiment, the second candidate logical channel identity is used for determining the second logical channel identity.

In one embodiment, values of five least significant bits of the second candidate logical channel identity are used for determining values of five least significant bits of the second logical channel identity.

In one embodiment, the second candidate logical channel identity is used for determining the first logical channel identity, and the first logical channel identity is used for determining the second logical channel identity.

In one subembodiment, values of five least significant bits of the first logical channel identity are used for determining values of five least significant bits of the second logical channel identity.

In one subembodiment, values of bits other than five least significant bits of the first logical channel identity are reversed and then are determined as values of corresponding bits in the second logical channel identity; the first logical channel identity and the second logical channel identity have a same number of bits.

In one subembodiment, what obtained after an XOR of 1 and a value of a most significant bit among six least significant bits of the first logical channel identity is determined as a value of a most significant bit among six least significant bits of the second candidate logical channel identity.

In one subembodiment, values obtained through bit random setting other than five least significant bits of the first logical channel identity are processed with 0/1 reversal and then are determined as values of corresponding bits in the second logical channel identity; the first logical channel identity and the second logical channel identity have a same number of bits.

In one embodiment, the first logical channel identity and the second logical channel identity both have K1 bits, and values of five least significant bits among the K1 bits are equal to values of five least significant bits of the second candidate logical channel identity; the first bit to the (K1−5)th bit of the first logical channel identity at least include an Lth bit, wherein $1 \leq L \leq K1-5$, and the Lth bit of the first logical channel identity is different from the Lth bit of the second logical channel identity.

In one subembodiment, the XOR of the Lth bit of the first logical channel identity and the Lth bit of the second logical channel identity is 1.

In one subembodiment, the first bit to the (K1-5)th bit of the first logical channel identity are randomly generated; bits of the second logical channel identity other than the Lth bit are randomly generated; and the Lth bit of the second logical channel identity is an XOR of the value of the Lth bit of the first logical channel identity and 1.

In one embodiment, the second candidate logical channel identity is directly determined as the second logical channel identity.

In one embodiment, the second candidate logical channel identity is directly determined as the target identity.

In one embodiment, any one candidate logical channel identity in the first candidate logical channel identity set is determined as the second candidate logical channel identity.

In one embodiment, any one candidate logical channel identity in the first candidate logical channel identity set is determined as the target identity.

Embodiment 15

Figure 15:
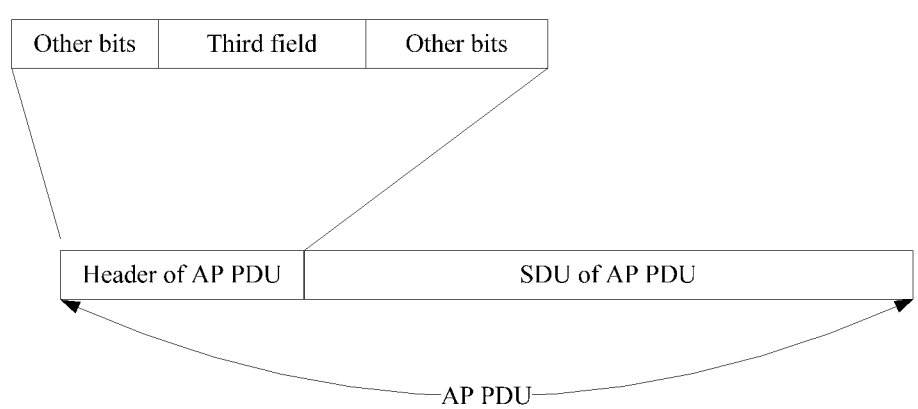
FIG. 15 is a diagram of one adaption layer PDU according to one embodiment of the disclosure.

Embodiment 15 illustrates a diagram of one adaption layer PDU according to one embodiment of the disclosure, as shown in FIG. 15.

An adaption layer PDU in Embodiment 15 is generated or received by the sublayer AP308 or the sublayer AP358 in Embodiment 3.

The adaption layer PDU in Embodiment 15 includes a header of the adaption layer PDU and an SDU carried by the adaption layer PDU; the adaption layer PDU may also carry padding.

In one embodiment, the header of the adaption layer PDU includes a third field.

In one embodiment, the third field includes 5 bits.
In one embodiment, the third field includes 6 bits.
In one embodiment, the third field includes 7 bits.
In one embodiment, the third field includes 8 bits.
In one embodiment, the third field includes 12 bits.
In one embodiment, the third field includes 16 bits.
In one embodiment, the third field includes the target identity.

In one embodiment, the third field includes five least significant bits of the target identity.

In one embodiment, the third field includes an LCID field.

In one embodiment, the first target signaling configures the third field.

In one embodiment, the second target signaling configures the third field.

In one embodiment, the first target signaling configures the third field of the header of the adaption layer PDU included in the second MAC sub-PDU.

In one embodiment, the first target signaling configures the third field of the header of the adaption layer PDU included in the first MAC sub-PDU.

In one embodiment, the second target signaling configures the third field of the header of the adaption layer PDU included in the second MAC sub-PDU.

In one embodiment, the second target signaling configures the third field of the header of the adaption layer PDU included in the first MAC sub-PDU.

In one embodiment, the header of the adaption layer PDU does not include the first logical channel identity.

In one embodiment, the header of the adaption layer PDU does not include the second logical channel identity.

In one embodiment, the header of the adaption layer PDU may optionally include some other bits prior to the third field.

In one embodiment, the header of the adaption layer PDU may optionally include some other bits in rear of the third field.

In one embodiment, the header of the adaption layer PDU received by the first node indicates an identity of a source UE.

In one subembodiment, the identity of the source UE includes a link layer identity.

In one subembodiment, the identity of the source UE includes an application layer identity.

In one subembodiment, the identity of the source UE includes an application identity.

In one subembodiment, the identity of the source UE included in the header of the adaption layer PDU carried in the second MAC PDU is one identity of the third node.

In one subembodiment, the identity of the source UE included in the header of the adaption layer PDU carried in the first MAC PDU is one identity of the third node.

In one subembodiment, the third field carries at least partial bits of the identity of the source UE.

In one subembodiment, a field other than the third field carries at least partial bits of the identity of the source UE.

In one embodiment, the header of the adaption layer PDU transmitted by the first node indicates an identity of a destination UE.

In one subembodiment, the identity of the destination UE includes a link layer identity.

In one subembodiment, the identity of the destination UE includes an application layer identity.

In one subembodiment, the identity of the destination UE includes an application identity.

In one subembodiment, the identity of the destination UE included in the header of the adaption layer PDU carried in the fourth MAC PDU is one identity of the third node.

In one subembodiment, the identity of the destination UE included in the header of the adaption layer PDU carried in the fifth MAC PDU is one identity of the third node.

In one subembodiment, the third field carries at least partial bits of the identity of the destination UE.

In one subembodiment, a field other than the third field carries at least partial bits of the identity of the destination UE.

In one embodiment, the header of the adaption layer PDU received or transmitted by the first node indicates an identity of a source UE and an identity of a destination UE.

In one subembodiment, the identity of the source UE includes a link layer identity.

In one subembodiment, the identity of the source UE includes an application layer identity.

In one subembodiment, the identity of the source UE includes an application identity.

In one subembodiment, the identity of the destination UE includes a link layer identity.

In one subembodiment, the identity of the destination UE includes an application layer identity.

In one subembodiment, the identity of the destination UE includes an application identity.

In one subembodiment, the identity of the source UE included in the header of the adaption layer PDU carried in the second MAC PDU is one identity of the third node.

In one subembodiment, the identity of the source UE included in the header of the adaption layer PDU carried in the first MAC PDU is one identity of the third node.

In one subembodiment, the identity of the destination UE included in the header of the adaption layer PDU carried in the second MAC PDU is one identity of the first node.

In one subembodiment, the identity of the destination UE included in the header of the adaption layer PDU carried in the first MAC PDU is one identity of the first node.

In one subembodiment, the identity of the destination UE included in the header of the adaption layer PDU carried in the fourth MAC PDU is one identity of the third node.

In one subembodiment, the identity of the destination UE included in the header of the adaption layer PDU carried in the fifth MAC PDU is one identity of the third node.

In one subembodiment, the identity of the source UE included in the header of the adaption layer PDU carried in the fourth MAC PDU is one identity of the first node.

In one subembodiment, the identity of the source UE included in the header of the adaption layer PDU carried in the fifth MAC PDU is one identity of the first node.

In one subembodiment, the one identity of the first node includes a link layer identity.

In one subembodiment, the one identity of the first node includes an Layer-2 ID.

In one subembodiment, the one identity of the first node includes an application layer identity.

In one subembodiment, the one identity of the first node includes an application identity.

In one subembodiment, the one identity of the third node includes a link layer identity.

In one subembodiment, the one identity of the third node includes an application layer identity.

In one subembodiment, the one identity of the third node includes an application identity.

In one subembodiment, the one identity of the third node includes an Layer-2 ID.

In one subembodiment, the third field carries at least partial bits of the identity of the source UE.

In one subembodiment, a field other than the third field carries at least partial bits of the identity of the source UE.

In one subembodiment, the third field carries at least partial bits of the identity of the destination UE.

In one subembodiment, a field other than the third field carries at least partial bits of the identity of the destination UE.

In one subembodiment, the header of the adaption layer PDU includes a fourth field, and the fourth field is a field other than the third field.

In one subembodiment, the fourth field carries at least partial bits of the identity of the source UE.

In one subembodiment, the fourth field carries at least partial bits of the identity of the destination UE.

In one embodiment, the third field indicates the target identity.

In one embodiment, the third field indicates at least partial bits of the target identity.

In one embodiment, the third field indicates five least significant bits of the target identity.

In one embodiment, the third field included in the header of the adaption layer PDU includes 5 bits.

In one embodiment, the third field included in the header of the adaption layer PDU includes 6 bits.

In one embodiment, the third field included in the header of the adaption layer PDU includes 8 bits.

In one embodiment, the third field included in the header of the adaption layer PDU includes 16 bits.

In one embodiment, the third field included in the header of the adaption layer PDU includes 24 bits.

In one embodiment, the third field included in the header of the adaption layer PDU includes 32 bits.

In one embodiment, the SDU of the adaption layer PDU includes the first PDCP PDU.

In one embodiment, the SDU of the adaption layer PDU includes the PDCP PDU included in the first data packet.

In one embodiment, the SDU of the adaption layer PDU includes the PDCP PDU included in the second data packet.

In one embodiment, the SDU of the adaption layer PDU includes the PDCP PDU included in the third data packet.

In one embodiment, the SDU of the adaption layer PDU includes the PDCP PDU included in the fourth data packet.

In one embodiment, the second signaling configures the adaption layer.

In one embodiment, the second signaling configures the third field of the adaption layer PDU to indicate the target identity.

In one embodiment, the second signaling configures the third field of the adaption layer PDU to indicate five least significant bits of the target identity.

In one embodiment, the first signaling configures the adaption layer.

In one embodiment, the first signaling configures the third field of the adaption layer PDU to indicate the target identity.

In one embodiment, the first signaling configures the third field of the adaption layer PDU to indicate five least significant bits of the target identity.

In one embodiment, the fourth signaling configures the adaption layer.

In one embodiment, the fourth signaling configures the third field of the adaption layer PDU to indicate the target identity.

In one embodiment, the fourth signaling configures the third field of the adaption layer PDU to indicate five least significant bits of the target identity.

In one embodiment, the second signaling indicates the third field of the adaption layer PDU to carry at least partial bits of the target logical channel.

In one embodiment, the first signaling indicates the third field of the adaption layer PDU to carry at least partial bits of the target logical channel.

In one embodiment, the fourth signaling indicates the third field of the adaption layer PDU to carry at least partial bits of the target logical channel.

In one embodiment, the second signaling is an adaption layer signaling, and the second signaling includes the third field of the adaption layer PDU.

In one embodiment, the first signaling is an adaption layer signaling, and the first signaling includes the third field of the adaption layer PDU.

In one embodiment, the fourth signaling is an adaption layer signaling, and the fourth signaling includes the third field of the adaption layer PDU.

In one embodiment, the first data packet includes an adaption layer PDU.

In one embodiment, the first data packet is an adaption layer PDU.

In one embodiment, the second data packet includes an adaption layer PDU.

In one embodiment, the second data packet is an adaption layer PDU.

In one embodiment, the third data packet includes an adaption layer PDU.

In one embodiment, the third data packet is an adaption layer PDU.

In one embodiment, the fourth data packet includes an adaption layer PDU.

In one embodiment, the fourth data packet is an adaption layer PDU.

In one embodiment, the adaption layer PDU includes the first data packet.

In one embodiment, the adaption layer PDU includes the second data packet.

In one embodiment, the adaption layer PDU includes the third data packet.

In one embodiment, the adaption layer PDU includes the fourth data packet.

In one embodiment, the first MAC sub-PDU includes a first adaption layer PDU, and the first adaption layer PDU carries the first data packet.

In one embodiment, the second MAC sub-PDU includes a second adaption layer PDU, and the second adaption layer PDU carries the first data packet.

In one embodiment, the first target signaling is used for configuring the adaption layer PDU, and an adaption layer configuration included in the first target signaling includes the target identity.

In one embodiment, the second target signaling is used for configuring the adaption layer PDU, and an adaption layer configuration included in the second target signaling includes the target identity.

In one embodiment, the second signaling does not include the first logical channel identity.

In one embodiment, the second signaling does not include the second logical channel identity.

In one embodiment, the first signaling does not include the first logical channel identity.

In one embodiment, the first signaling does not include the second logical channel identity.

Embodiment 16

Figure 16:
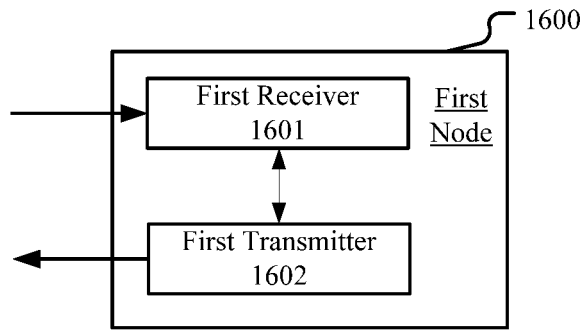
FIG. 16 is a diagram of a processing device in a first node according to one embodiment of the disclosure.

Embodiment 16 illustrates a structure block diagram of a processing device in a first node according to one embodiment of the disclosure, as shown in FIG. 16. In FIG. 16, the processing device 1600 in the first node includes a first receiver 1601 and a first transmitter 1602. In Embodiment 16:

the first receiver 1601 receives a second signaling and a second MAC PDU, the second signaling indicating a target identity.

Herein, the second MAC PDU includes a second MAC sub-PDU, the second MAC sub-PDU includes a second MAC sub-header and a first data packet, and the second MAC sub-header includes a second logical channel identity; a first MAC PDU is received by a transmitter of the second MAC PDU; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; the target identity is different from at least one of the first logical channel identity and the second logical channel identity, and the target identity is used for a security algorithm of the first data packet.

In one embodiment, the target identity is a logical channel identity.

In one embodiment, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

In one embodiment, five Least Significant Bits (LSBs) of the target identity are the same as five LSBs of the first logical channel identity, and the target identity is different from the second logical channel identity.

In one embodiment, five Least Significant Bits (LSBs) of the target identity are the same as five LSBs of the second logical channel identity, and the target identity is different from the first logical channel identity.

In one embodiment, the target identity is a logical channel identity other than the first logical channel identity and the second logical channel identity.

In one embodiment, the first receiver 1601 receives a third MAC PDU, the third MAC PDU includes a third MAC sub-PDU, and the third MAC sub-PDU includes the target identity and a third data packet; and the target identity is used for a security algorithm of the third data packet;

wherein the third data packet and the first data packet are generated in one same PDCP entity.

In one embodiment, the first transmitter 1602 transmits a first signaling, the first signaling is used for indicating the second logical channel identity.

In one embodiment, the first transmitter 1602 transmits a fourth MAC PDU, the fourth MAC PDU includes a fourth MAC sub-PDU, the fourth MAC sub-PDU includes the second logical channel identity and a fourth data packet, and the target identity is used for a security algorithm of the fourth data packet.

In one embodiment, the first transmitter 1602 transmits a second target signaling, the second target signaling is used for configuring the second logical channel identity.

In one embodiment, the first node is one UE.

In one embodiment, the first node is one terminal supporting large latency.

In one embodiment, the first node is one terminal supporting NTN.

In one embodiment, the first node is one aircraft.

In one embodiment, the first node is one vehicle terminal.

In one embodiment, the first node is one relay.

In one embodiment, the first node is one ship.

In one embodiment, the first node is one IoT terminal.

In one embodiment, the first node is one industrial IoT terminal.

In one embodiment, the first node is one equipment supporting low-latency high-reliability transmission.

In one embodiment, the first receiver 1601 includes at least one of the antenna 452, the receiver 454, the receiving processor 456, the multiantenna receiving processor 458, the controller/processor 459, the memory 460 or the data source 467 illustrated in Embodiment 4.

In one embodiment, the first transmitter 1602 includes at least one of the antenna 452, the transmitter 454, the transmitting processor 468, the multiantenna transmitting processor 457, the controller/processor 459, the memory 460 or the data source 467 illustrated in Embodiment 4.

Embodiment 17

Figure 17:
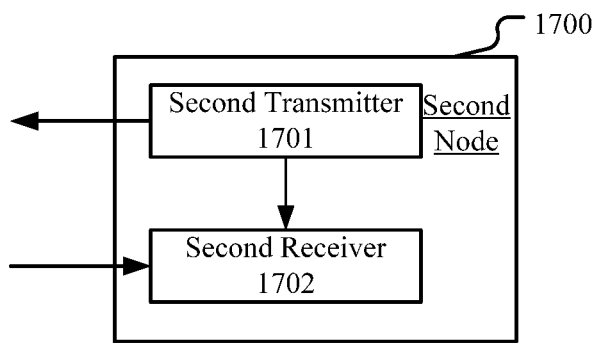
FIG. 17 is a diagram of a processing device in a second node according to one embodiment of the disclosure.

Embodiment 17 illustrates a structure block diagram of a processing device in a second node according to one embodiment of the disclosure, as shown in FIG. 17. In FIG. 17, the processing device 1700 in second first node includes a second receiver 1702 and a second transmitter 1701. In embodiment 17, the second receiver 1702 receives a first MAC PDU; and the second transmitter 1701 transmits a second MAC PDU.

Herein, the second MAC PDU includes a second MAC sub-PDU, the second MAC sub-PDU includes a second MAC sub-header and a first data packet, and the second MAC sub-header includes a second logical channel identity; the first MAC PDU includes a first MAC sub-PDU, the first MAC sub-PDU includes a first MAC sub-header and the first data packet, and the first MAC sub-header includes a first logical channel identity; the first logical channel identity is different from the second logical channel identity; a target identity is different from at least one of the first logical channel identity and the second logical channel identity, and the target identity is used for a security algorithm of the first data packet.

In one embodiment, the second transmitter 1701 transmits a second signaling, and the second signaling is used for indicating the target identity.

In one embodiment, the second transmitter 1701 transmits a first signaling, wherein the first signaling is used for indicating the second logical channel identity.

In one embodiment, the target identity is a logical channel identity.

In one embodiment, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

In one embodiment, five Least Significant Bits (LSBs) of the target identity are the same as five LSBs of the first logical channel identity, and the target identity is different from the second logical channel identity.

In one embodiment, five Least Significant Bits (LSBs) of the target identity are the same as five LSBs of the second logical channel identity, and the target identity is different from the first logical channel identity.

In one embodiment, the target identity is a logical channel identity other than the first logical channel identity and the second logical channel identity.

In one embodiment, the second receiver 1702 receives a fourth MAC PDU, the fourth MAC PDU includes a fourth MAC sub-PDU, the fourth MAC sub-PDU includes the second logical channel identity and a fourth data packet, and the target identity is used for a security algorithm of the fourth data packet; and the second transmitter 1701 transmits a fifth MAC PDU, the fifth MAC PDU includes a fifth MAC sub-PDU, and the fifth MAC sub-PDU includes the first logical channel identity and a fourth data packet.

In one embodiment, the second receiver 1702 receives a first target signaling, the first target signaling is used for configuring the first logical channel identity.

In one embodiment, the second receiver 1702 receives a second target signaling, the second target signaling is used for configuring the second logical channel identity.

In one embodiment, the second node is one UE.

In one embodiment, the second node is one terminal supporting large latency.

In one embodiment, the second node is one terminal supporting NTN.

In one embodiment, the second node is one aircraft.

In one embodiment, the second node is one vehicle terminal.

In one embodiment, the second node is one relay.

In one embodiment, the second node is one ship.

In one embodiment, the second node is one IoT terminal.

In one embodiment, the second node is one industrial IoT terminal.

In one embodiment, the second node is one equipment supporting low-latency high-reliability transmission.

In one embodiment, the second transmitter 1701 includes at least one of the antenna 420, the transmitter 418, the transmitting processor 416, the multiantenna transmitting processor 471, the controller/processor 475 or the memory 476 illustrated in Embodiment 4.

In one embodiment, the second receiver 1702 includes at least one of the antenna 420, the receiver 418, the receiving processor 470, the multiantenna receiving processor 472, the controller/processor 475 or the memory 476 illustrated in Embodiment 4.

Embodiment 18

Figure 18:
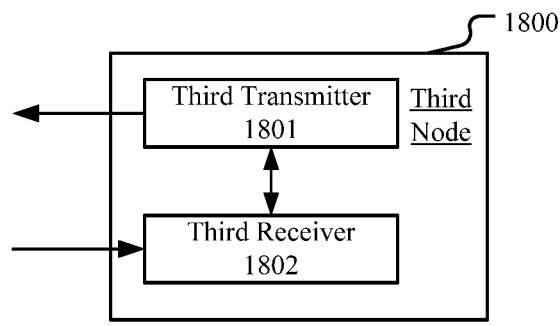
FIG. 18 is a diagram of a processing device in a third node according to one embodiment of the disclosure.

Embodiment 18 illustrates a structure block diagram of a processing device in a third node according to one embodiment of the disclosure, as shown in FIG. 18. In FIG. 18, the processing device 1800 in the third node includes a third receiver 1802 and a third transmitter 1801. In Embodiment 18:

the third transmitter 1801 transmits a first MAC PDU.

Herein, the first MAC PDU includes a first MAC sub-PDU, the first MAC sub-PDU includes a first MAC sub-header and a first data packet, and the first MAC sub-header includes a first logical channel identity; the first MAC PDU is used for generating a second MAC PDU; the first MAC PDU is received by a transmitter of the second MAC PDU; the second MAC PDU includes a second MAC sub-PDU, the second MAC sub-PDU includes a second MAC sub-header and the first data packet, and the second MAC sub-header includes a second logical channel identity; the first logical channel identity is different from the second logical channel identity; a target identity is different from at least one of the first logical channel identity and the second logical channel identity, and the target identity is used for a security algorithm of the first data packet.

In one embodiment, the third transmitter 1801 transmits a second signaling, the second signaling is used for indicating the target identity.

In one embodiment, the target identity is a logical channel identity.

In one embodiment, the first MAC sub-PDU includes a first RLC PDU, the first RLC PDU includes a first adaptation layer PDU, a header of the first adaptation layer PDU includes the target identity; the second MAC sub-PDU includes a second RLC PDU, the second RLC PDU includes a second adaption layer PDU, and a header of the second adaption layer PDU includes the target identity; and the first adaptation layer PDU includes the first data packet; and the second adaption layer PDU includes the first data packet.

In one embodiment, five Least Significant Bits (LSBs) of the target identity are the same as five LSBs of the first logical channel identity, and the target identity is different from the second logical channel identity.

In one embodiment, five Least Significant Bits (LSBs) of the target identity are the same as five LSBs of the second logical channel identity, and the target identity is different from the first logical channel identity.

In one embodiment, the target identity is a logical channel identity other than the first logical channel identity and the second logical channel identity.

In one embodiment, the third transmitter 1801 transmits a third MAC PDU, the third MAC PDU includes a third MAC sub-PDU, and the third MAC sub-PDU includes the target identity and a third data packet; and the target identity is used for a security algorithm of the third data packet; wherein the third data packet and the first data packet are generated in one same PDCP entity.

In one embodiment, the third receiver 1802 receives a first signaling, and the first signaling is used for indicating the second logical channel identity.

In one embodiment, the third receiver 1802 receives a fifth MAC PDU, the fifth MAC PDU includes a fifth MAC sub-PDU, the fifth MAC sub-PDU includes the first logical channel identity and a fourth data packet, and the target identity is used for a security algorithm of the fourth data packet.

In one embodiment, the third transmitter 1801 transmits a first target signaling, and the first target signaling is used for configuring the first logical channel identity.

In one embodiment, the third node is one UE.

In one embodiment, the third node is one terminal supporting large latency.

In one embodiment, the third node is one terminal supporting NTN.

In one embodiment, the third node is one aircraft.

In one embodiment, the third node is one vehicle terminal.

In one embodiment, the third node is one relay.

In one embodiment, the third node is one ship.

In one embodiment, the third node is one IoT terminal.

In one embodiment, the third node is one industrial IoT terminal.

In one embodiment, the third node is one equipment supporting low-latency high-reliability transmission.

In one embodiment, the third transmitter 1801 includes at least one of the antenna 420, the transmitter 418, the transmitting processor 416, the multiantenna transmitting processor 471, the controller/processor 475 or the memory 476 illustrated in Embodiment 4.

In one embodiment, the second receiver 1802 includes at least one of the antenna 420, the receiver 418, the receiving processor 470, the multiantenna receiving processor 472, the controller/processor 475 or the memory 476 illustrated in Embodiment 4.

Embodiment 19

Figure 19:
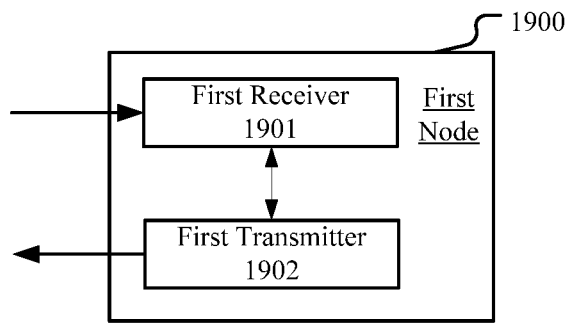
FIG. 19 is a diagram of a processing device in a first node according to one embodiment of the disclosure.

Embodiment 19 illustrates a structure block diagram of a processing device in a first node according to one embodiment of the disclosure, as shown in FIG. 19. In FIG. 19, the processing device 1900 in the first node includes a first receiver 1901 and a first transmitter 1901. In embodiment 19,
the first receiver 1901 receives a first message, the first message including a first parameter set; and
the first transmitter 1902 transmits a second message, the second message including a first parameter set and a second parameter set.

Herein, the first parameter set is used for a security establishment between a second node and a third node; the second node is identified by a second link layer identity, and the third node is identified by a third link layer identity; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first message includes a third parameter set, the third parameter set includes at least partial bits of a third key identity, the third parameter set is used for a security establishment between the first node and the second node.

In one embodiment, whether the second message includes a first field is used for indicating a relay type of communication from the second node to the third node, and the relay type includes an L3 relay and an L2 relay.

In one embodiment, the first receiver 1901 receives a third message, the third message is used for a security establishment between the second node and the third node; the third message and the first parameter set together include the first key identity; and
the first transmitter 1902 transmits a fourth message, the fourth message is generated by the third message, and the fourth message is used for a security establishment between the second node and the third node.

In one embodiment, when the security from the second node to the third node cannot be established, the L3 relay is determined as the relay type of communication from the second node to the third node.

In one embodiment, when the security from the first node to the third node cannot be established, the L2 relay is determined as the relay type from the second node to the third node.

In one embodiment, the first receiver 1902 receives a fifth message, the fifth message is used for a security establishment between the first node and the third node; the fifth message and the second parameter set together include the second key identity.

In one embodiment, the first transmitter 1902 transmits a sixth message, the sixth message indicates that a security is established between the first node and the second node, and a target layer2 identity used to carry the sixth message is the third link layer identity.

In one embodiment, the first transmitter 1902 transmits a seventh message, the seventh message indicates that a security is established between the first node and the third node, and a target layer2 identity used to carry the seventh message is the second link layer identity.

In one embodiment, a first MAC PDU caries at least partial bits of the first message, the first MAC PDU includes a first MAC header and at least a first MAC sub-PDU, the first MAC header includes at least partial bits of the first link layer identity and at least partial bits of the second link layer identity; a second MAC PDU caries at least partial bits of the second message, the second MAC PDU includes a second MAC header and at least a second MAC sub-PDU, the second MAC header includes at least partial bits of the third link layer identity.

In one embodiment, the first node is one UE.

In one embodiment, the first node is one terminal supporting large latency.

In one embodiment, the first node is one terminal supporting NTN.

In one embodiment, the first node is one aircraft.

In one embodiment, the first node is one vehicle terminal.

In one embodiment, the first node is one relay.

In one embodiment, the first node is one ship.

In one embodiment, the first node is one IoT terminal.

In one embodiment, the first node is one industrial IoT terminal.

In one embodiment, the first node is one equipment supporting low-latency high-reliability transmission.

In one embodiment, the first receiver 1901 includes at least one of the antenna 452, the receiver 454, the receiving processor 456, the multiantenna receiving processor 458, the controller/processor 459, the memory 460 or the data source 467 illustrated in Embodiment 4.

In one embodiment, the first transmitter 1902 includes at least one of the antenna 452, the transmitter 454, the transmitting processor 468, the multiantenna transmitting processor 457, the controller/processor 459, the memory 460 or the data source 467 illustrated in Embodiment 4.

Embodiment 20

Figure 20:
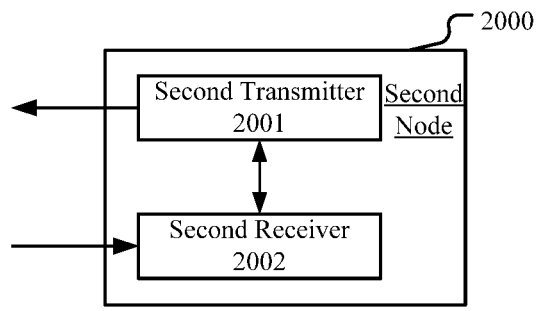
FIG. 20 is a diagram of a processing device in a second node according to one embodiment of the disclosure.

Embodiment 20 illustrates a structure block diagram of a processing device in a second node according to one embodiment of the disclosure, as shown in FIG. 20. In FIG. 20, the processing device 2000 in second first node includes a second transmitter 2001 and a second receiver 2002. In embodiment 20, the second transmitter 2001 transmits a first message, the first message including a first parameter set.

Herein, the first parameter set is used for a security establishment between a second node and a third node; the second node is identified by a second link layer identity, and the third node is identified by a third link layer identity; the first message is used for triggering a receiver of the first message to transmit a second message, and the second message includes a first parameter set and a second parameter set; the second parameter set is used for a security establishment between the first node and the third node; the first node is identified by a first link layer identity; the first parameter set includes at least partial bits of a first key identity, and the second parameter set includes at least partial bits of a second key identity; the first message and the second message are both PC5-S messages.

In one embodiment, the first message includes a third parameter set, the third parameter set includes at least partial bits of a third key identity, the third parameter set is used for a security establishment between the first node and the second node.

In one embodiment, whether the second message includes a first field is used for indicating a relay type of communication from the second node to the third node, and the relay type includes an L3 relay and an L2 relay.

In one embodiment, the second receiver 2002 receives a fourth message, the fourth message is generated by the third message, and the fourth message is used for a security establishment between the second node and the third node; the fourth message and the first parameter set together include the first key identity.

In one embodiment, when the security from the second node to the third node cannot be established, the L3 relay is determined as the relay type of communication from the second node to the third node.

In one embodiment, when the security from the first node to the third node cannot be established, the L2 relay is determined as the relay type from the second node to the third node.

In one embodiment, the second receiver 2002 receives a seventh message, the seventh message indicates that a security is established between the first node and the third node, and a target layer2 identity used to carry the seventh message is the second link layer identity.

In one embodiment, a first MAC PDU caries at least partial bits of the first message, the first MAC PDU includes a first MAC header and at least a first MAC sub-PDU, the first MAC header includes at least partial bits of the first link layer identity and at least partial bits of the second link layer identity; a second MAC PDU caries at least partial bits of the second message, the second MAC PDU includes a second MAC header and at least a second MAC sub-PDU, the second MAC header includes at least partial bits of the third link layer identity.

In one embodiment, the second node is one UE.

In one embodiment, the second node is one terminal supporting large latency.

In one embodiment, the second node is one terminal supporting NTN.

In one embodiment, the second node is one aircraft.

In one embodiment, the second node is one vehicle terminal.

In one embodiment, the second node is one relay.

In one embodiment, the second node is one ship.

In one embodiment, the second node is one IoT terminal.

In one embodiment, the second node is one industrial IoT terminal.

In one embodiment, the second node is one equipment supporting low-latency high-reliability transmission.

In one embodiment, the second transmitter 2001 includes at least one of the antenna 420, the transmitter 418, the transmitting processor 416, the multiantenna transmitting processor 471, the controller/processor 475 or the memory 476 illustrated in Embodiment 4.

In one embodiment, the second receiver 2002 includes at least one of the antenna 420, the receiver 418, the receiving processor 470, the multiantenna receiving processor 472, the controller/processor 475 or the memory 476 illustrated in Embodiment 4.

Embodiment 21

Figure 21:
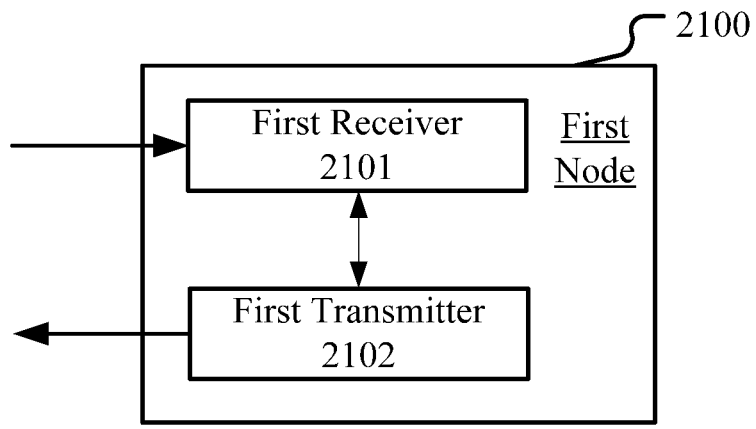
FIG. 21 is a diagram of a processing device in a first node according to one embodiment of the disclosure.

Embodiment 21 illustrates a structure block diagram of a processing device in a first node according to one embodiment of the disclosure, as shown in FIG. 21. In FIG. 21, the processing device 2100 in the first node includes a first receiver 2101 and a first transmitter 2101. In embodiment 21, the first transmitter 2102 transmits a first signaling, the first signaling indicating a second candidate logical channel identity.

the first receiver 2101 receives a second MAC protocol data unit (PDU);

Herein, the second candidate logical channel identity is used for determining a second logical channel identity; the second MAC PDU includes a second MAC sub-PDU, the second MAC sub-PDU includes a second MAC sub-header and a first data packet; the second MAC sub-header includes the second logical channel identity; the second MAC PDU is generated from a first MAC PDU; the first MAC PDU includes a first MAC sub-PDU; the first MAC sub-PDU includes a first MAC sub-header and the first data packet; the first MAC sub-header includes a first logical channel identity; the first logical channel identity is different from the second logical channel identity; the second logical channel identity is used for a security algorithm of the first data packet.

In one embodiment, at least five Least Significant Bits (LSBs) of the second candidate logical channel identity are the same as five LSBs of the second logical channel identity.

In one embodiment, the second candidate logical channel identity is used for determining the first logical channel identity.

In one embodiment, the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

In one embodiment, the first receiver 2101 receives a second signaling; herein the second signaling is higher layer signaling; the second signaling indicates the second logical channel identity; the second signaling indicates at least a first part of the first identity.

In one embodiment, the first transmitter 2102, transmits a third signaling; herein, as a response to the fact that the second signaling does not conflict with the current configuration, the third signaling is transmitted; the third signaling indicates that a configuration of the second signaling is completed; the first signaling includes a first candidate logical channel identity set; the first candidate logical channel identity set includes at least one candidate logical channel identity, and the second candidate logical channel identity belongs to the first candidate logical channel identity set; the first candidate logical channel identity set and the second logical channel identity are used for determining whether the second signaling conflicts with the current configuration.

In one embodiment, five bits of the second logical channel identity are used as inputs of parameters BEARER[0] to BEARER[4] of the security algorithm.

In one embodiment, in the first logical channel identity and the second logical channel identity, only five Least Significant Bits of the second logical channel identity is used for the security algorithm of the first packet.

In one embodiment, both the first MAC PDU and the second MAC PDU are transmitted via side link.

In one embodiment, a source identifier included in the second MAC PDU is the same as a destination identifier included in the first MAC PDU.

In one embodiment, a receiver of the first signaling is one of a transmitter of the second MAC PDU or a transmitter of the first MAC PDU.

In one embodiment, the second MAC PDU is used to forward the data carried by the first MAC PDU.

In one embodiment, the first node is one UE.

In one embodiment, the first node is one terminal supporting large latency.

In one embodiment, the first node is one terminal supporting NTN.

In one embodiment, the first node is one aircraft.
In one embodiment, the first node is one vehicle terminal.
In one embodiment, the first node is one relay.
In one embodiment, the first node is one ship.
In one embodiment, the first node is one IoT terminal.
In one embodiment, the first node is one industrial IoT terminal.

In one embodiment, the first node is one equipment supporting low-latency high-reliability transmission.

In one embodiment, the first receiver 2101 includes at least one of the antenna 452, the receiver 454, the receiving processor 456, the multiantenna receiving processor 458, the controller/processor 459, the memory 460 or the data source 467 illustrated in Embodiment 4.

In one embodiment, the first transmitter 2102 includes at least one of the antenna 452, the transmitter 454, the transmitting processor 468, the multiantenna transmitting processor 457, the controller/processor 459, the memory 460 or the data source 467 illustrated in Embodiment 4.

Embodiment 22

Figure 22:
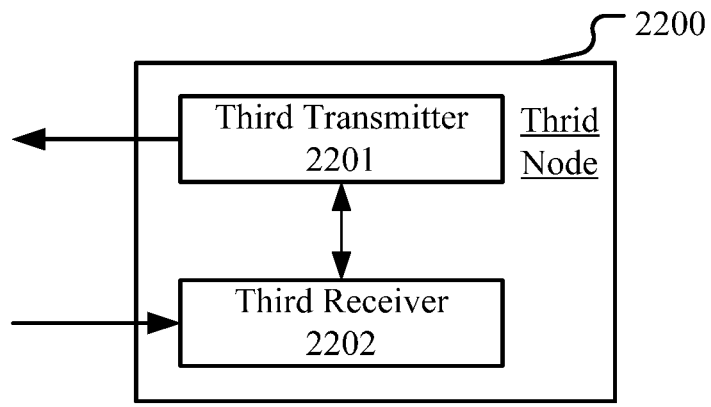
FIG. 22 is a diagram of a processing device in a third node according to one embodiment of the disclosure.

Embodiment 22 illustrates a structure block diagram of a processing device in a third node according to one embodiment of the disclosure, as shown in FIG. 22. In FIG. 22, the processing device 2200 in third node includes a third transmitter 2201 and a third receiver 2202. In embodiment 22,
the third receiver 2202 receives a first signaling, the first signaling indicating a second candidate logical channel identity; determine a second logical channel according to the second candidate logical channel identity.
the third transmitter 2201 transmits a first MAC PDU.

Herein, the first MAC PDU includes a first MAC sub-PDU; the first MAC sub-PDU includes a first MAC sub-header and a first data packet; the first MAC sub-header includes a first logical channel identity; the second logical channel identity is used for a security algorithm of the first data packet; the first MAC PDU is used to generate a second MAC PDU; the second MAC PDU includes a second MAC sub-PDU, the second MAC sub-PDU includes a second MAC sub-header and the first data packet; the second MAC sub-header includes the second logical channel identity; the first logical channel identity is different from the second logical channel identity; the security algorithm includes at least encryption.

In one embodiment, at least five Least Significant Bits (LSBs) of the second candidate logical channel identity are the same as five LSBs of the second logical channel identity.

In one embodiment, the second candidate logical channel identity is used for determining the first logical channel identity.

In one embodiment, the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

In one embodiment, five bits of the second logical channel identity are used as inputs of parameters BEARER[0] to BEARER[4] of the security algorithm.

In one embodiment, both the first MAC PDU and the second MAC PDU are transmitted via side link.

In one embodiment, the second MAC PDU is used to forward the data carried by the first MAC PDU.

In one embodiment, the third node is one UE.

In one embodiment, the third node is one terminal supporting large latency.

In one embodiment, the third node is one terminal supporting NTN.

In one embodiment, the third node is one aircraft.
In one embodiment, the first node is one vehicle terminal.
In one embodiment, the third node is one ship.
In one embodiment, the third node is one IoT terminal.
In one embodiment, the third node is one industrial IoT terminal.

In one embodiment, the third transmitter 2201 includes at least one of the antenna 420, the transmitter 418, the transmitting processor 416, the multiantenna transmitting processor 471, the controller/processor 475 or the memory 476 illustrated in Embodiment 4.

In one embodiment, the third receiver 2202 includes at least one of the antenna 420, the receiver 418, the receiving processor 470, the multiantenna receiving processor 472, the controller/processor 475 or the memory 476 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, satellite communication equipment, NTN user equipment, and other radio communication equipment. The base station or system in the disclosure includes but not limited to macro-cellular base stations, micro-cellular base stations, home base stations, relay base station, gNBs (NR nodes B), NR nodes B, Transmitter Receiver Points (TRPs), NTN base stations, satellite equipment, flying platform, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A first node for wireless communication, comprising:
a first transmitter, to transmit a first signaling, the first signaling indicating a second candidate logical channel identity;
a first receiver, to receive a second MAC PDU;
wherein the second candidate logical channel identity is used for determining a second logical channel identity; the second MAC PDU comprises a second MAC sub-PDU, the second MAC sub-PDU comprises a second MAC sub-header and a first data packet, and the second MAC sub-header comprises a second logical channel identity; the second MAC PDU is generated from a first MAC PDU; the first MAC PDU comprises a first MAC sub-PDU, the first MAC sub-PDU comprises a first MAC sub-header and the first data packet, and the first MAC sub-header comprises a first logical channel identity; the first logical channel identity is different from the second logical channel identity; the second logical channel identity is used for a security algorithm of the first data packet.

2. The first node according to claim 1, wherein at least five Least Significant Bits (LSBs) of the second candidate logical channel identity are the same as five LSBs of the second logical channel identity.

3. The first node according to claim 1, wherein the second candidate logical channel identity is used for determining the first logical channel identity.

4. The first node according to any one of claim 1, wherein the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

5. The first node according claim 1, comprising:
the first receiver, receives a second signaling;
wherein the second signaling is higher layer signaling; the second signaling indicates the second logical channel identity; the second signaling indicates at least a first part of the first identity.

6. The first node according to claim 1, comprising:
the first transmitter, transmits a third signaling;
wherein, as a response to the fact that the second signaling does not conflict with the current configuration, the third signaling is transmitted; the third signaling indicates that a configuration of the second signaling is completed; the first signaling includes a first candidate logical channel identity set; the first candidate logical channel identity set includes at least one candidate logical channel identity, and the second candidate logical channel identity belongs to the first candidate logical channel identity set; the first candidate logical channel identity set and the second logical channel identity are used for determining whether the second signaling conflicts with the current configuration.

7. The first node according to claim 1, wherein five bits of the second logical channel identity are used as inputs of parameters BEARER[0] to BEARER[4] of the security algorithm.

8. The first node according to claim 2, wherein five bits of the second logical channel identity are used as inputs of parameters BEARER[0] to BEARER[4] of the security algorithm.

9. The first node according to claim 2, wherein in the first logical channel identity and the second logical channel identity, only five Least Significant Bits of the second logical channel identity is used for the security algorithm of the first packet.

10. The first node according to claim 2, wherein both the first MAC PDU and the second MAC PDU are transmitted via sidelink.

11. The first node according to claim 1 wherein a source identifier included in the second MAC PDU is the same as a destination identifier included in the first MAC PDU.

12. The first node according to claim 1, wherein a receiver of the first signaling is one of a transmitter of the second MAC PDU or a transmitter of the first MAC PDU.

13. The first node according to claim 1, wherein the second MAC PDU is used to forward the data carried by the first MAC PDU.

14. The first node according to claim 2, wherein a source identifier included in the second MAC PDU is the same as a destination identifier included in the first MAC PDU.

15. The first node according to claim 3, wherein a source identifier included in the second MAC PDU is the same as a destination identifier included in the first MAC PDU.

16. The first node according to claim 3, wherein
five bits of the second logical channel identity are used as inputs of parameters BEARER[0] to BEARER[4] of the security algorithm.

17. The first node according to claim 2, wherein
the first signaling indicates a first candidate logical channel identity, the first candidate logical channel identity has five least significant bits the same as the second candidate logical channel identity, and when one of the first candidate logical channel identity and the second candidate logical channel identity is determined as the second logical channel identity, the other one is determined as the first logical channel identity.

18. The first node according to claim 1, wherein
values of five least significant bits of the first logical channel identity are set as values of five least significant bits of the second candidate logical channel identity, and a value of a most significant bit among six least significant bits of the first logical channel identity is set as a 0/1 reversal value of a most significant bit among six least significant bits of the second candidate logical channel identity.

19. A third node for wireless communication, comprising:
a third receiver, to receive a first signaling, the first signaling indicating a second candidate logical channel identity, and to determine a second logical channel according to the second candidate logical channel identity;
a third transmitter, to transmit a first MAC PDU;
wherein the first MAC PDU comprises a first MAC sub-PDU, the first MAC sub-PDU comprises a first MAC sub-header and a first data packet, and the first MAC sub-header comprises a first logical channel identity; the first MAC PDU is used for generating a second MAC PDU; the second MAC PDU comprises a second MAC sub-PDU, the second MAC sub-PDU comprises a second MAC sub-header and the first data packet, and the second MAC sub-header comprises a second logical channel identity; the first logical channel identity is different from the second logical channel identity; and the second logical channel identity is used for a security algorithm of the first data packet.

20. A method in a first node for wireless communication, comprising:
transmitting a first signaling, the first signaling indicating a second candidate logical channel identity;
receiving a second MAC PDU;
wherein the second candidate logical channel identity is used for determining a second logical channel identity; the second MAC PDU comprises a second MAC sub-PDU, the second MAC sub-PDU comprises a second MAC sub-header and a first data packet, and the second MAC sub-header comprises a second logical channel identity; the second MAC PDU is generated from a first MAC PDU; the first MAC PDU comprises a first MAC sub-PDU, the first MAC sub-PDU comprises a first MAC sub-header and the first data packet, and the first MAC sub-header comprises a first logical channel identity; the first logical channel identity is different from the second logical channel identity; the second logical channel identity is used for a security algorithm of the first data packet.

* * * * *